United States Patent
Okada et al.

(10) Patent No.: US 8,570,421 B2
(45) Date of Patent: Oct. 29, 2013

(54) IMAGE CAPTURE DEVICE AND IMAGE PROCESSOR

(75) Inventors: Yusuke Okada, Osaka (JP); Takeo Azuma, Kyoto (JP); Sanzo Ugawa, Osaka (JP); Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/478,628

(22) Filed: May 23, 2012

(65) Prior Publication Data

US 2012/0229669 A1 Sep. 13, 2012

Related U.S. Application Data

(63) Continuation of application No. PCT/JP2011/005730, filed on Oct. 13, 2011.

(30) Foreign Application Priority Data

Dec. 16, 2010 (JP) ................................. 2010-280563

(51) Int. Cl.
| | |
|---|---|
| H04N 3/14 | (2006.01) |
| H04N 5/335 | (2011.01) |
| H04N 5/228 | (2006.01) |
| H04N 9/07 | (2006.01) |
| H04N 9/04 | (2006.01) |
| H01L 27/00 | (2006.01) |

(52) U.S. Cl.
USPC ........ 348/311; 348/222.1; 348/266; 348/272; 250/208.1

(58) Field of Classification Search
USPC ................... 250/208.1; 348/222.1, 266–283, 348/294–301, 311–324
See application file for complete search history.

(56) References Cited

U.S. PATENT DOCUMENTS

| | | | |
|---|---|---|---|
| 4,500,915 A | * | 2/1985 | Koike et al. .................. 348/283 |
| 4,893,186 A | | 1/1990 | Mulder |

(Continued)

FOREIGN PATENT DOCUMENTS

| | | |
|---|---|---|
| JP | 56-044275 A | 4/1981 |
| JP | 01-221694 A | 9/1989 |

(Continued)

OTHER PUBLICATIONS

International Search Report for corresponding International Application No. PCT/JP2011/005730 mailed Jan. 10, 2012.

(Continued)

*Primary Examiner* — Michael Osinski
(74) *Attorney, Agent, or Firm* — Renner, Otto, Boisselle & Sklar, LLP

(57) ABSTRACT

In one embodiment, an image sensor includes, a bank 301 of charge-coupled devices, and charge sensing amplifiers 302, each of which transforms electric charges extracted from an associated pixel into an electrical signal. After the electric charges accumulated in every pixel have been extracted to the charge-coupled devices 301 at the same time, a color component with a high resolution is output to a horizontal transfer path 316 via the charge sensing amplifiers 302 and then output to a device outside of the image sensor. Thereafter, pixel signals representing another low-resolution color component are vertically added together on the bank 301 of charge-coupled devices. Those pixel signals are horizontally added together on the horizontal transfer path 316 and output. The image obtained by this image sensor is then input to an image processing section, thereby obtaining an output color image with a high resolution and a high frame rate.

13 Claims, 38 Drawing Sheets

(56) References Cited

U.S. PATENT DOCUMENTS

| | | | |
|---|---|---|---|
| 5,194,944 A * | 3/1993 | Uchiyama et al. | 348/223.1 |
| 5,225,695 A * | 7/1993 | Naka et al. | 257/239 |
| 5,995,249 A * | 11/1999 | Sato et al. | 358/514 |
| 6,462,779 B1 * | 10/2002 | Philbrick | 348/312 |
| 7,692,706 B2 * | 4/2010 | Parks | 348/311 |
| 8,031,235 B2 * | 10/2011 | Wada | 348/222.1 |
| 2002/0054229 A1 * | 5/2002 | Sasaki | 348/312 |
| 2003/0086005 A1 | 5/2003 | Nakamura | |
| 2003/0098917 A1 * | 5/2003 | Oda | 348/272 |
| 2004/0017497 A1 * | 1/2004 | Suzuki et al. | 348/315 |
| 2004/0150733 A1 * | 8/2004 | Nagayoshi et al. | 348/272 |
| 2005/0068435 A1 * | 3/2005 | Shigemori et al. | 348/272 |
| 2006/0023268 A1 * | 2/2006 | Kinumura | 358/474 |
| 2007/0046797 A1 * | 3/2007 | Kakumoto | 348/294 |
| 2007/0052813 A1 * | 3/2007 | Neter | 348/222.1 |
| 2007/0085922 A1 * | 4/2007 | Kido | 348/311 |
| 2007/0139545 A1 * | 6/2007 | Parks | 348/311 |
| 2007/0229691 A1 * | 10/2007 | Oshima et al. | 348/315 |
| 2008/0018767 A1 * | 1/2008 | Parks | 348/311 |
| 2009/0086078 A1 * | 4/2009 | Watanabe | 348/311 |
| 2010/0201857 A1 * | 8/2010 | Kido | 348/296 |
| 2010/0289932 A1 * | 11/2010 | Hashimoto | 348/300 |
| 2010/0315534 A1 | 12/2010 | Azuma et al. | |
| 2010/0315539 A1 | 12/2010 | Azuma et al. | |
| 2011/0075010 A1 * | 3/2011 | Border et al. | 348/317 |
| 2011/0090385 A1 * | 4/2011 | Aoyama et al. | 348/308 |
| 2011/0096216 A1 * | 4/2011 | Kawai et al. | 348/296 |
| 2011/0216228 A1 * | 9/2011 | Kawamura et al. | 348/273 |
| 2011/0242385 A1 * | 10/2011 | Nishihara | 348/308 |
| 2012/0038801 A1 | 2/2012 | Yamada | |

FOREIGN PATENT DOCUMENTS

| | | |
|---|---|---|
| JP | 05-145859 A | 6/1993 |
| JP | 2003-143614 A | 5/2003 |
| JP | 4547462 B | 7/2010 |
| WO | 2009/019823 A1 | 2/2009 |
| WO | 2009/019824 A1 | 2/2009 |

OTHER PUBLICATIONS

Form PCT/ISA/237 for corresponding International Application No. PCT/JP2011/005730 dated Jan. 10, 2012.

Azuma et al., "A 2.2/3-inch 4K2K CMOS Image Sensor Based on Dual Resolution and Exposure Technique", Proceedings in IEEE International Solid-State Circuit Conference 2010, pp. 560-562, 2010 (cited in [0004] of the specification).

Terakawa et al., "A Buried Channel CPD Image Sensor", Journal of the Institute of Television Engineers, 37 (10), pp. 795-802, 1983 and concise explanation (cited in [0008] of the specification).

* cited by examiner

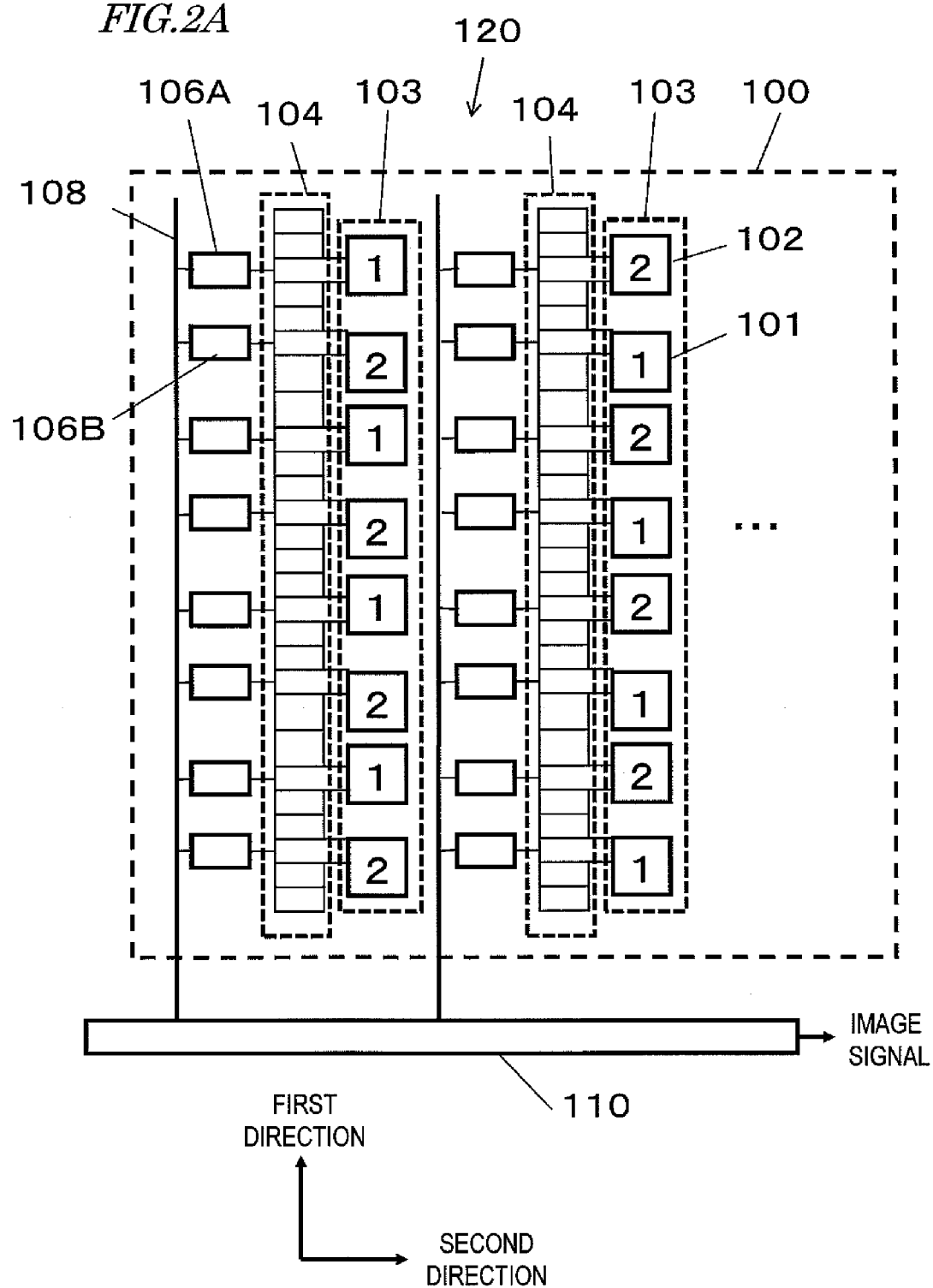

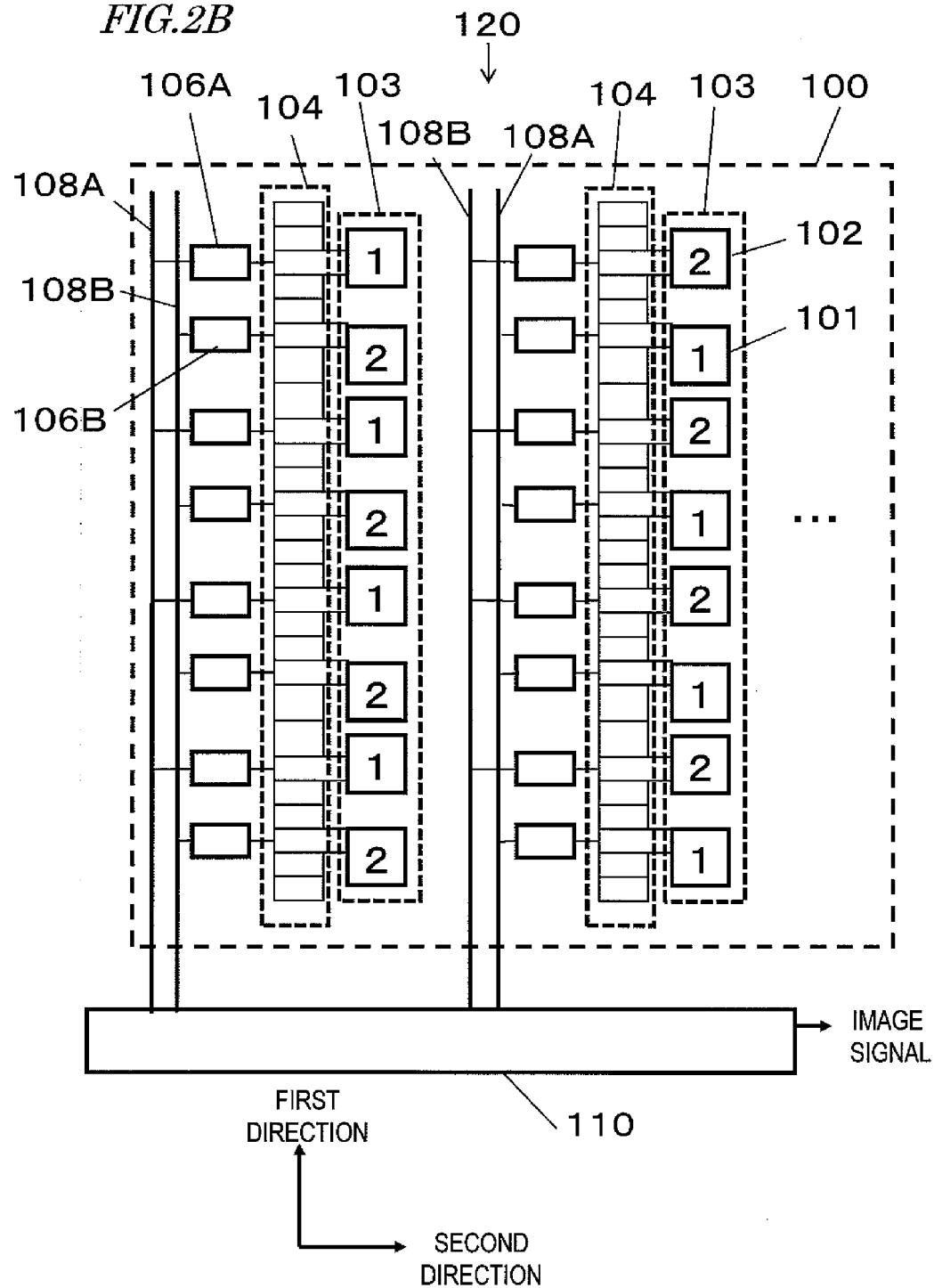

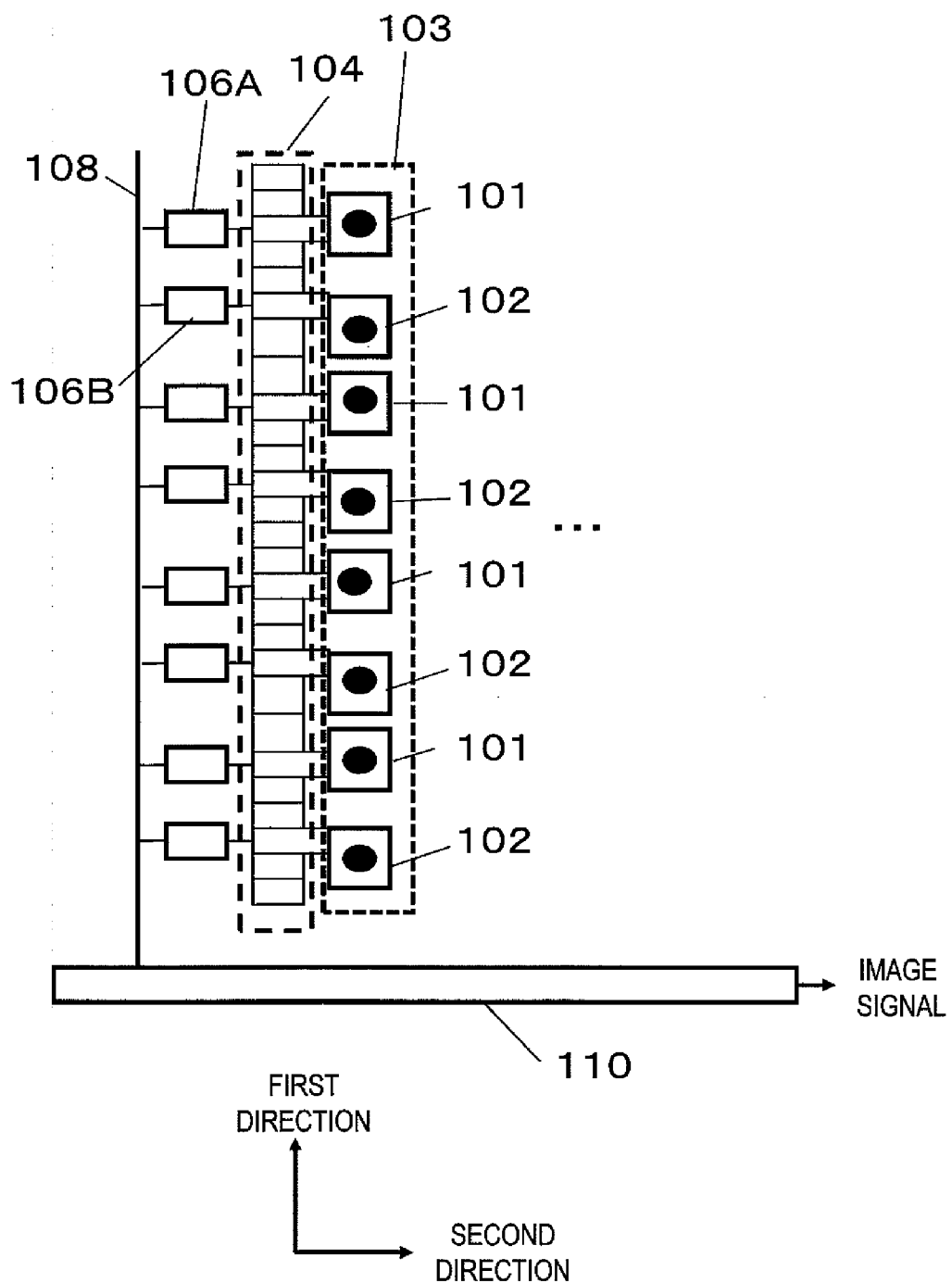

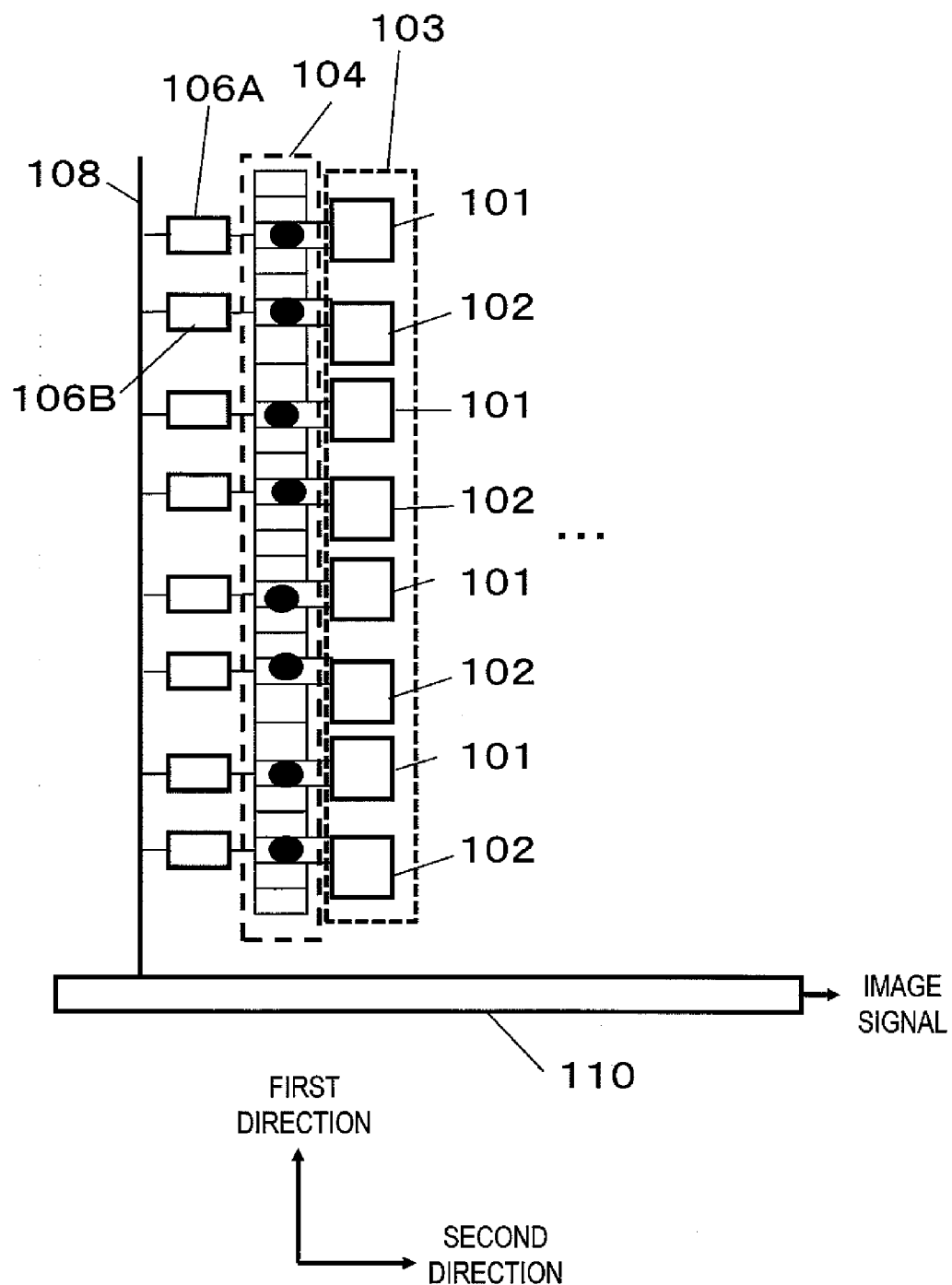

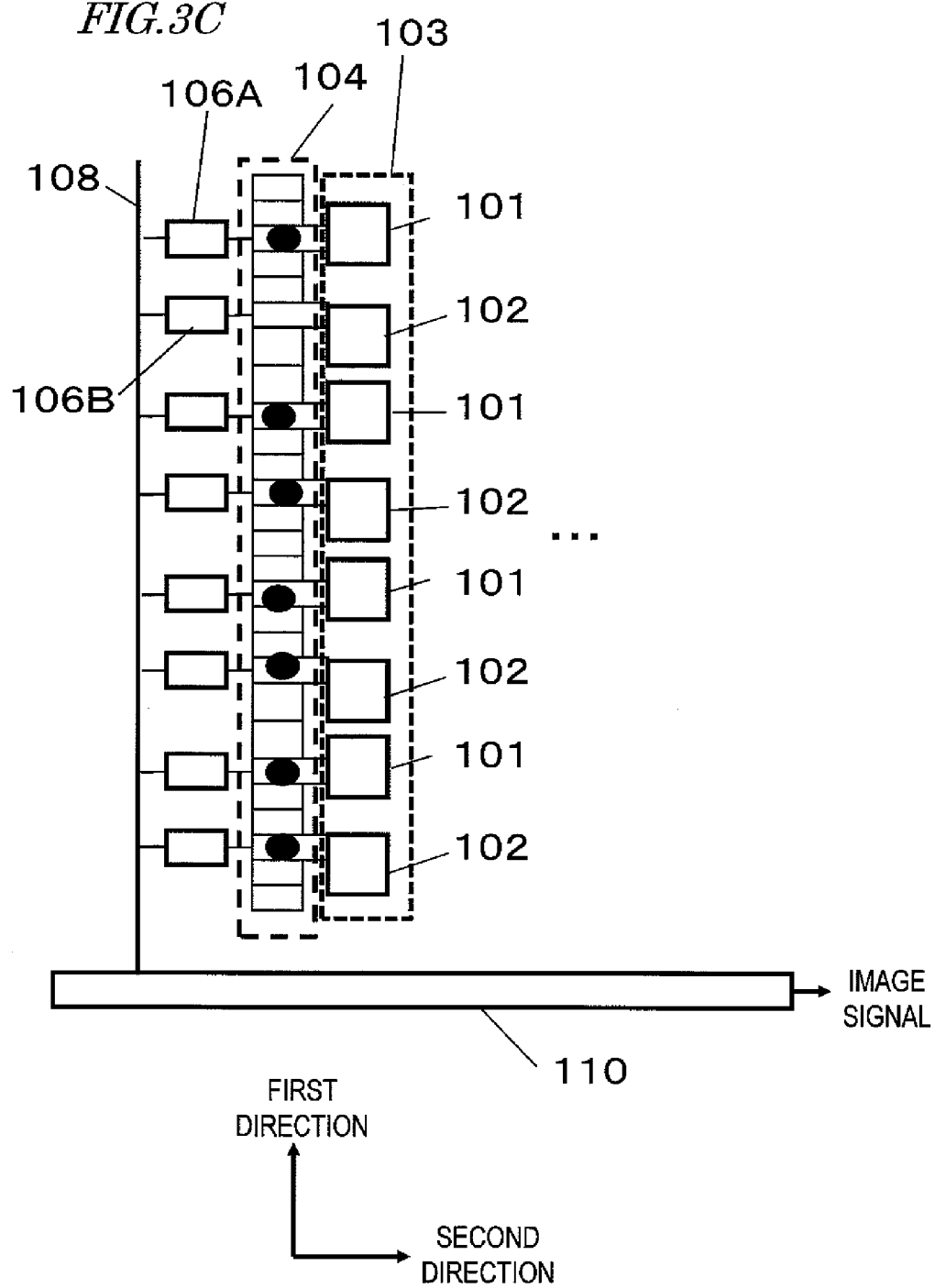

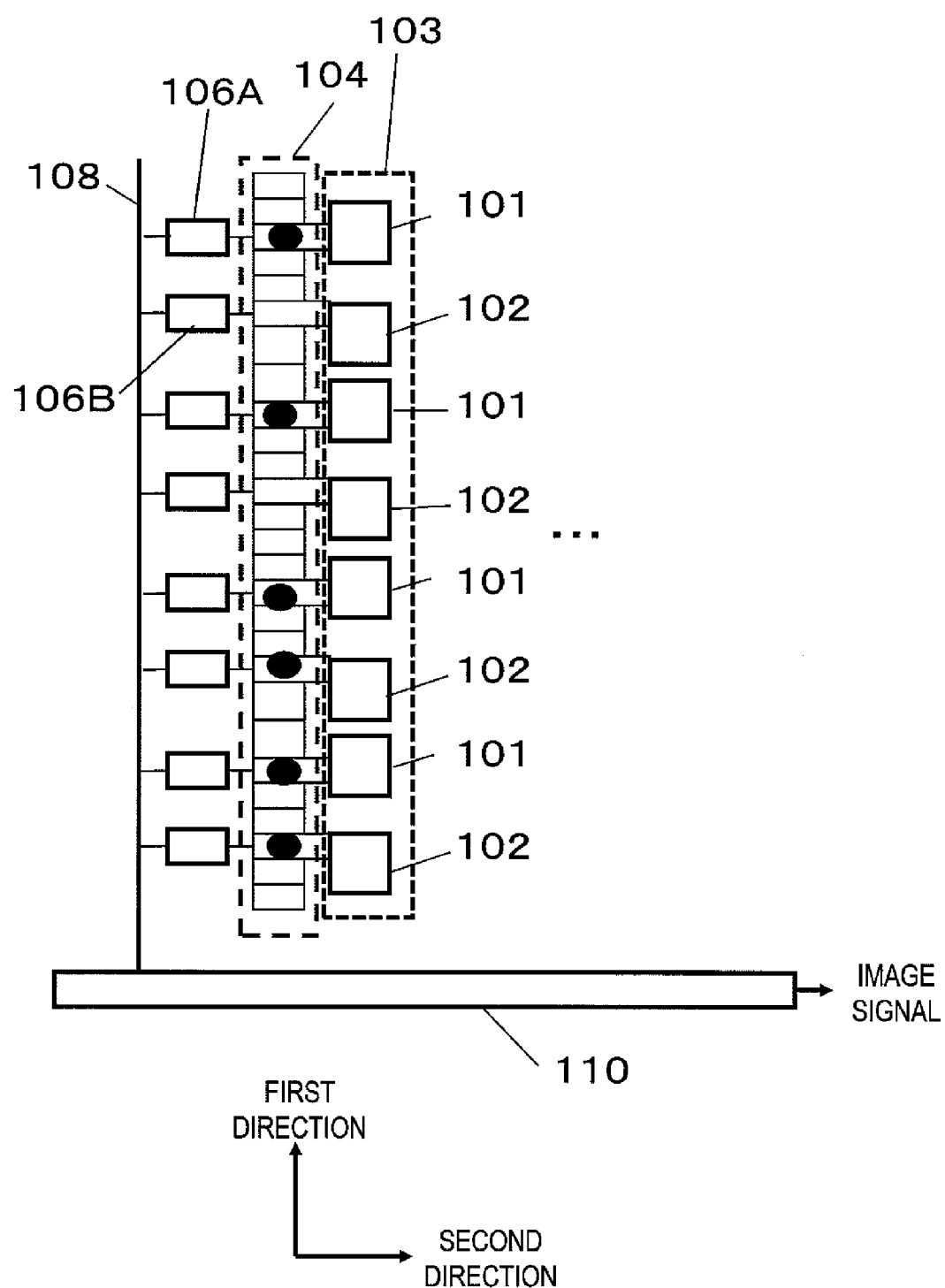

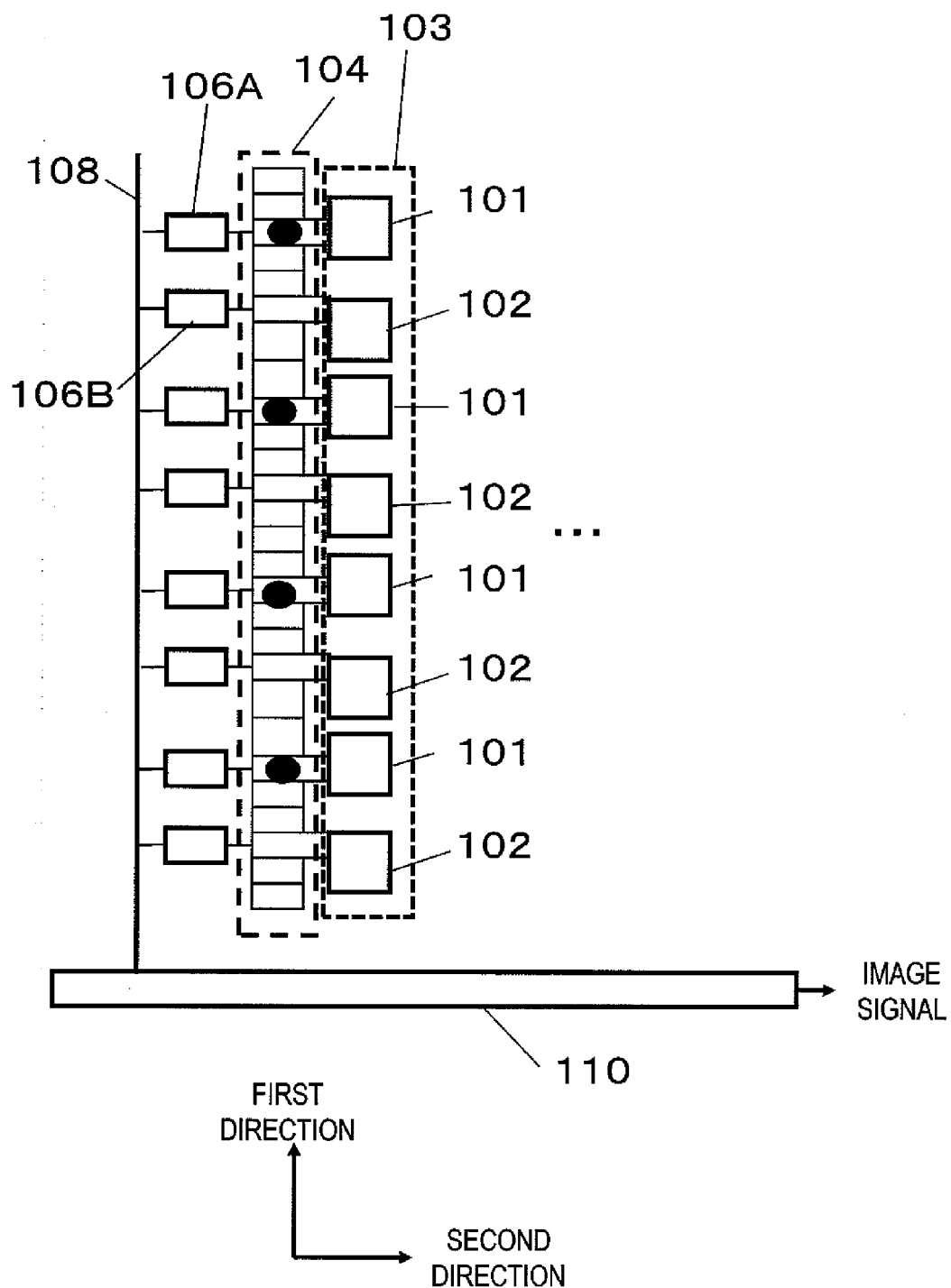

(3B)

(3C)  (3E)  (3F)

(a) BASE FRAME
(IMAGE AT TIME t)

(b) REFERENCE FRAME
(IMAGE AT TIME t+1)

*FIG.31*

| R (1,1) | G (1,2) | R (1,3) | G (1,4) | R (1,5) |
|---|---|---|---|---|
| G (2,1) | B (2,2) | G (2,3) | B (2,4) | G (2,5) |
| R (3,1) | G (3,2) | R (3,3) | G (3,4) | R (3,5) |
| G (4,1) | B (4,2) | G (4,3) | B (4,4) | G (4,5) |
| R (5,1) | G (5,2) | R (5,3) | G (5,4) | R (5,5) |

IMAGE CAPTURE DEVICE AND IMAGE PROCESSOR

This is a continuation of International Application No. PCT/JP2011/005730, with an international filing date of Oct. 13, 2011, which claims priority of Japanese Patent Application No. 2010-280563, filed on Dec. 16, 2010, the contents of which are hereby incorporated by reference.

BACKGROUND

1. Technical Field

The present application relates to a single-panel image capture device that obtains a color image and also relates to an image processor that achieves high resolution. More particularly, the embodiments of the present invention relates to an image capture device that changes resolution and exposure time on a color component basis and to an image processor that generates a high-resolution, high-frame-rate and high-sensitivity output image based on the output image of the image capture device.

2. Description of the Related Art

According to a known technique for achieving a high resolution for a color moving picture, R, G and B color components are captured as respective input images in mutually different resolutions, exposure times and frame rates (see Patent Documents Nos. 1 and 2). In capturing such a high-resolution and high-frame-rate moving picture, however, the quantity of light incident on each pixel often runs short, thus causing a decrease in the SNR of the moving picture. Specifically, according to the technique disclosed in Patent Documents Nos. 1 and 2, as for a certain color component, an image is captured at a low resolution and a high frame rate, thereby obtaining an image with a sufficient quantity of light secured spatially. Meanwhile, as for another color component, an image is captured at a high resolution and a low frame rate, thereby obtaining an image with a sufficient quantity of light secured temporally. And based on these images (i.e., input images), the high-resolution and high-frame-rate moving picture has its resolution further increased.

Such input images can be obtained by setting the resolutions of three-panel image sensors, which capture the respective color components, to be different from each other. Alternatively, such input images can also be obtained by a single-panel image sensor. In that case, low-resolution color component images are generated by adding together signals provided by adjacent pixels.

A single-panel color image sensor with the ability to add together pixel signals on an image capturing plane is disclosed in Non-Patent Document No. 1 and Patent Document No. 3. Non-Patent Document No. 1 discloses a CMOS image sensor that can make addition on adjacent pixels. Addition can be made on vertical pixels by supplying a column select pulse to columns of horizontal pixels to be added together at the same time.

FIG. 32 illustrates an exemplary configuration for a pixel peripheral circuit in the related art and FIG. 33 shows an example of a drive timing chart.

Suppose a situation where two vertically adjacent R (red) and B (blue) pixels need to be added together. As shown in FIG. 33, an R and B pixel read signal TRANRBn on an $n^{th}$ row of columns of horizontal pixels (i.e., on the $n^{th}$ scan line) and an R and B pixel read signal TRANRBn+1 on an $(n+1)^{th}$ scan line are raised to H level at the same time. Then, those pixel signals are read out to an output signal line at the same time and then mixed together on the output signal line. In 1H (one horizontal scanning period) after that, a read signal is supplied to R and B pixels on the next two scan lines (i.e., $(n+2)^{th}$ and $(n+3)^{th}$ scan lines) and addition is made in the same way. Horizontal pixels can be added together by providing a binning circuit. A CMOS image sensor converts signal charge that has been stored in pixels into an electrical signal such as a voltage and then outputs the electrical signal to an external device outside of the image sensor. That is why the CMOS image sensor can transmit a signal rapidly and can speed up the read operation.

Patent Document No. 3 proposes a color CCD single-panel image sensor that can get pixel addition done on an image capturing plane. In making a vertical pixel addition, the image sensor disclosed in Patent Document No. 3 supplies a signal with high voltage level to a vertical. CCD cell every number of pixels to be subjected to the addition, thereby producing a deep potential well. In such a state, a vertical transfer is made with respect to multiple pixels to store electric charge, corresponding to the number of pixels, in the potential well. By mixing together electric charge supplied from multiple pixels in the potential well of a single semiconductor surface, the vertical pixel addition can get done. Likewise, horizontal pixel addition can also get done by forming a deep potential well and making a horizontal transfer for the number of pixels to be subjected to the addition. The CMOS image sensor makes the pixel addition after having transformed the pixel charge into an electrical signal. That is why noise to be inevitably produced when the charge is transformed into a voltage is superposed on each of the signals to be added together. For example, when addition is going to be made on four pixels, charge-voltage transformation noise will be accumulated for those four pixels. On the other hand, a CCD image sensor makes a pixel addition by adding together the pixel charge itself and then performing the charge-voltage transformation. The noise to be involved with this transformation will be superposed for only one pixel, no matter how many pixels need to be added together. That is why this technique is advantageous in terms of the SNR of the pixel signals obtained by making the addition.

Patent Document No. 4 and Non-Patent Document No. 2 disclose a technique for adding together signals on output signal lines in a charge-coupled device in a horizontal transfer section.

CITATION LIST

Patent Literature

Patent Document No. 1: PCT International Application Laid-Open Publication No. 2009/019823
Patent Document No. 1: PCT International Application Laid-Open Publication No. 2009/019824
Patent Document No. 3: Japanese Laid-Open Patent Publication No. 2003-143614
Patent Document No. 4: Japanese Laid-Open Patent Publication No. 56-044275

Non-Patent Literature

Non-Patent Document No. 1: Takeo Azuma, Taro Imagawa, Sanzo Ugawa, Yusuke Okada, Hiroyoshi Komobuchi, Motonori Ishii, Shigetaka Kasuga, Yoshihisa Kato, "A 2.2/3-inch 4K2K CMOS Image Sensor Based on Dual Resolution and Exposure Technique, "Proceedings in IEEE International Solid-State Circuit Conference 2010", pp. 408-410, 2010. Non-Patent Document No. 2: Sumio Terakawa, Yuji Matsuda, Toshiyuki Kozono, Takahiro Yamada, Kohji Senda, Izumi Murozono, Yoshimitsu Hiroshima, Kenju Horii, Tohru Takamura, and Takao Kunii, "A Buried Channel CPD Image Sensor", Journal of the Institute of Television Engineers, 37(10), pp. 795-802, 1983

SUMMARY

The prior art technique needs further improvement in view of the resolution and frame rate on a color component basis.

One non-limiting, and exemplary embodiment provides a technique to improve the quality of images obtained by the imaging sensor.

In one general aspect, an image capture device disclosed herein formed a solid-state image sensor, a shooting control section that controls the solid-state image sensor, and an image processing section that processes an image that has been shot by the solid-state image sensor. The solid-state image sensor includes: an image capturing plane on which a number of pixels, including pixels in a first color and pixels in a second color, are arranged two-dimensionally in a first direction and in a second direction that intersects with the first direction, a column of pixels that runs in the first direction including pixels in the first color and pixels in the second color; multiple banks of charge-coupled devices, each said bank running in the first direction, being connected to an associated column of pixels that runs in the first direction, and being able to receive and store, on a pixel-by-pixel basis, electric charges that have been created by each of the pixels that form the column; multiple charge sensing devices of a first type, each of which is connected to an associated one of the multiple banks of charge-coupled devices, senses electric charges that have been extracted from pixels in the first color and stored in the associated bank of charge-coupled devices, and transforms the electric charges into a voltage signal; multiple charge sensing devices of a second type, each of which is connected to an associated one of the multiple banks of charge-coupled devices, senses electric charges that have been extracted from pixels in the second color and stored in the associated bank of charge-coupled devices, and transforms the electric charges into a voltage signal; a transfer path that runs in the second direction and that outputs pixel signals through one terminal thereof; and a plurality of output signal lines that run in the first direction, each said output signal line being connected to at least some of the charge sensing devices and transmitting the voltage signals that have been output from the charge sensing devices to the transfer path. The shooting control section reads a first color image, which is made up of pixels in the first color, from the solid-state image sensor at a first frame rate and also reads a second color image, which is made up of pixels in the second color, from the solid-state image sensor at a second frame rate that is lower than the first frame rate.

In one general aspect, a solid-state image sensor disclosed herein includes: an image capturing plane on which a number of pixels, including pixels in a first color and pixels in a second color, are arranged two-dimensionally in a first direction and in a second direction that intersects with the first direction, a column of pixels that runs in the first direction including pixels in the first color and pixels in the second color; multiple banks of charge-coupled devices, each said bank running in the first direction, being connected to an associated column of pixels that runs in the first direction, and being able to receive and store, on a pixel-by-pixel basis, electric charges that have been created by each of the pixels that form the column; multiple charge sensing devices of a first type, each of which is connected to an associated one of the multiple banks of charge-coupled devices, senses electric charges that have been extracted from pixels in the first color and stored in the associated bank of charge-coupled devices, and transforms the electric charges into a voltage signal; multiple charge sensing devices of a second type, each of which is connected to an associated one of the multiple banks of charge-coupled devices, senses electric charges that have been extracted from pixels in the second color and stored in the associated bank of charge-coupled devices, and transforms the electric charges into a voltage signal; a transfer path that runs in the second direction and that outputs pixel signals through one terminal thereof; and a plurality of output signal lines that run in the first direction, each said output signal line being connected to at least some of the charge sensing devices and transmitting the voltage signals that have been output from the charge sensing devices to the transfer path.

In one general aspect, a solid-state image sensor driving method disclosed herein is a method for driving a solid-state image sensor according to the embodiment of the present invention described above. The method includes the steps of: transferring, at the same time and on a pixel-by-pixel basis, electric charges that have been created by the pixels to associated portions of the banks of charge-coupled devices; getting some of the electric charges that have been transferred on a pixel-by-pixel basis to the banks of charge-coupled devices from the pixels in the second color sensed by the charge sensing devices of the second type; getting some of the electric charges that have been transferred on a pixel-by-pixel basis to the banks of charge-coupled devices from the pixels in the first color combined together in the charge sensing devices of the second type; and sensing the electric charges that have been combined in each said bank of charge-coupled devices at the charge sensing devices of the first type.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 2A is a diagram illustrating an exemplary configuration for a solid-state image sensor according to the present disclosure.

FIG. 2B is a diagram illustrating another exemplary configuration for a solid-state image sensor according to the present disclosure.

FIG. 3A is a diagram illustrating how a solid-state image sensor according to the present disclosure operates.

FIG. 3B is a diagram illustrating how a solid-state image sensor according to the present disclosure operates.

FIG. 3C is a diagram illustrating how a solid-state image sensor according to the present disclosure operates.

FIG. 3D is a diagram illustrating how a solid-state image sensor according to the present disclosure operates.

FIG. 3E is a diagram illustrating how a solid-state image sensor according to the present disclosure operates.

FIG. 31 illustrates how a Bayer resolution increasing method is carried out according to the fifth embodiment of the present invention.

DETAILED DESCRIPTION

Figure 1:
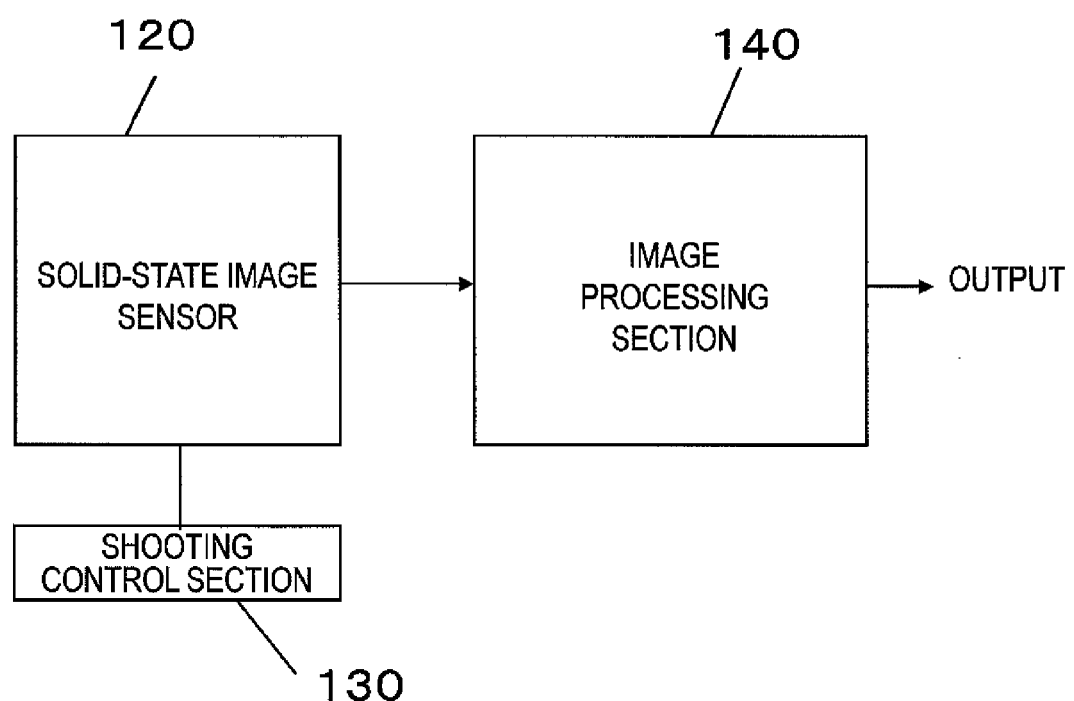
FIG. 1 is a block diagram illustrating a configuration for an image capture device according to the present disclosure.

The conventional CMOS image sensor sequentially selects a horizontal scan line to read pixel signals from and outputs the pixel signals one after another. That is why there is a lag between a point in time when the exposure process ends and pixel signals are read from an upper part of the image capturing plane and a point in time when the same operation is performed on a lower part of the image capturing plane. In that case, if there is a subject that is moving swiftly horizontally, a portion of the subject image shot in an upper part of the screen will have shifted from another portion of the same image shot in a lower part of the screen. As a result, the subject image will be deformed in that case.

In the single-panel image sensor, on the other hand, pixels in different colors are arranged alternately. That is why in making addition on a charge-coupled device that is connected to pixels in a CCD image sensor, if every pixel signal is read at the same time onto the charge-coupled device, then signals representing those pixels in different colors will be mixed together on the charge-coupled device. To avoid mixing such pixel signals in different colors, the CCD image sensor disclosed in Patent Document No. 3 shifts the timing of extracting charge from R and G pixels, which are arranged on the same vertical column, to the charge-coupled device on a color-by-color basis. That is to say, when the CCD image sensor is used, the images to be shot on a color-by-color basis may have shifted from each other. To synchronize the timings of exposure on every pixel of those image sensors, a shutter mechanism that shuts off the light that is going to enter the entire plane of the image sensor needs to be arranged as an additional member outside of the image sensor (e.g., behind a lens provided for the image capture device). And the signals need to be read after the pixel exposure process has once been stopped with that shutter. However, that additional mechanism increases the overall size of the image capture device, which is a problem.

The embodiments of the present invention provide, first and foremost, an image capture device that is configured to capture an image effectively with the resolution and frame rate changed on a color component basis.

According to the embodiments, it is possible to raise the resolution of an image that has been shot with such an image capture device.

In one general aspect, an disclosed herein formed a solid-state image sensor, a shooting control section that controls the solid-state image sensor, and an image processing section that processes an image that has been shot by the solid-state image sensor. The solid-state image sensor includes: an image capturing plane on which a number of pixels, including pixels in a first color and pixels in a second color, are arranged two-dimensionally in a first direction and in a second direction that intersects with the first direction, a column of pixels that runs in the first direction including pixels in the first color and pixels in the second color; multiple banks of charge-coupled devices, each said bank running in the first direction, being connected to an associated column of pixels that runs in the first direction, and being able to receive and store, on a pixel-by-pixel basis, electric charges that have been created by each of the pixels that form the column; multiple charge sensing devices of a first type, each of which is connected to an associated one of the multiple banks of charge-coupled devices, senses electric charges that have been extracted from pixels in the first color and stored in the associated bank of charge-coupled devices, and transforms the electric charges into a voltage signal; multiple charge sensing devices of a second type, each of which is connected to an associated one of the multiple banks of charge-coupled devices, senses electric charges that have been extracted from pixels in the second color and stored in the associated bank of charge-coupled devices, and transforms the electric charges into a voltage signal; a transfer path that runs in the second direction and that outputs pixel signals through one terminal thereof; and a plurality of output signal lines that run in the first direction, each said output signal line being connected to at least some of the charge sensing devices and transmitting the voltage signals that have been output from the charge sensing devices to the transfer path. The shooting control section reads a first color image, which is made up of pixels in the first color, from the solid-state image sensor at a first frame rate and also reads a second color image, which is made up of pixels in the second color, from the solid-state image sensor at a second frame rate that is lower than the first frame rate.

According to the embodiment of the present invention, an image is captured with the resolution and frame rate changed on a color component basis. That is why even when going to be added together, pixel signals can also be read from every pixel on the image capturing plane at the same time without using any additional shutter mechanism.

In one embodiment, the shooting control section has the ability to extract electric charges that have been created by the pixels onto the banks of charge-coupled devices at the same time.

In one embodiment, the shooting control section has the ability to combine, at the banks of charge-coupled devices, the electric charges that have been extracted from the pixels in the first color and then stored in the banks of charge-coupled devices.

In one embodiment, the shooting control section has the ability to remove, from the bank of charge-coupled devices, electric charges that have been extracted from the pixels in the second color and then stored in the bank of charge-coupled devices in a frame in which the first and second color images are both read, and then combine, at the bank of charge-coupled devices, the electric charges that have been created by the pixels in the first color.

In one embodiment, the image processing section generates, based on the first and second color images that have been read at the first and second frame rates, respectively, a color moving picture, of which the frame rate is equal to or higher than the first frame rate and of which the resolution is equal to or higher than the second color image's.

In one embodiment, the transfer path includes a horizontal bank of charge-coupled devices that runs in the second direction. And the horizontal bank of charge-coupled devices is connected to the output signal lines and horizontally transfers charge signals, corresponding to the voltage signals on the output signal lines, while storing the charge signals.

In one embodiment, the transfer path includes a horizontal shift register that runs in the second direction. And the horizontal shift register is connected to the output signal lines and transfers horizontally the voltage signals on the output signal lines.

In one embodiment, the solid-state image sensor includes a binning circuit that is arranged between the output signal lines and the horizontal shift register. And the binning circuit has the ability to add together the voltage signals that have been output onto at least two of the output signal lines and that represent electric charges that have been extracted from the pixels that are arranged in the second direction.

In one embodiment, each of the pixels on the image capturing plane detects the intensity of one of red, green and blue components that are included in incoming light.

In one embodiment, the first color is red and blue and the second color is green.

In one embodiment, each of the pixels on the image capturing plane detects the intensity of one of cyan, magenta, yellow and green components that are included in incoming light.

In one general aspect, a solid-state image sensor disclosed herein includes: an image capturing plane on which a number of pixels, including pixels in a first color and pixels in a second color, are arranged two-dimensionally in a first direction and in a second direction that intersects with the first direction, a column of pixels that runs in the first direction including pixels in the first color and pixels in the second color; multiple banks of charge-coupled devices, each said bank running in the first direction, being connected to an associated column of pixels that runs in the first direction, and being able to receive and store, on a pixel-by-pixel basis, electric charges that have been created by each of the pixels that form the column; multiple charge sensing devices of a first type, each of which is connected to an associated one of the multiple banks of charge-coupled devices, senses electric charges that have been extracted from pixels in the first color and stored in the associated bank of charge-coupled devices, and transforms the electric charges into a voltage signal; multiple charge sensing devices of a second type, each of which is connected to an associated one of the multiple banks of charge-coupled devices, senses electric charges that have been extracted from pixels in the second color and stored in the associated bank of charge-coupled devices, and transforms the electric charges into a voltage signal; a transfer path that runs in the second direction and that outputs pixel signals through one terminal thereof; and a plurality of output signal lines that run in the first direction, each said output signal line being connected to at least some of the charge sensing devices and transmitting the voltage signals that have been output from the charge sensing devices to the transfer path.

In one general aspect, a solid-state image sensor driving method disclosed herein is a method for driving a solid-state image sensor according to the embodiment of the present invention described above. The method includes the steps of: transferring, at the same time and on a pixel-by-pixel basis, electric charges that have been created by the pixels to associated portions of the banks of charge-coupled devices; getting some of the electric charges that have been transferred on a pixel-by-pixel basis to the banks of charge-coupled devices from the pixels in the second color sensed by the charge sensing devices of the second type; getting some of the electric charges that have been transferred on a pixel-by-pixel basis to the banks of charge-coupled devices from the pixels in the first color combined together in the charge sensing devices of the second type; and sensing the electric charges that have been combined in each said bank of charge-coupled devices at the charge sensing devices of the first type.

The basic configuration and operation of the present disclosure will be described with reference to FIGS. 1 through 5.

FIG. 1 is a block diagram illustrating a configuration for an image capture device according to the present disclosure. As shown in FIG. 1, the image capture device of the present disclosure includes a solid-state image sensor 120, a shooting control section 130 that controls the solid-state image sensor 120, and an image processing section 140 that processes the image that has been captured by the solid-state image sensor 120.

Next, an exemplary configuration for the solid-state image sensor 120 will be described with reference to FIG. 2A. The solid-state image sensor 120 shown in FIG. 2A comprises an image capturing plane 120 on which a number of pixels are arranged two-dimensionally in a first direction and in a second direction that intersects with the first direction. Those pixels include pixels 101 in a first color, which may be a combination of the colors red and blue, and pixels 102 in a second color, which may be the color green, for example. Each of those pixels 101 and 102 includes a photoelectric transducer (not shown) for performing photoelectric conversion, which is typically implemented as a photodiode, and may also include a transistor or any other circuit component if necessary. An array of color filters, in which first-color filters that transmit light in the first color and second-color filters that transmit light in the second color are arranged in a mosaic pattern, is provided on one side of those pixels 101 and 102 so as to transmit the incoming light before the light is incident on those pixels. The array of color filters typically has a Bayer arrangement but may also have any other kind of arrangement as well.

In each of those pixels 101 and 102, electric charge, of which the quantity is determined by the intensity of the incoming light, is produced through the photoelectric conversion. The image that has been produced on the image capturing plane through a lens has a distribution of the quantities of incoming light on the image capturing plane. That is why the quantities of the light that has struck the color filters of the respective pixels 101 and 102 also have a two-dimensional distribution on the image capturing plane. And the quantities of the light to be incident on the photoelectric converting sections of the respective pixels 101 and 102 after having been transmitted through their associated color filters also have a two-dimensional distribution on the image capturing plane. Each pixel 101 in the first color generates and stores electric charge in the quantity to be determined by the intensity of the light that has reached, and been transmitted through, its associated first-color filter and then has been incident on its photoelectric transducer. On the other hand, each pixel 102 in the second color generates and stores electric charge in the quantity to be determined by the intensity of the light that has reached, and been transmitted through, its associated second-color filter and then has been incident on its photoelectric transducer. When a certain image is being produced on the image capturing plane, the longer the charge storage period, the greater the quantity of the electric charge produced by each of those pixels 101 and 102.

Each column 103 of pixels that runs in the first direction includes pixels 101 in the first color and pixels 102 in the second color. In the example illustrated in FIG. 2A, in each column 103 of pixels that runs vertically, pixels 101 and 102 in the first and second colors are arranged alternately.

The solid-state image sensor 120 includes multiple banks 104 of charge-coupled devices. Each bank 104 runs in the first direction. The banks 104 of charge-coupled devices may have the same configuration as either the vertical or horizontal charge-coupled transfer path for use in known CCD image sensors. Each bank 104 of charge-coupled devices has a lot of electrodes that are arranged to cover the surface of a semiconductor with an insulating film interposed between them. And by controlling the potential to be applied to those electrodes, electric charge can be either stored or transferred.

Each bank 104 of charge-coupled devices is connected to an adjacent column 103 of pixels. In the example illustrated in FIG. 2A, each bank 104 of charge-coupled devices is connected to the column 103 of pixels that is located on the right-hand side on the paper. However, this is just an example of the present disclosure and this arrangement is not necessarily adopted. In any case, each bank 104 of charge-coupled devices can receive and store, on a pixel-by-pixel basis, the electric charges that have been produced by the pixels 101 and 102 that form the column 103 of pixels that is connected to that bank 104.

The solid-state image sensor 120 further includes a first type of charge sensing devices 106A and a second type of charge sensing devices 106B, each of which is connected to an associated one of the banks 104 of charge-coupled devices. Each of these charge sensing devices 106A and 106B may be an amplifier comprised of transistors. Specifically, each charge sensing device 106A of the first type senses the electric charge that is stored in a pixel 101 in the first color in its associated bank 104 of charge-coupled devices and transforms the electric charge into a voltage signal. In the same way, each charge sensing device 106B of the second type senses the electric charge that is stored in a pixel 102 in the second color in its associated bank 104 of charge-coupled devices and transforms the electric charge into a voltage signal.

The solid-state image sensor 120 further includes a transfer path 110 that runs in the second direction and a number of output signal lines 108 that run in the first direction. Each of the output signal lines 108 is connected to at least some of those charge sensing devices 106A and 106B and transmits the voltage signals that have been provided by the charge sensing devices 106A and 106B to the transfer path 110. In the example illustrated in FIG. 2A, those charge sensing devices 106A and 106B are connected in common to the same output signal line 108. However, those charge sensing devices 106A and 106B may also be connected to two different output signal lines 108A and 108B as shown in FIG. 2B.

In each of the examples illustrated in FIGS. 2A and 2B, the transfer path 110 outputs, through one of the two terminals thereof, pixel signals that are associated with the voltage signals that have been received through the output signal line 108 or the output signal lines 108A and 108B. Those pixel signals are used to generate an image consisting of the pixels in the first color (which will be referred to herein as a "first-color image") and an image consisting of the pixels in the second color (which will be referred herein as a "second-color image"). An image of one frame is formed by those pixel signals that are output in each frame captured. And by synthesizing together those images in two different colors, a color moving picture is formed.

In one embodiment, the transfer path 110 includes a horizontal bank of charge-coupled devices that runs in the second direction. That horizontal bank of charge-coupled devices is connected to multiple output signal lines and transfers horizontally electric charge signals, corresponding to the voltage signals on those output signal lines, while storing those electric charge signals. In another embodiment, the transfer path 110 includes a horizontal shift register that runs in the second direction. That horizontal shift register is connected to those output signal lines and transfers horizontally the voltage signals on those output signal lines.

Now take a look at FIG. 1 again. The shooting control section 130 shown in FIG. 1 can read a first color image, which is made up of pixels in the first color, from the solid-state image sensor 120 at a first frame rate and can also read a second color image, which is made up of pixels in the second color, from the solid-state image sensor 120 at a second frame rate that is lower than the first frame rate. Those color images that have been read in this manner are supplied to the image processing section 140, which performs various kinds of image processing to be described later, thereby generating and outputting a high-resolution color moving picture.

Hereinafter, it will be described with reference to FIGS. 3A through 3F how the image capture device of the present disclosure may operate. In each of those drawings, only one set of a column 103 of pixels and a bank 104 of charge-coupled devices, both of which run in the first direction, is shown for the sake of simplicity. Actually, however, such columns 103 of pixels and banks 104 of charge-coupled devices are alternately arranged in large numbers in the second direction.

First of all, look at FIG. 3A, when light is incident on the pixels 101 and 102, electric charges, which are schematically indicated by the solid circles, are produced by photoelectric conversion in the pixels 101 and 102.

Next, as shown in FIG. 3B, the electric charges that have been produced in the pixels 101 and 102 are transferred at the same time to the bank 104 of charge-coupled devices. Those electric charges are transferred from the pixels 101 and 102 to, and stored in, the bank 104 of charge-coupled devices on a pixel-by-pixel basis. In the example illustrated in FIG. 3B, the electric charges are supposed to be moved from a single column 103 of pixels at the same time. In a preferred embodiment, the electric charges are moved from every pixel on the image capturing plane to their associated banks 104 of charge-coupled devices. In a normal CCD image sensor, those electric charges that have moved from the respective pixels 101 and 102 to the banks 104 of charge-coupled devices would be transferred in the first direction next. According to the present disclosure, however, there is no need to make such a transfer.

Next, as shown in FIGS. 3C and 3D, multiple charge sensing devices 106B of the second type sequentially sense electric charges that have been provided by the pixels 102 in the second color and then stored in their associated bank 104 of charge-coupled devices, and transform those electric charges into voltage signals, which are passed to the output signal line 108 that is connected to those charge sensing devices 106B of the second type. The charge sensing devices 106B of the second type sense, on a pixel-by-pixel basis, the electric charges that have been provided by the pixels 102 in the second color and then stored in the bank 104 of charge-coupled devices connected to them. Since those electric charges are sequentially sensed in the first direction, every electric charge that has been provided by the pixel 102 in the second color is removed from the bank 104 of charge-coupled devices as shown in FIG. 3E. As a result, only electric charges that have been provided by the pixels 101 in the first color are stored in the bank 104 of charge-coupled devices. FIG. 3E illustrates such a state.

Figure 3F:
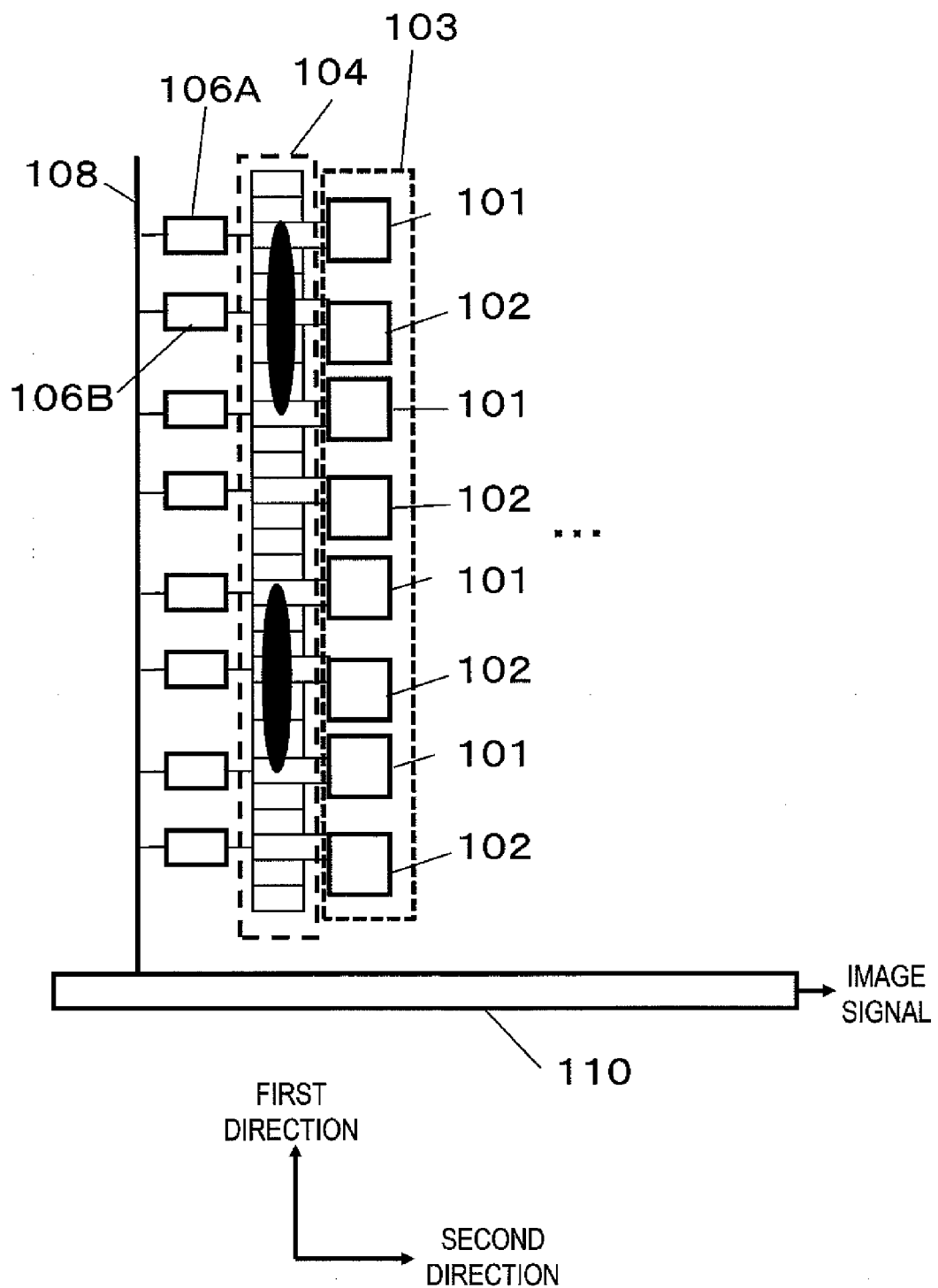
FIG. 3F is a diagram illustrating how a solid-state image sensor according to the present disclosure operates.

Thereafter, as shown in FIG. 3F, the electric charges that have been provided by two or more pixels 101 in the first color, which are adjacent to each other in the first direction, are mixed together. Such mixing is performed within the bank 104 of charge-coupled devices as will be described in detail later.

Figure 4:
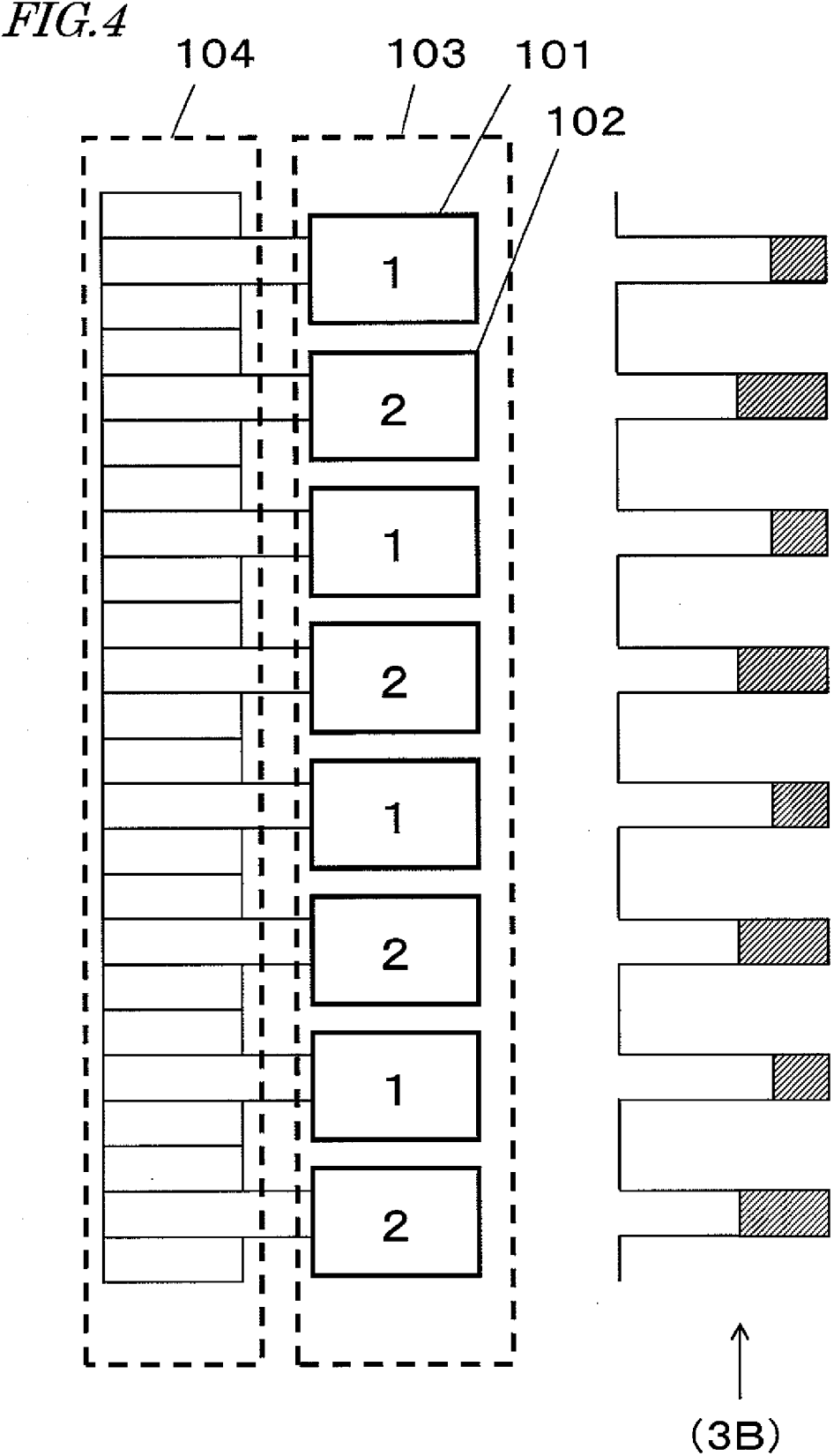
FIG. 4 is a diagram illustrating shapes of potentials in charge-coupled devices according to the present disclosure.

FIG. 4 schematically illustrates a column 103 of pixels in which pixels 101 in the first color and pixels 102 in the second color are arranged alternately, a bank 104 of charge-coupled devices that is connected to that column 103 of pixels, and the surface potential shapes of the semiconductor of the bank 104 of charge-coupled devices. In FIG. 4, (3B) indicates that the surface potentials shown in FIG. 4 are measured in the state shown in FIG. 3B. In that state, a lot of potential wells are formed in the bank 104 of charge-coupled devices. In each of those wells, the surface potential rises locally and electric charges (electrons) are accumulated at its bottom. That is to say, the hatched portions at the bottom of the potential wells shown in FIG. 4 schematically indicate the accumulated electric charges. Actually, however, electric charges are accumulated around the surface of a semiconductor. Thus, these potential shapes represent potential levels at the surface of the semiconductor, not deep inside of it.

Figure 5:
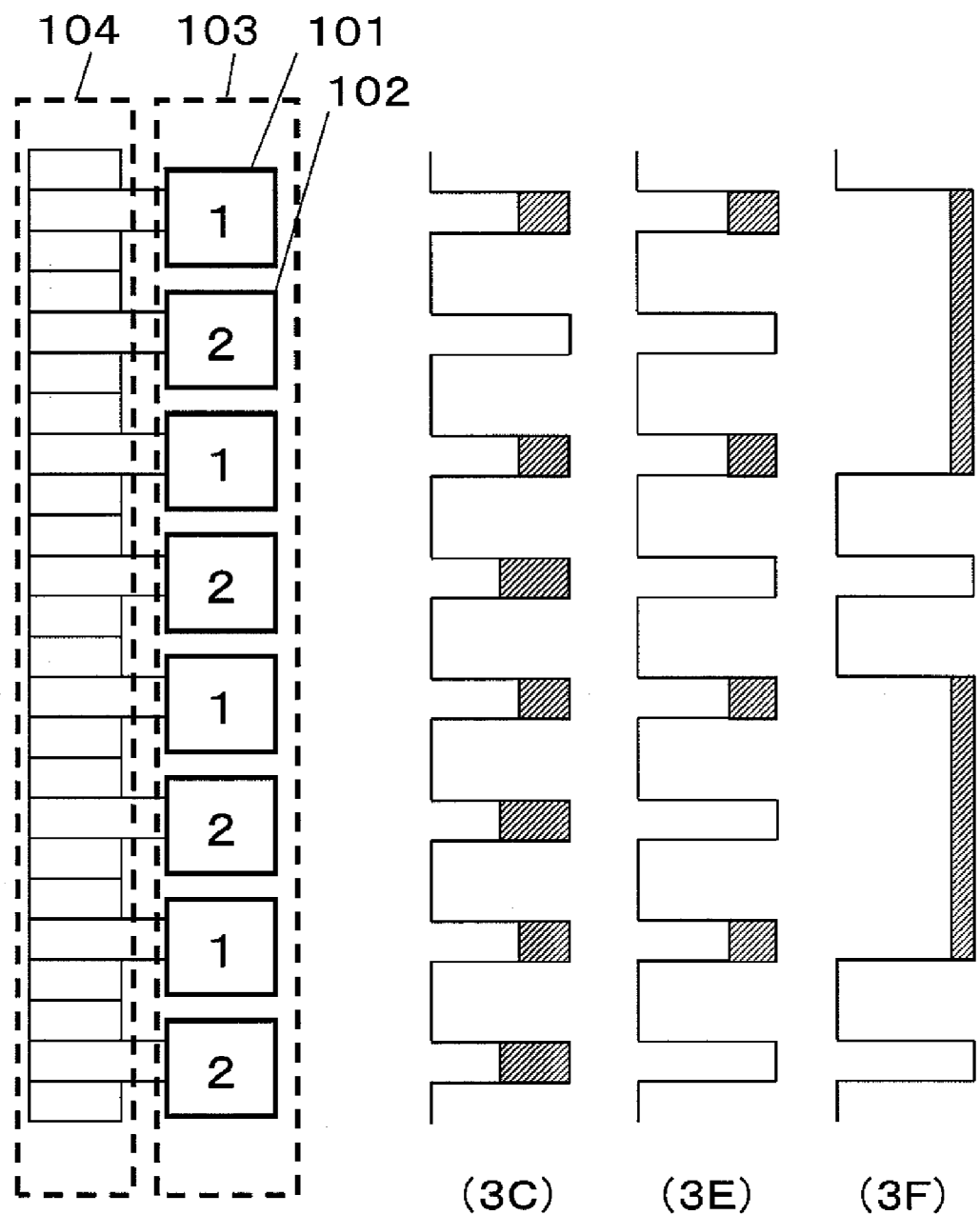
FIG. 5 is a diagram illustrating other shapes of potentials in charge-coupled devices according to the present disclosure.

In the states shown in FIGS. 3C, 3E and 3F described above, potentials, of which the shapes are schematically illustrated in FIG. 5, are produced at the surface of the semiconductor of the bank 104 of charge-coupled devices, and their accumulation state changes with the transition of the states. Specifically, the waveforms identified by (3C), (3E) and (3F) shown in FIG. 5 indicate the potentials at the surface of the semiconductor in the states shown in FIGS. 3C, 3E and 3F. Specifically, in the (3C) state shown in FIG. 5, the electric charge that has been provided by the pixel 102 at the uppermost part of FIG. 5 has been removed from the bank 104 of charge-coupled devices. On the other hand, in the (3E) state shown in FIG. 5, the electric charges that have been provided by pixels 102 in the second color have all been removed from the bank 104 of charge-coupled devices. And in the state (3F) shown in FIG. 5, the electric charges that have been provided by two pixels 101, which are adjacent to each other as pixels in the first color, are mixed together in the bank 104 of charge-coupled devices and the quantities of those electric charges accumulated are added together. In this description, to mix together electric charges that have been provided by multiple pixels will be referred to herein as "pixel addition".

As described above, according to the present disclosure, electric charges are extracted from pixels via the bank 104 of charge-coupled devices that runs in the first direction. That is why those electric charges can be extracted at the same time from multiple pixels that are arranged in the first direction. As a result, the lag to be caused between a point in time when a pixel signal is read from an upper part of the image capturing plane and a point in time when a pixel signal is read from a lower part thereof, which is a problem with the known CMOS image sensor, can be eliminated.

In addition, according to the present disclosure, the electric charges that have been produced by respective pixels (i.e., photodiodes) within the image capturing plane are once transferred to the bank 104 of charge-coupled devices. After that, the electric charges that are stored in the bank 104 of charge-coupled devices are detected by the charge sensing devices 106A and 106B and extracted through the output signal line that runs in the first direction. That is to say, even without getting the electric charges transferred in one direction by the bank 104 of charge-coupled devices, electric charges can also be extracted from a pixel at any arbitrary location in the first direction. In this respect, the present disclosure has the same advantage as what is achieved by reading a pixel signal using the CMOS image sensor and yet can overcome the problem with the known CCD image sensor.

In addition, according to the present disclosure, the electric charges that have been obtained from multiple pixels in the same color, which are adjacent to each other in the first direction, can be easily mixed together in the bank 104 of charge-coupled devices and the pixel addition can be carried out easily.

In embodiments of the present invention, electric charges that have been obtained from multiple pixels in the same color, which are adjacent to each other in the second direction, can also be mixed together and the pixel addition can also be carried out. Such pixel addition may be carried out with either a known binning circuit or horizontal bank of charge-coupled devices.

Hereinafter, embodiments of the present invention will be described with reference to the accompanying drawings.

(Embodiment 1)

Figure 6:
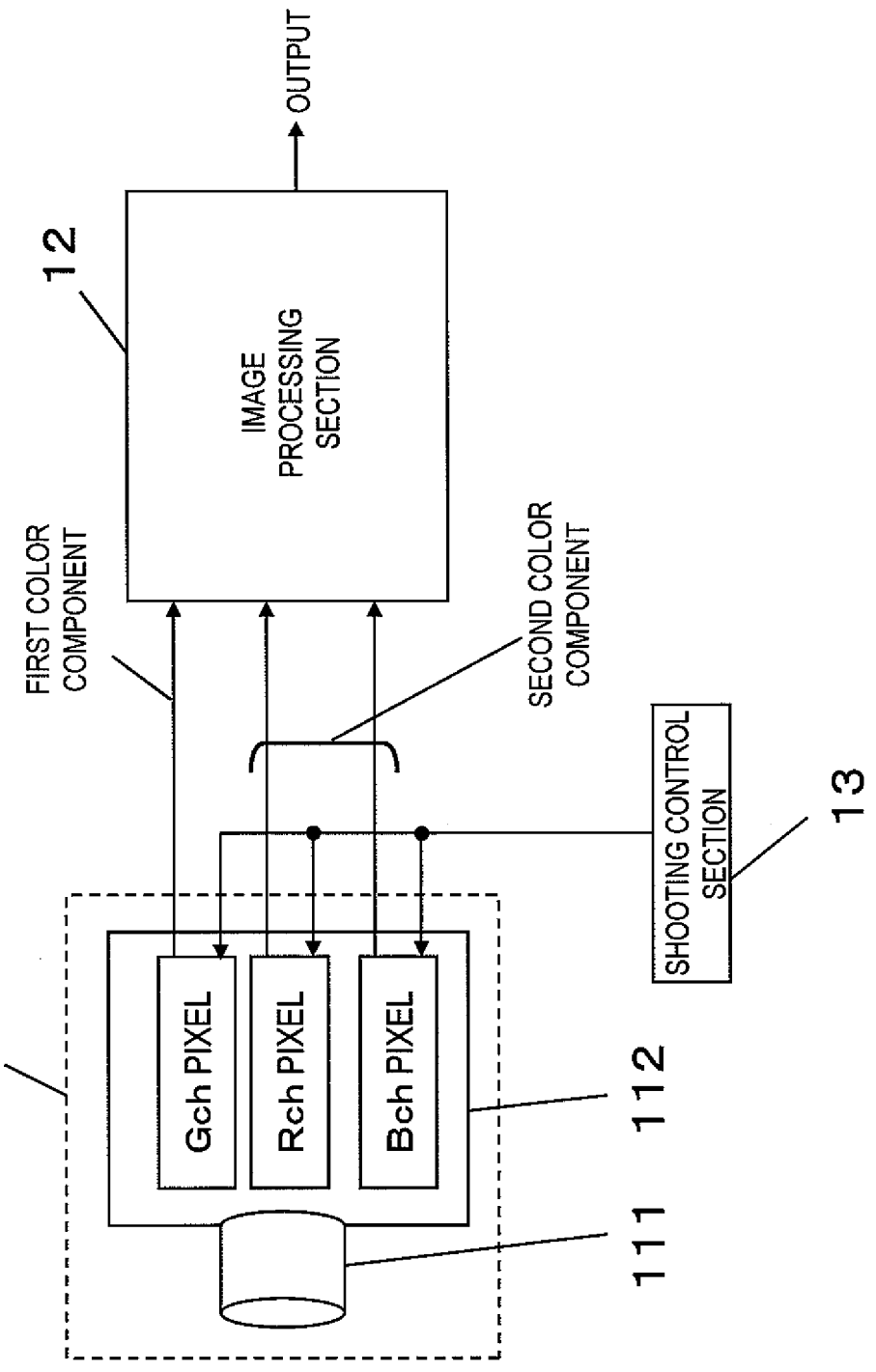
FIG. 6 is a block diagram illustrating a configuration for an image capture device as a first embodiment of the present disclosure.

FIG. 6 illustrates a configuration for an image capture device as a first embodiment of the present invention.

An image capture device according to this embodiment includes an image capturing section 11, an image processing section 12 and a shooting control section 13. The image capturing section 11 captures color R (red), G (green) and B (blue) components of the same scene. The image processing section 12 processes the output images of the image capturing section 11, thereby generating a high-resolution, high-frame-rate color output image. The shooting control section 13 controls the image capturing operation performed by the image capturing section 11.

Hereinafter, it will be described in detail exactly how these sections of the image capture device operate.

The image capturing section 11 is made up of a lens 111 and an image sensor 112. The lens 111 produces a subject image on the field of the image sensor 112, which may be a single-panel color image sensor that has R, G and B pixels on the image capturing plane. As to each of the R, G and B components of the color image of the same scene, the image sensor 112 can photoelectrically convert the intensity of the incoming light into an electrical signal. According to this embodiment, the first color component is set to be a combination of R and B components and the second color component is set to be a G component.

The first color component image is captured on an image capturing condition including a short exposure and a high frame rate. In this description, the "high frame rate" may fall within the range of 30 frames per second (fps) to 60 fps, for example. And the "short exposure" is an exposure process to be performed for at most the upper limit of one frame period (e.g., one-thirtieth to one-sixtieth second according to this embodiment) to be determined by the frame rate.

On the other hand, the second color component image is captured on an image capturing condition including a long exposure and a low frame rate. In this description, the "low frame rate" may be several to twenty times as low as the frame rate for the first color component. On the other hand, the "long exposure" has its upper limit defined as one frame period to be determined by that frame rate and is longer than the "short exposure" described above.

It should be noted that the "short exposure", "long exposure", "high frame rate" and "low frame rate" described above just have relative meanings in this description. That is to say, the exposure process time for the first color component of the color image just needs to be shorter than that for the second color component and the frame rate of the first color component just needs to be higher than that for the second color component. And neither the exposure process time nor the frame rate has to fall within the numerical value range described above.

The image processing section 12 generates a high-resolution, high-frame-rate output color image based on the first color component image that has been captured by the image capturing section 11 with a high resolution and at a low frame rate and the second color component image that has been captured by the image capturing section 11 with a low resolution and at a high frame rate.

The shooting control section 13 controls the operation of the image sensor 112 in the image capturing section 11. Specifically, the shooting control section 13 has the ability to supply a signal that defines independent reading timings with respect to the first and second color components (which will be referred to herein as "a read signal"), a signal that controls the pixel addition operation, and a signal that controls the vertical and horizontal transfers of the pixel signal to the image sensor 112. Those control signals will be described in detail later.

The image processing section 12 could be housed in the same housing as the image capturing section 11 and provided as an image capture device with the integrated function of image capturing and processing. Alternatively, the image processing section 12 could also be provided separately from the image capturing section 11, receive an image signal that has been transmitted either through a line or wirelessly from the image capturing section 11, and perform image processing using a different piece of hardware from the image capturing section 11.

Figure 7:
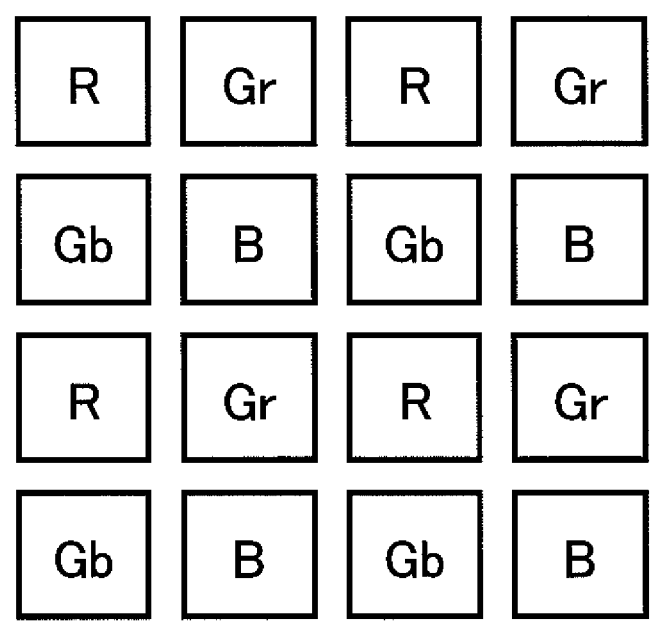
FIG. 7 is a diagram illustrating a pixel arrangement in an image sensor according to the present disclosure.

FIG. 7 illustrates an arrangement of pixels on the image sensor 112. In FIG. 7, the sign R represents a pixel that detects the intensity of the R (red) component of the incoming light, the sign B represents a pixel that detects the intensity of the B (blue) component of the incoming light, and the signs Gr and Gb represent a pixel that detects the intensity of the G (green) component of the incoming light. In the image sensor of this embodiment, rows in which R and G pixels are alternately arranged horizontally alternate vertically with rows in which G and B pixels are alternately arranged horizontally. In this description, the G pixels that are arranged horizontally alternately with the R pixels will be referred to herein as "Gr pixels", and the G pixels that are arranged horizontally alternately with the B pixels will be referred to herein as "Gb pixels". The signs Gr and Gb shown in FIG. 6 mean the same as what has just been described.

According to this embodiment, two vertically or horizontally adjacent R pixels are subjected to the pixel addition, so are two vertically or horizontally adjacent B pixels.

Figure 8:
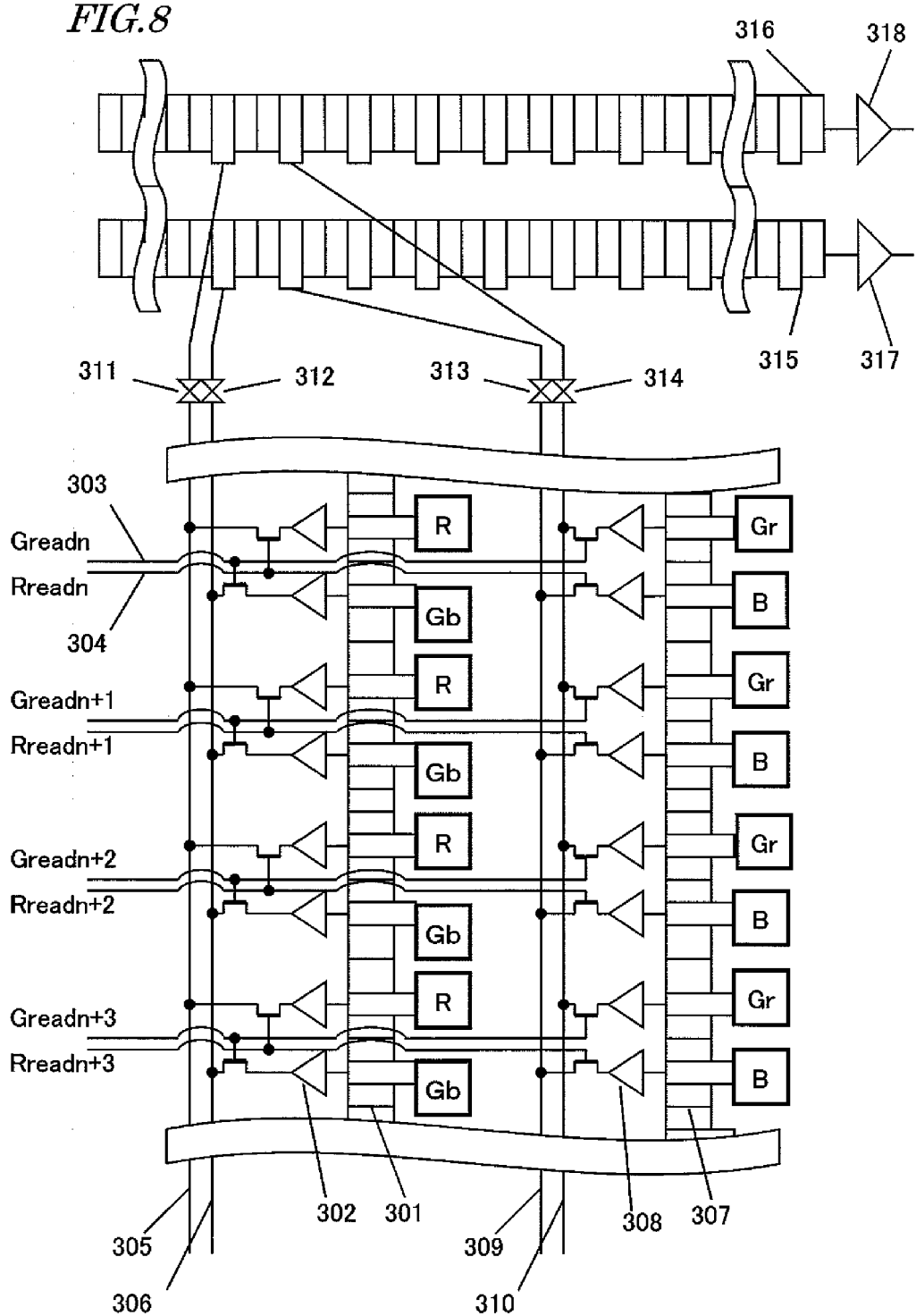
FIG. 8 is a diagram illustrating a configuration for pixels and peripheral circuits in an image sensor according to the first embodiment of the present invention.

FIG. 8 illustrates a detailed configuration for a portion of the image sensor 112 according to this embodiment. In FIG. 8, the signs R, B, Gr and Gb represent pixels that photoelectrically convert the R, B and G components of the light that has been incident on the image sensor.

In the bank 301 of charge-coupled devices shown in FIG. 8, three charge-coupled devices are provided for each pixel so as to extract the electric charges that have been stored in the R and Gb pixels and vertically add them together. Each of those charge-coupled devices has an MOS capacitor structure, which has an electrode to be supplied with an independent potential by another charge-coupled device.

A charge sensing amplifier 302 transforms the electric charges that are stored in the charge-coupled devices that are connected to the R and Gb pixels into an electrical signal in the form of a voltage. A read signal line 303 transmits Gr and Gb pixel read signals, while a read signal line 304 transmits R and B pixel read signals. The signal lines 303 and 304 are connected to the gate of a switch, which is provided for the output of each charge sensing amplifier. By supplying an H level signal to these signal lines, the pixel output that has been transformed into the electrical signal by the charge sensing amplifier is read. Output signal lines 305 and 306 transmit the R and Gb pixel output signals, which have been read in this manner, to a horizontal transfer section, which is arranged at the upper end of the image sensor.

Another bank 307 of charge-coupled devices is comprised of the same number of charge-coupled devices as the bank 301 of charge-coupled devices, and extracts the electric charges that have been stored in the B and Gr pixels and adds them together vertically. A charge sensing amplifier 308 transforms the electric charges that are stored in the charge-coupled devices connected to the R and Gb pixels into an electrical signal in the form of a voltage. Output signal lines 309 and 310 transmit the B and Gr pixel output signals, which have been read in this manner, to a horizontal transfer section, which is arranged at the upper end of the image sensor. Transfer gates 311 and 312 pass the R and Gb pixel output signals, which have been supplied from the charge sensing amplifier 302, to a horizontal transfer path 315. On the other hand, transfer gates 313 and 314 transform the B and Gr pixel output signals, which have been supplied from the charge sensing amplifier 308, into electric charges again and pass them to another horizontal transfer path 316.

The horizontal transfer path 316 is comprised of multiple sets of charge-coupled devices, each set of which provides three charge-coupled devices for an associated pixel, horizontally adds together and transfers the R and Gr pixel output signals that have been transformed into electric charges by the transfer gates 311 and 314 and then outputs them to a device outside of the image sensor 112. On the other hand, the horizontal transfer path 315 is comprised of the same number of charge-coupled devices as the horizontal transfer path 316 and horizontally adds together and transfers the B and Gb pixel output signals that have been transformed into electric charges by the transfer gates 312 and 313 and then outputs them to a device outside of the image sensor 112. Horizontal output charge sensing amplifiers 317 and 318 are arranged at the terminals of the horizontal transfer paths 315 and 316, respectively, and transform the electric charges that have reached the respective ends of those transfer paths into electrical signals.

In this example, signals that are supplied to read signal lines 303 and 304 change from one row of pixels to another on the image capturing plane. As shown in FIG. 8, the same read signal Rreadn is supplied to an $n^{th}$ set of R and B pixels as counted from the top of the image capturing plane and a read signal Greadn is supplied to the $n^{th}$ set of Gr and Gb pixels. And Rreadn+1 and Greadn+1 are respectively supplied to the $(n+1)^{th}$ set of R and B pixels and the $(n+1)^{th}$ set of Gr and Gb pixels.

The transfer gates 313 and 314 of this embodiment may be known ones such as what is disclosed in Patent Document No. 4.

In the example shown in FIG. 8, illustrated are only two vertical columns of pixels and eight horizontal rows of pixels. However, the numbers of vertical columns and horizontal rows of pixels that are actually arranged are as many as the number of pixels of the image sensor. Thus, this arrangement pattern is actually repeated both vertically and horizontally.

Also, in the example illustrated in FIG. 8, the horizontal transfer paths 315 and 316 are arranged over of the pixel arrangement section. Actually, however, it is not always necessary to adopt such an arrangement. Alternatively, the horizontal transfer paths 315 and 316 may also be arranged under the array of pixels. Still alternatively, one of the horizontal transfer paths 315 and 316 may be arranged over the array of pixels and the other may be arranged under the array.

Figure 9:
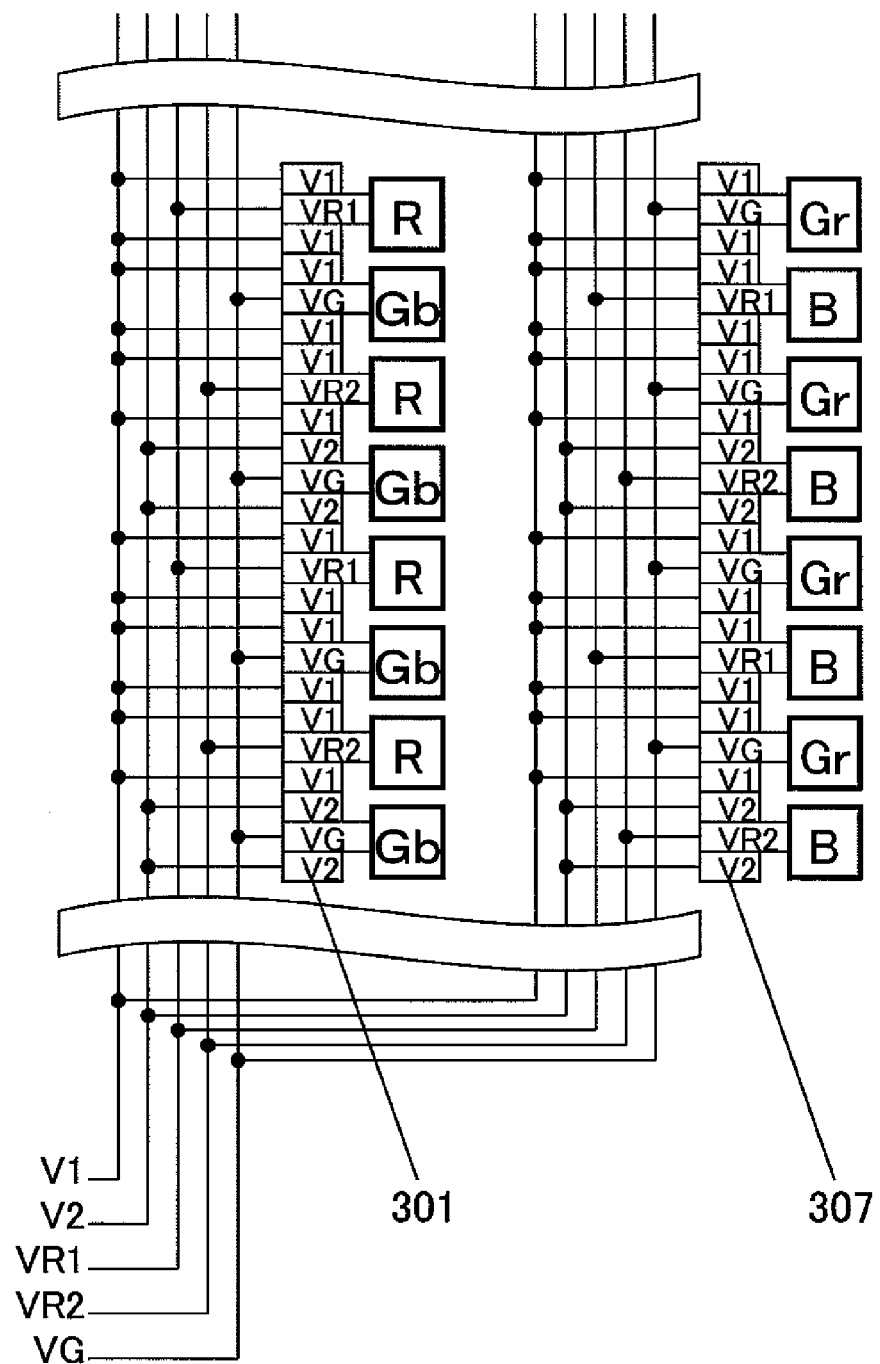
FIG. 9 is a list of signals supplied to respective charge-coupled devices that form the CCD banks in the image sensor of the first embodiment of the present invention.

FIG. 9 shows a list of signals supplied to the respective charge-coupled devices that form the banks 301 and 307 of charge-coupled devices shown in FIG. 8. In FIG. 9, illustration of the charge sensing amplifiers 302 and 308, the read signal lines 303 and 304 and other members shown in FIG. 8 is omitted. Actually, the charge sensing amplifiers 302 and 308 shown in FIG. 8 and the drive signal line shown in FIG. 9 are both connected to each of the charge-coupled devices that form these banks 301 and 307 of charge-coupled devices.

As shown in FIG. 9, according to this preferred embodiment, six different kinds of control signals V1, V2, V3, VR1, VR2 and VG are used to drive the charge-coupled devices that form the bank 301 of charge-coupled devices. Among these signals, VR1, VR2 and VG have four values that are the value of a voltage to be applied to extract the electric charges stored in each pixel to its associated charge-coupled device (which will be referred to herein as a "charge extraction voltage"), the value of a voltage to be applied to transfer the electric charges on the bank of charge-coupled devices (which will be referred to herein as a "charge transfer voltage"), the value of a voltage that is somewhat higher than the charge transfer voltage and that is applied to store the electric charges (which will be referred to herein as a "charge storage voltage") and a voltage corresponding to level L (which may be 0 V, for example). On the other hand, V1, V2 and V3 have two values that are the charge transfer voltage and the level L. According to this embodiment, the charge extraction voltage is higher than the charge transfer voltage. For example, the charge extraction voltage may be 5 V and the charge transfer voltage may be 2 V. The charge storage voltage has an intermediate value between the charge extraction voltage and the charge transfer voltage and may be 3.5 V, for example.

According to this embodiment, R and B pixel signals are supposed to be read simultaneously and Gr and Gb pixel signals are also supposed to be read simultaneously. That is why the drive signal supplied to the bank 307 of charge-coupled devices, to which B and Gr pixels are connected, is supposed to be the same as the drive signal supplied to the bank 301 of charge-coupled devices. Specifically, the charge-coupled devices in the bank 307, to which the B pixels are connected, is supplied with the same drive signal as what is supplied to the charge-coupled devices in the bank 301, to which the R pixels are connected. The charge-coupled devices in the bank 307, to which the Gr pixels are connected, is supplied with the same drive signal as what is supplied to the charge-coupled devices in the bank 301, to which the Gb pixels are connected.

According to the present disclosure, the G pixel signal representing the first color component is output at a lower frame rate than the R and B pixel signals representing the second color component. Specifically, R and B pixel signals are read every frame but G pixel signal is read every few frames (e.g., every four frames). In a frame in which the G pixel signal is not read, the G pixel continues to store the electric charge.

Figure 10:
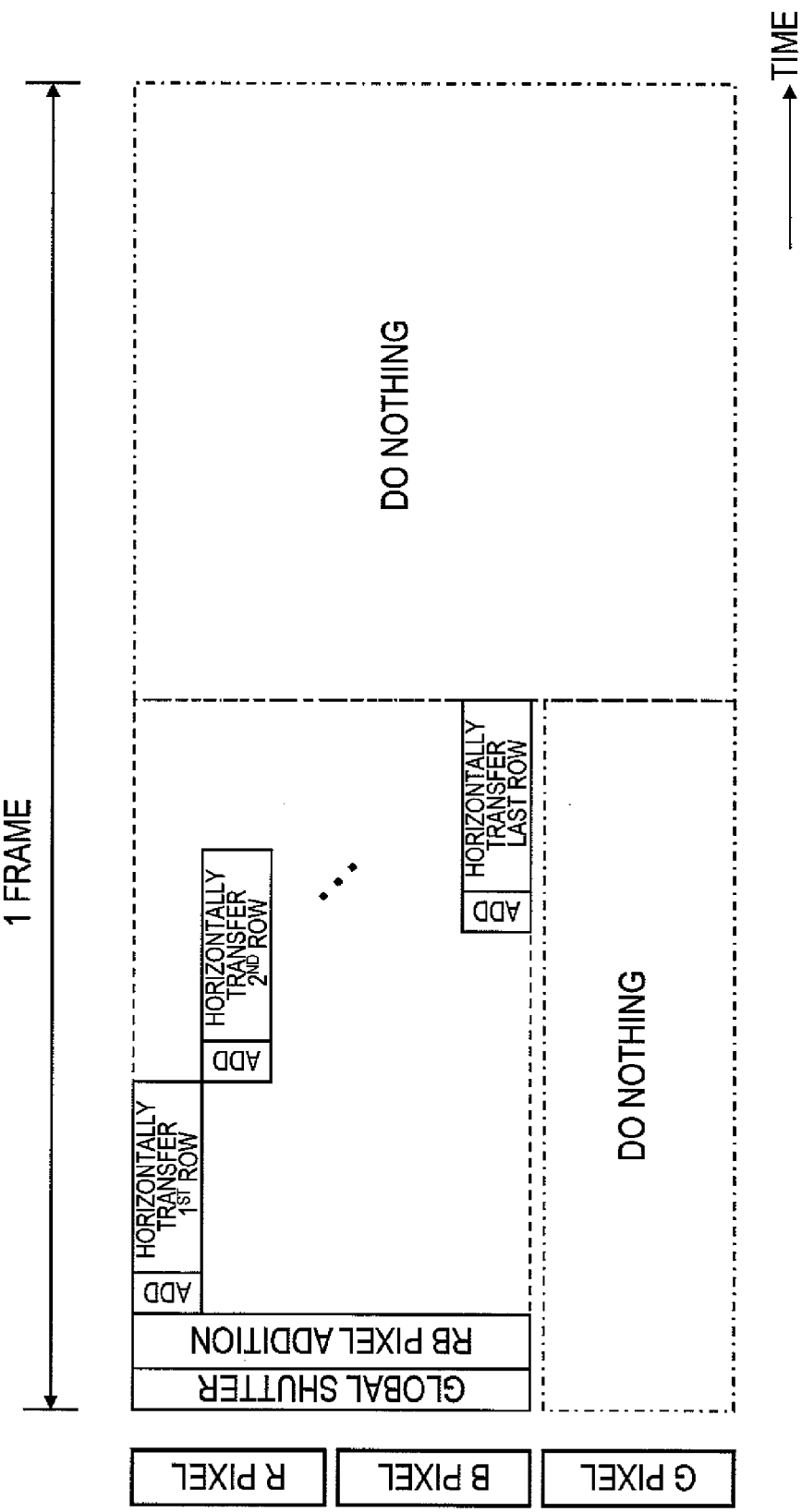
FIG. 10 shows a read sequence for a frame in which only R and B pixel signals are read according to the first embodiment of the present invention.

FIG. 10 shows a pixel signal reading flow for one frame in which only R and B pixel signals are read. Since no G pixel signals area read, no operations are performed at all on G pixels. As for the R and B pixels, first of all, a read operation is performed on almost every pixel (which will be referred to herein as a "global shutter operation") and a vertical pixel addition operation is carried out. In this description, to "read a pixel signal" means applying signals with the charge extraction voltage described above (i.e., VR1 and VR2 shown in FIG. 9) to the charge-coupled devices in the banks 301 and 307 of charge-coupled devices that are connected to respective R and B pixels, thereby transferring the electric charges that are stored in the pixels to the charge-coupled devices. Next, an H-level read signal is sequentially supplied to the read signal lines 304, beginning with the horizontal scan line for the first row, thereby outputting R and B pixel signals for one row from the charge sensing amplifier 302 or 308. Thereafter, the pixels' electric charges that have been added together are stored in the charge-coupled devices in the horizontal transfer path 315 or 316 through the transfer gate 311 or 313, the pixel values are added together horizontally, and then the electric charges are transferred. Finally, the electric charges that have been transferred are transformed into an electrical signal by the horizontal output charge sensing amplifier 317 or 318 that is located at the end of the horizontal transfer path, and then pixel signals are output to a device outside of the image sensor 112 one row after another. The vertical and horizontal pixel addition operations will be described in detail later.

Figure 11:
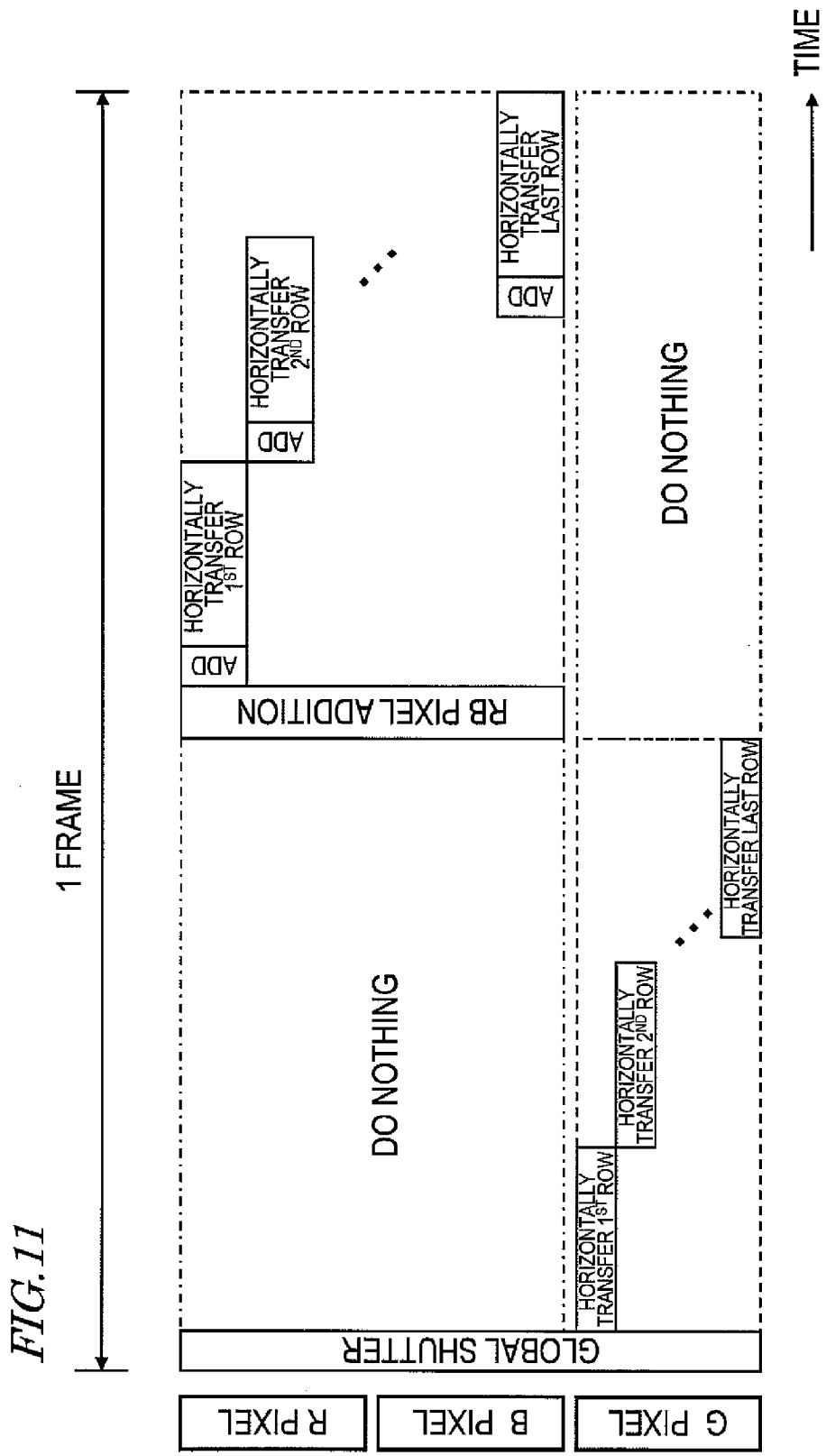
FIG. 11 shows a read sequence for a frame in which the RGB pixel signals are all read according to the first embodiment of the present invention.

FIG. 11 shows a pixel signal reading flow for one frame in which R, G and B pixel signals are all read. In that frame, first of all, a global shutter operation is performed on all of the R, G and B pixels. That is to say, a signal with the charge extraction voltage is supplied to every drive signal VR1, VR2, VG shown in FIG. 9. After that, while continuously supplying that signal with the charge extraction voltage to the drive signals (i.e., VR1 and VR2 shown in FIG. 9) for charge-coupled devices that are connected to the R and B pixels, an H-level read signal is sequentially supplied to the read signal lines 304, beginning with the horizontal scan line for the first row, with respect to only the Gb and Gr pixels, thereby outputting Gr and Gb pixel signals for one row through the charge sensing amplifier 302 or 308. Thereafter, the electric charges of the pixels are stored in the charge-coupled devices in the horizontal transfer path 315 or 316 through the transfer gate 312 or 314 and then transferred horizontally. Those electric charges transferred are then transformed into an electrical signal by the horizontal output charge sensing amplifier 317 or 318 that is located at the terminal and pixel signals are output to a device outside of the image sensor 112 one row after another. When the Gr and Gb pixel signals are output completely, the R and B pixel signals are added together and the sum is output. The R and B pixel signals are output by the same method as what has already been described with reference to FIG. 10.

Figure 12:
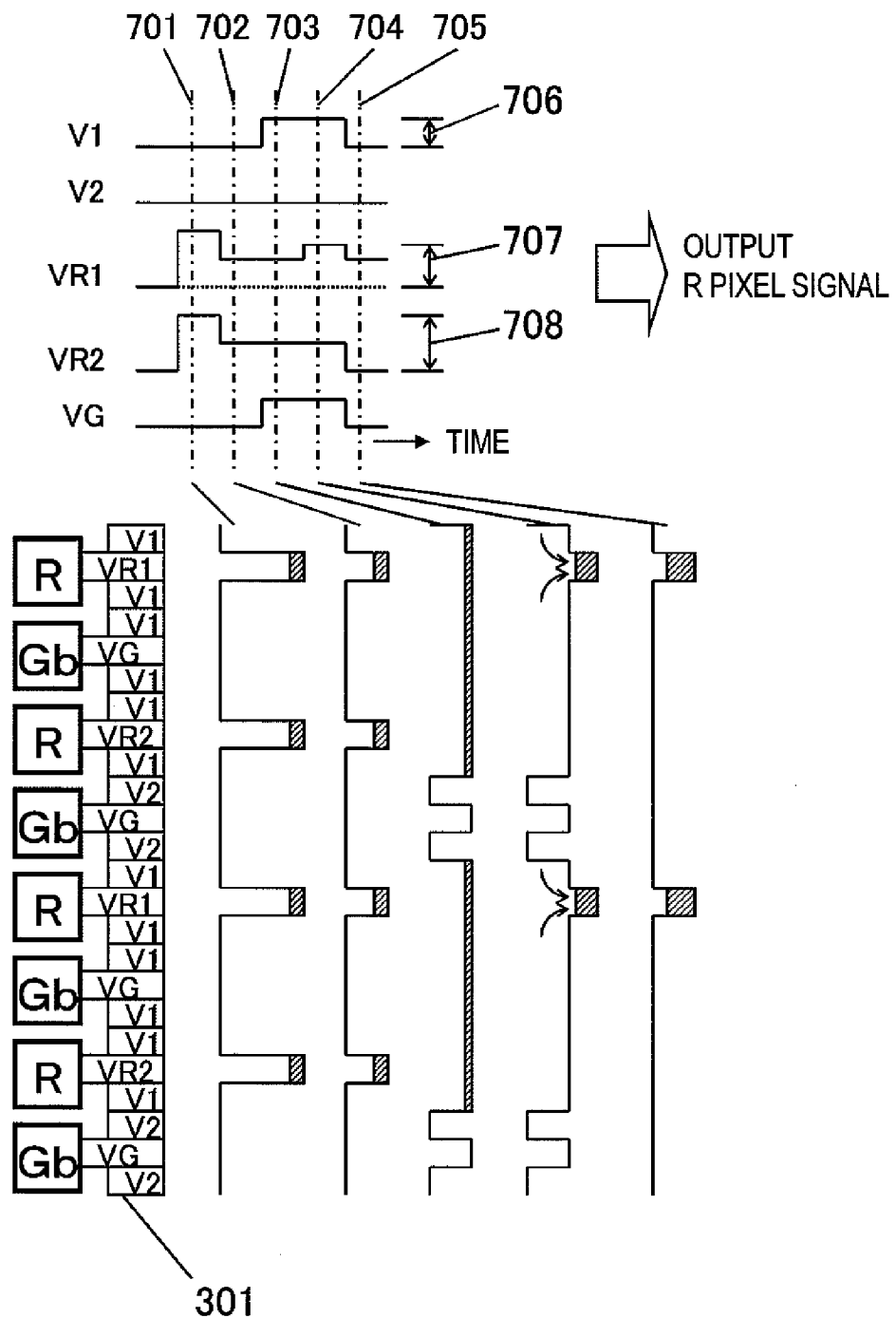
FIG. 12 shows the waveforms of control signals and the distribution of potentials at respective charge-coupled devices when R pixel signals are vertically added together in the first embodiment of the present invention.

FIG. 12 shows a procedure in which R and B pixel signals are added together vertically. The upper half of FIG. 12 is a timing diagram showing the waveforms of some of the signals to be supplied to the charge-coupled devices in the banks 301 and 307 of charge-coupled devices that contribute to performing the pixel addition. On the other hand, the lower half of FIG. 12 shows the potential distributions in the charge-coupled devices at respective points in time that correspond to the timings shown in the upper half. FIG. 12 shows how to add R pixel signals together on the bank 301 of charge-coupled devices. Although not shown, the B pixel signals are also added together in the same way on the bank 307 of charge-coupled devices. In FIG. 12, the voltage levels identified by the reference numerals 706, 707 and 708 correspond to the charge transfer voltage of the charge-coupled devices, the charge storage voltage, and the charge extraction voltage, respectively.

Hereinafter, it will be described in detail exactly how this image capture device operates at the respective points in time shown in FIG. 12. First of all, at a point in time identified by the reference numeral 701 (which will be simply referred to herein as "at a point in time 701" for convenience sake), a charge extraction voltage is applied to a charge-coupled device that is connected to an R pixel, thereby performing a global shutter operation on that R pixel. At this point in time, the amplitude of the signals VR1 and VR2 agrees with the charge extraction voltage, and the potential at the location of each charge-coupled device forms a well, of which the depth corresponds to the charge extraction voltage. Next, at a point in time 702, the voltage of the signals VR1 and VR2 is decreased to the level of the charge transfer voltage and the depth of the potential well is reduced to get ready for the pixel addition operation to be performed at the next point in time 703. Then, at the point in time 703, the charge transfer voltage is supplied to the signals V1, VR1, VR2 and VG, thereby forming a single broad potential well at the location of the charge-coupled device to which those signals are supplied. And the pixels' electric charges that have been stored at the location of the charge-coupled devices to which the signals VR1 and VR2 were supplied at the time 702 are shared in that broad well. As a result, the pixels' electric charges that have been stored at the positions of VR1 and VR2 get shared in the single well. Consequently, electric charges are obtained by adding two pixel signals together. Thereafter, at a point in time 704, the charge storage voltage is applied to VR1, thereby gathering the pixels' electric charges that have been added together and stored in the broad well at a single charge-coupled device (i.e., the charge-coupled device for VR1). And at a point in time 705, an L-level drive signal is applied to every charge-coupled device but the one supplied with the signal VR1, thereby finishing the pixels' electric charge addition operation.

The pixel signals' electric charges that have been added in this manner are transformed into an electrical signal by the charge sensing amplifier 302 at the corresponding location. And when an H level signal is supplied to the read signal line 303 at the corresponding location, that electrical signal is transmitted to the horizontal transfer path 315 by way of the transfer gate 311.

In the example shown in FIG. 12, after the R pixels' electric charges that have been extracted onto the charge-coupled devices for VR1 and VR2 are added together, the sum of the electric charges is gathered at the charge-coupled device for VR1. However, according to this embodiment, this procedure does not always have to be adopted. Alternatively, the sum of those electric charges may also be gathered at the charge-coupled device for VR2, for example.

Next, it will be described with reference to FIGS. 13, 14 and 15 exactly how to output those pixel signals that have been added together and transferred horizontally.

Figure 13:
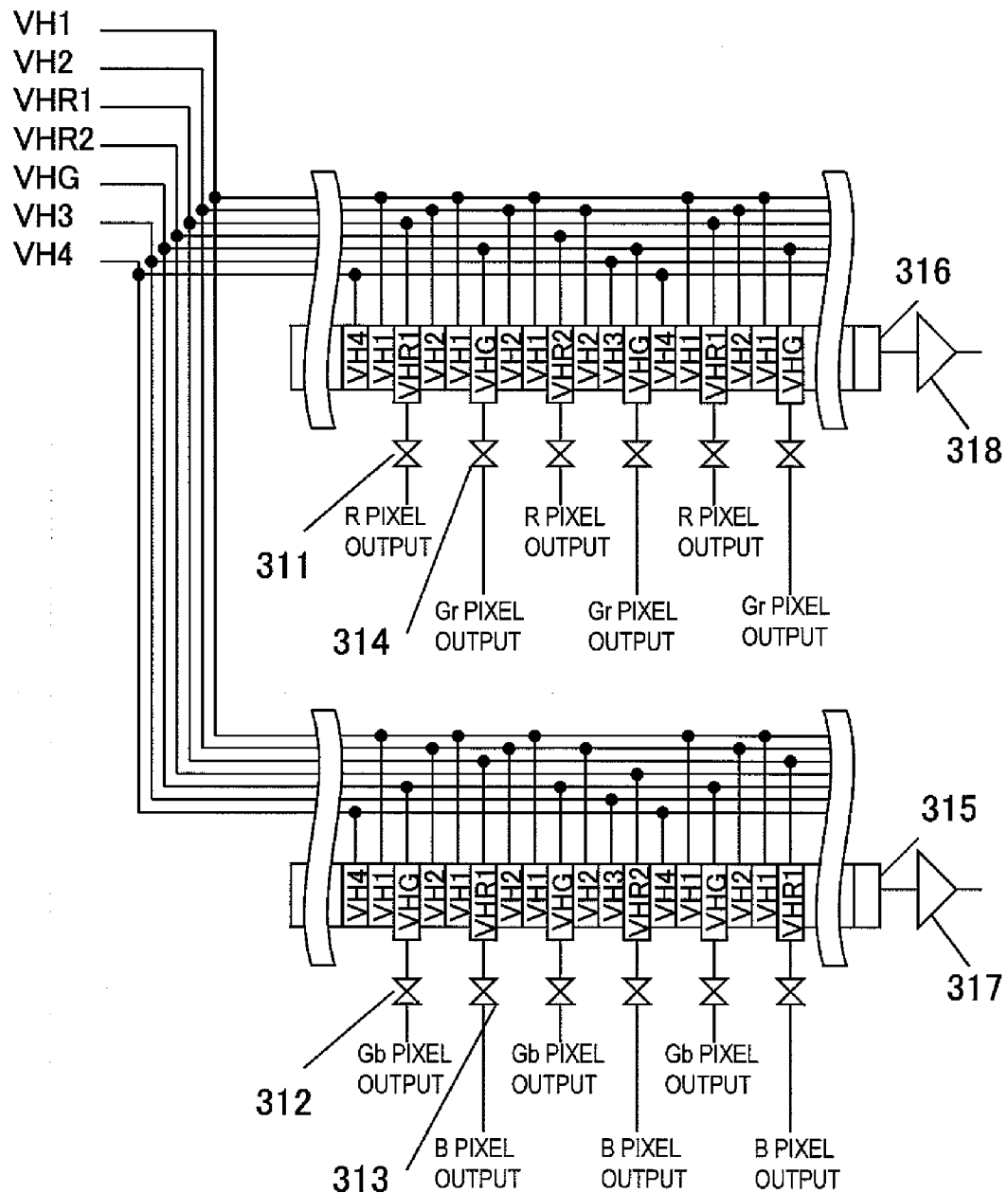
FIG. 13 is a list of signals supplied to respective charge-coupled devices on a horizontal transfer path of the image sensor of the first embodiment of the present invention.

FIG. 13 illustrates a specific configuration for the horizontal transfer paths 315 and 316. As shown in FIG. 13, B pixel output signal lines 309 (see FIG. 8) and Gb pixel output signal lines 306 (see FIG. 8, too) are horizontally alternately connected to the charge-coupled devices in the horizontal transfer path 315 via the transfer gates 312 and 313. On the other hand, R pixel output signal lines 305 and Gr pixel output signal lines 310 are alternately connected to the charge-coupled devices in the horizontal transfer path 316 via the transfer gates 311 and 314. Also, the respective charge-coupled devices in these two horizontal transfer paths 315 and 316 are controlled with seven different kinds of drive signals VH1, VH2, VH3, VH4, VHR1, VHR2 and VHG.

The voltage signal on an output signal line may be subjected to a voltage-electric charge conversion by a capacitor, for example, and then supplied to the respective charge-coupled devices in the horizontal transfer paths 315 and 316. Such voltage-electric charge conversion is disclosed in Non-Patent Document No. 2, for example.

Figure 14:
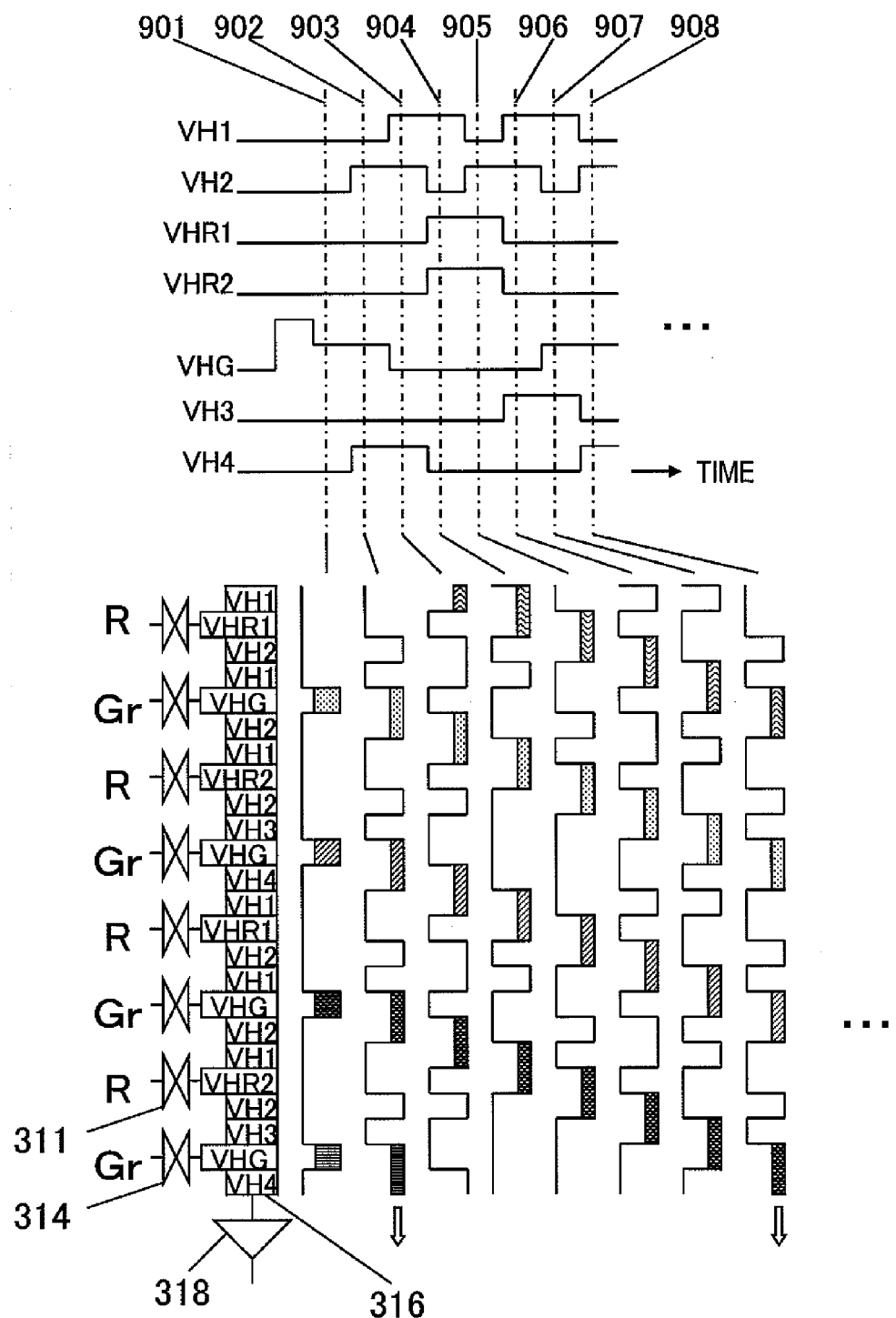
FIG. 14 shows the waveforms of control signals and the distribution of potentials at respective charge-coupled devices when G pixel signals are horizontally transferred in the first embodiment of the present invention.

FIG. 14 shows a procedure in which G pixels' electric charges are transferred horizontally. As in FIG. 12, a timing diagram showing the waveforms of the seven different kinds of drive signals and the potential distributions at the respective points in time are also shown in FIG. 14. Since no pixel addition operation is performed on the G pixels, the G pixels' electric charges start to be transferred no sooner than those electric charges are output onto the horizontal transfer path via the transfer gate 312 or 313.

As shown in FIG. 14, the G pixels' electric charges are transferred one column after another on a unit time basis (where the "unit time" may be one period of a clock pulse to be applied to control the image sensor 112). And all of those G pixels' electric charges are output every six unit times. Also, as can be seen from the pulse patterns and potential distributions at the points in time 902 and 908 shown in FIG. 14, the same state recurs at a regular interval of six unit times and the same state transition is made over and over again after that. And when the electric charges of all G pixels (including Gr and Gb pixels) that are arranged horizontally are output through the horizontal transfer paths 316 and 315 as described above, the electric charge of every G pixel will be horizontally transferred completely.

Figure 15:
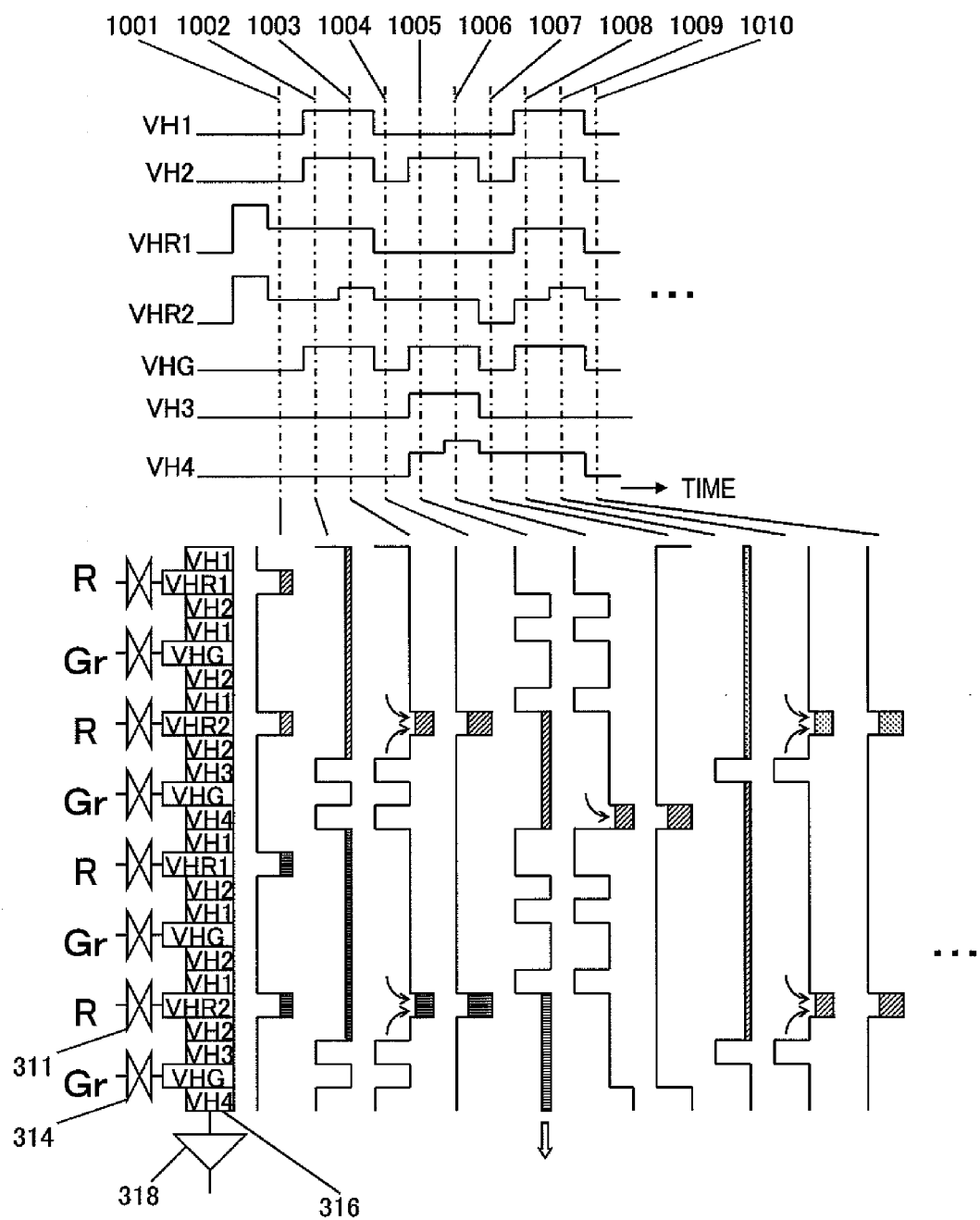
FIG. 15 shows the waveforms of control signals and the distribution of potentials at respective charge-coupled devices when R pixel signals are horizontally added together and transferred in the first embodiment of the present invention.

FIG. 15 shows a procedure in which the electric charges of R and B pixels are horizontally added together and transferred. Although FIG. 15 shows only how the electric charges of the R pixels are added together on the horizontal transfer path 316, the electric charges of the B pixels are also added together in quite the same way on the horizontal transfer path 315.

Now it will be described with reference to FIG. 15 exactly how to carry out the horizontal addition and transfer operations.

In FIG. 15, the electric charges of the R pixels have already been extracted onto the charge-coupled devices on the horizontal transfer path via the transfer gate 311 by raising the level of the signals VHR1 and VHR2 to the charge extraction voltage level, and then those electric charges are stored at the point in time identified by the reference numeral 1001 by lowering the signal level to the charge transfer voltage level. At the next point in time 1002, by raising the levels of the signals VH1, VH2 and VHG to the charge transfer voltage level, the electric charges that have been extracted with VHR1 and VHR2 are combined together. Thereafter, at the point in time 1003, with the level of the signals VH1, VH2, VHG and VHR1 maintained at the charge transfer voltage level, the level of the signal VHR2 is raised to the charge storage voltage level and the electric charges that have been added together are gathered at the charge-coupled device to which the signal VHR2 is supplied. At this point in time, the electric charges of two pixels can be horizontally added together completely.

At the next point in time 1004, the electric charges of the R pixels that have just been added at the point in time 1003 are stored at a potential level corresponding to the charge transfer voltage. From the next point in time 1005 on, the electric charges are transferred horizontally. Specifically, at that point in time 1005, not only the signal VHR2 but also the signals VH2, VH3, VH4 and VHG have their levels raised to the charge transfer voltage level. At this point in time, the electric charge of the pixel that is located closest to the terminal of the horizontal transfer path 316 (i.e., nearest to the charge sensing amplifier 318) are output to a device outside of the image sensor 112 by way of the charge sensing amplifier 317. Next, at the point in time 1006, the state at the point in time 1005 is maintained except that the level of the signal VH4 is raised to the charge storage voltage level, thereby gathering the pixel output charge that has been shared by charge-coupled devices with VH2, VHR2, VH3, VH4 and VHG at the charge-coupled device with VH4. By this point in time, the electric charge of the pixel that was located at the charge-coupled device, to which the signal VHR2 is supplied, at the previous point in time 1004, has been transferred to the charge-coupled device that supplies the signal VH4.

Next, at the point in time 1007, the potential level at which the electric charges gathered are stored is changed. And then at the point in time 1008, the level of every signal but VH3 is set to be the charge transfer voltage level. At that point in time, the electric charges of the pixel that have been added together are stored in a potential well with a very broad width as shown in FIG. 15. Next, at the point in time 1009, the electric charges that have been stored in such a broad well at the previous point in time 1008 are stored in only the charge-coupled device to which the signal VHR2 is supplied. Subsequently, at the point in time 1010, the pixels' electric charges that are stored in the charge-coupled device to which VHR2 is supplied have their potential level changed into the charge transfer voltage level. At this point in time, the values of the respective drive signals and potential distributions are the same as what used to be at the point in time 1004. From then on, the respective signals will change their levels in the same pattern as the one between the points in time 1005 and 1010 over and over again. And when the output electric charge that has been extracted from every pixel onto the horizontal transfer path 316 is transferred completely, the horizontal transfer process ends.

Figure 16:
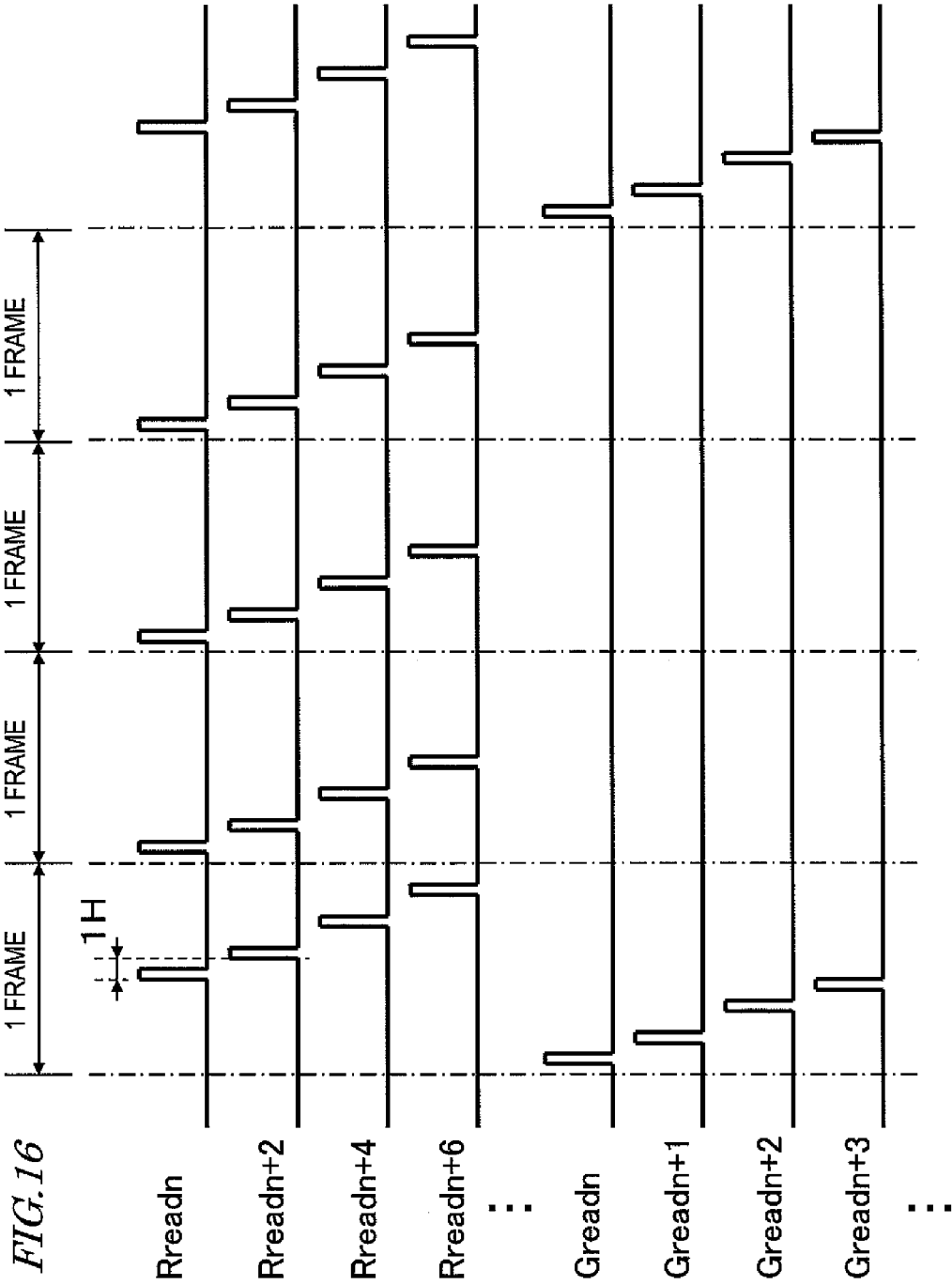
FIG. 16 is a diagram illustrating the waveforms of read signals according to the first embodiment of the present invention.

FIG. 16 shows exemplary waveforms of signals to be supplied to the read signal lines 303 and 304 shown in FIG. 8. In FIG. 16, Rreadn is the read signal that is supplied to an $n^{th}$ set of R and B pixels as counted from the top of the image capturing plane (i.e., a signal supplied to the read signal line 304) and Greadn is the read signal that is supplied to the $n^{th}$ set of Gr and Gb pixels (i.e., a signal supplied to the red signal line 303) as in FIG. 8. In the same way, Rreadn+2, Rreadn+4 and Rreadn+6 are read signals to be supplied to the $(n+2)^{th}$, $(n+4)^{th}$ and $(n+6)^{th}$ sets of R and B pixels, respectively, and Greadn+1, Greadn+2 and Greadn+3 are read signals to be supplied to the $(n+1)^{th}$, $(n+2)^{th}$ and $(n+3)^{th}$ sets of Gr and Gb pixels, respectively.

According to this embodiment, the exposure process time of G pixels is set to be four times as long as that of R and B pixels. That is to say, the read frame rate of G pixels is set to be one quarter as high as that of R and B pixels. That is why Greadn is supplied when Rreadn is supplied for every fourth time. In addition, according to this embodiment, two R pixel signals are added together vertically, so are two B pixel signals, and therefore, the vertical select signal of Rread is supplied every two columns.

It should be noted that in a frame in which all of RGB pixel signals are read, the G pixel signal is read and then the R and B pixel signals are added together and read as shown in FIG. 11. That is why even in FIG. 16, there is a time lag between a point in time when Greadn goes high and a point in time when Rreadn goes high. More specifically, after Greadn has been supplied to every G pixel and after every G pixel signal has been read, Rreadn sequentially goes high. Also, in FIG. 16, in a frame in which only R and B pixel signals are read selectively, the R and B pixel signals are read at respective points in time around the top of that frame following the example shown in FIG. 10. However, the image sensor driving method of the present disclosure does not always have to be carried out in this manner. Alternatively, even in such a frame in which only R and B pixel signals are read selectively, the R and B pixel signals may also be read in the second half of each frame as in the frame in which all of RGB pixel signals are read.

Hereinafter, it will be described with reference to FIG. 17 how the image processing section 12 may operate.

Figure 17:
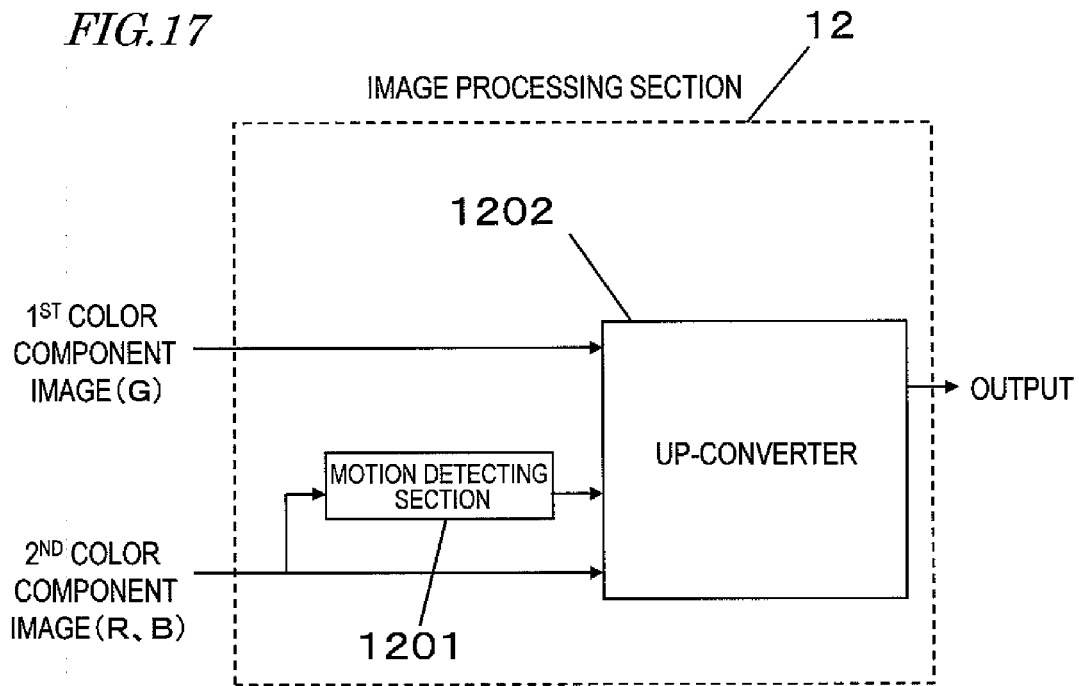
FIG. 17 is a block diagram illustrating a configuration for an image processing section according to the first embodiment of the present invention.

In FIG. 17, according to this embodiment, the image processing section includes a motion detecting section 1201 that detects the motion based on the second color component image and an up-converter 1202 that performs, at the same time, the processing of adjusting the frame rate of the first color component image to that of the second color component image and the processing of adjusting the resolution of the second color component image to that of the first color component image.

Figure 18:
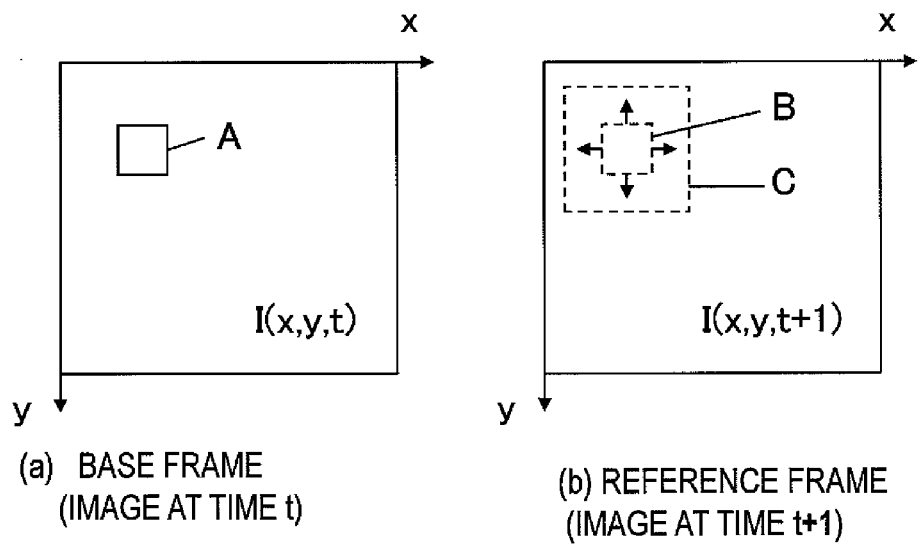
FIG. 18 illustrates generally how to perform a motion detection operation according to a third embodiment of the present invention.

The motion detecting section 201 detects a motion (as an optical flow) by using known techniques such as block matching, gradient method, and phase correlation method. Hereinafter, an exemplary method for detecting the motion automatically will be described with reference to FIG. 18.

FIGS. 18(a) and 18(b) respectively illustrate a base frame and a reference frame for use to detect a motion by block matching. Specifically, the motion detection section 1101 sets a window area A shown in FIG. 18(a) in the base frame (i.e., a $t^{th}$ picture in question, from which the motion needs to be detected), and then searches the reference frame for a pattern that is similar to the pattern inside the window area. As the reference frame, the frame that follows the base frame is often used.

The search range is usually defined to be a predetermined range (which is identified by C in FIG. 18(b)) with respect to a point B, at which the magnitude of motion is zero. Also, the degree of similarity between the patterns is estimated by calculating, as an estimate, either the sum of squared differences (SSD) represented by the following Equation (1) or the sum of absolute differences (SAD) represented by the following Equation (2):

$$SSD = \sum_{x, y \in W} (I(x+u, y+v, t+1) - I(x, y, t))^2 \quad (1)$$

$$SAD = \sum_{x, y \in W} |I(x+u, y+v, t+1) - I(x, y, t)| \quad (2)$$

In Equations (1) and (2), I (x, y, t) represents the location (x, y) in the image and the signal value of the pixel at the frame number t, and x, y ∈ means the coordinates of pixels that fall within the window area in the base frame.

The motion detecting section 1201 changes (u, v) within the search range, thereby searching for a set of (u, v) coordinates that minimizes the estimate value and defining the (u, v) coordinates to be a motion vector between the frames. And by sequentially shifting the positions of the window areas set, the motion is detected either on a pixel-by-pixel basis or on the basis of a block (which may consist of 8 pixels×8 pixels, for example).

The image processing section 1202 decomposes the first color component image both temporally and spatially based on the motion that has been estimated by the motion detecting section 1201 using Equation (1) or (2). If the first color component image is identified by $g_G$ and the second color component image is identified by $g_R$ and $g_B$, then the image with an increased resolution (which will be referred to herein as a "high-resolution image f") is obtained as f that minimizes the following Equation (3):

$$J = \|H_S H_R f - g_R\|^2 + \|H_S H_B f - g_B\|^2 + \|H_T H_G f - g_G\|^2 + \lambda_s \|Q_s f\|^2 + \lambda_m \|Q_m f\|^2 \quad (3)$$

where $g_G$ is a column vector, of which the elements are the pixels of a moving picture representing the first color component (which is G component in this embodiment), $g_R$ and $g_B$ are a column vector, of which the elements are the pixels of a moving picture representing the second color component (which is R and B components in this embodiment), f is a column vector, of which the elements are the respective pixels of all RGB components of a high-resolution moving picture with a high resolution and a high frame rate, $H_R$, $H_B$ and $H_G$ are matrices that extract pixel value elements corresponding to R, B and G pixels from f, $H_T$ is a matrix modeling how light rays are added together through a long exposure process, $H_S$ is a matrix modeling how light rays are added together by adding pixel values together, $\lambda_s$ is a weight added to a smoothness constraint, $Q_s$ is the smoothness constraint, $\lambda_m$ is a weight added to a motion constraint, and $Q_m$ is a matrix modeling the motion constraint.

The following Equations (4), (5), (6) and (7) show the details of the respective terms on the right side of Equation (3):

$$H_S H_R f(x, y, t) = \sum_{x'=0}^{1} \sum_{y'=0}^{1} H_R f(x+x', y+y', t) \quad (4)$$

$$H_T H_G f(x, y, t) = \sum_{t'=0}^{3} H_G f(x, y, t+t') \quad (5)$$

$$Q_s f(x, y, t) = 2 \cdot f(x, y, t) - f(x+1, y, t) - f(x-1, y, t) + 2 \cdot f(x, y, t) - f(x, y+1, t) - f(x, y-1, t) \quad (6)$$

$$Q_m f(x, y, t) = f(x+u(x, y, t), y+v(x, y, t), t+1) - f(x, y, t) \quad (7)$$

In these Equations (4), (5), (6) and (7), f(x, y, t), $H_S H_R$f(x, y, t), $H_R$f(x, y, t), $H_T H_G$f(x, y, t), $H_G$f(x, y, t), $Q_s$f(x, y, t) and $Q_m$f(x, y, t) are respectively f, $H_S H_R$f, $H_R$f, $H_T H_G$f, $H_G$f, $Q_s$f, and $Q_m$f elements of Equation (3) with respect to the location (x, y) and the frame number t. Even though Equation (4) describes only a mathematical equation with respect to an R pixel, quite the same expression can be made as for the B pixel by replacing $H_R$ with $H_B$ in Equation (4). Also, in Equations (6) and (7), xmax, ymax and tmax represent an x direction pixel number, a y direction pixel number and the maximum frame number, respectively. Furthermore, in Equation (7), u(x, y, t) and v(x, y, t) represent the magnitudes of motion in the x and y directions that have been estimated by the motion detecting section 1201 with respect to a pixel at the location (x, y) and with the frame number t. In this embodiment, the resolution of the second color component image is one quarter as high as that of the first color component image and the exposure process time of the first color component image is four times as long as that of the second color component image. That is why the respective pixel values of 2×2 adjacent pixels of $H_R$f are added together in Equation (7) and the respective pixel values of four frames of $H_G$f are added together in Equation (8). However, the image capture device of the present disclosure does not always have to use these values.

The up-converter 1202 obtains f that minimizes Equation (3) by the following Equation (8):

$$\frac{\partial J}{\partial f} = 2(H_S H_R)^T (H_S H_R f - g_R) + 2(H_T H_G)^T (H_T H_G f - g_G) + \\ 2(H_S H_B)^T (H_S H_B f - g_B) + 2\lambda_s Q_s^T f + 2\lambda_m Q_m^T Q_m f = 0 \quad (8)$$

As a result, the up-converter 1202 obtains f by solving the following simultaneous equation (9):

$$\{(H_S H_R)^T H_S H_R + (H_T H_G)^T H_T H_G + (H_S H_B)^T H_S H_B + \\ \lambda_s Q_s^T Q_s + \lambda_m Q_m^T Q_m\} f = (H_S H_R)^T g_R + (H_T H_G)^T g_G + \\ (H_S H_B)^T g_B \quad (9)$$

Equation (9) can be solved by adopting a known numerical value calculating method (i.e., a known method for solving a simultaneous equation) such as the conjugate gradient method or the steepest descent method.

It should be noted that the shooting control section 13 may be built in the image sensor 11 to generate the read signals and the switch control signal described above inside of the image sensor 11. Alternatively, the shooting control section 13 may also be arranged outside of the image sensor 11 as shown in FIG. 6 so as to provide the read signals and the switch control signal externally.

In the configuration of this embodiment, an on-chip micro lens may be arranged on pixels so as to further enhance the converging capability.

In the embodiment described above, the image sensor 112 is configured to capture color components in the three primary colors of R, G and B. However, in the image capture device of the present disclosure, the image sensor does not have to have such a configuration. Alternatively, the image sensor may also be configured to capture the color components in cyan (C), magenta (M), yellow (Y) and G. In that case, by arranging Y, C, M and G pixels at the respective locations of the R, B, Gr and Gb pixels shown in FIG. 7, the Y and C components can be captured in a short exposure time and the M and G components can be captured in a long exposure time.

Figure 19:
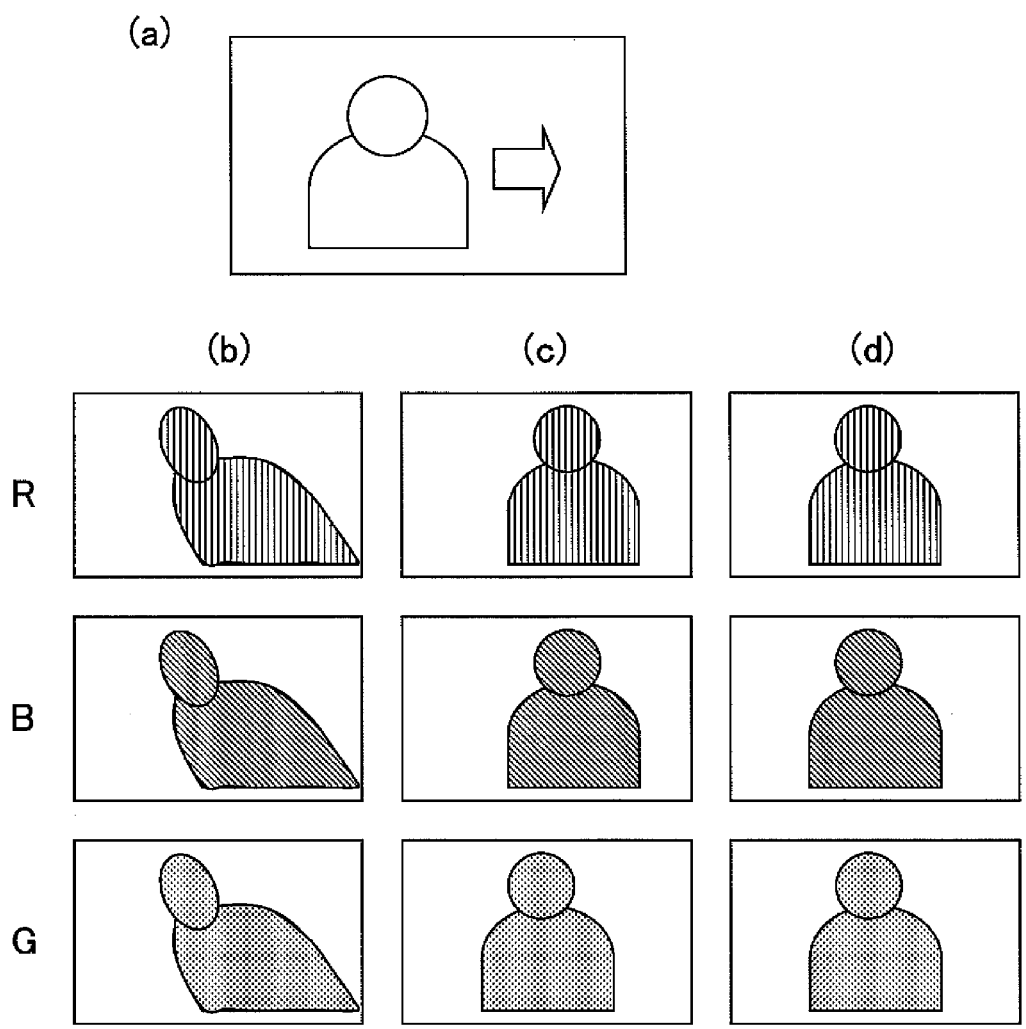
FIG. 19 illustrates what effect will be achieved by an image sensor according to the present invention.

FIG. 19 shows what effect will be achieved by using the image sensor of the present disclosure. Suppose a situation where a scene of a subject that is moving to the right as shown in portion (a) of FIG. 19 is going to be shot with a camcorder with no external shutter mechanism. Portion (b) of FIG. 19 shows what images would be shot if such a scene were captured with a camcorder in which a known CMOS image sensor is built. If that CMOS image sensor sequentially scanned the image by beginning with the uppermost horizontal scan line on the screen, then pixel signals would be read at significantly different times between the upper and lower parts of the screen. As a result, the image shot by the image sensor would be gradually deformed to the right toward the bottom of the screen as shown in portion (b) of FIG. 19. Portion (c) of FIG. 19 shows what images would be shot if the scene shown in portion (a) of FIG. 19 were captured with a known CCD image sensor. In the known CCD image sensor, R and B pixel signals are added together on vertical and horizontal transfer paths, which are comprised of charge-coupled devices, and a single transfer path is shared by multiple pixels in mutually different colors. That is why if every pixel signal were read at the same time, then the pixel addition operation could not be performed. For that reason, the read timings should be shifted from one color component to another. Suppose R and B pixel signals are read and added together after Gr and Gb pixel signals have been read. In that case, the subject would be shot at different positions on the screen between the RB image and the G images as shown in portion (c) of FIG. 19.

When such a moving picture is entered into the image processing section 12, an inter-frame motion that has been estimated based on R and B images is used to increase the frame rate of the G image that has been captured at a low frame rate as described above. However, as those color component images have been obtained by shooting mutually different scenes, the image processing section 12 might be unable to increase the resolution of the output color image properly. On the other hand, portion (d) of FIG. 19 shows what images would be shot with the image sensor of the image capture device of the present disclosure. Even when the pixel addition is carried out on only a particular color component image, every pixel signal of every color component can be read at the same time. Consequently, a moving picture that has been captured without deforming the subject or causing any color shift, which is often seen in the related art, can be entered into the image processing section 12.

By adopting the configuration of this embodiment, even when a single-panel color image sensor adds together pixel signals in the same color, the global shutter operation can be carried out on every pixel without using any additional shutter mechanism. As a result, the overall size of the image capture device can be smaller than in a situation where a shutter mechanism is used. Also, even though the image sensor outputs a moving picture, of which the resolution and frame rate change on a color-by-color basis, the image capture device of the present disclosure can also output a moving picture of high image quality, of which the high resolution is defined by the first color component and the high frame rate is defined by the second color component, by using an image processor.

In the example described above, R and B pixels are subjected to a short exposure process, Gr and Gb pixels are subjected to a long exposure process, and R and B pixel signals are added together on charge-coupled devices. However, the image sensor of the present disclosure does not have to have such a configuration. That is to say, the R or B pixels may be subjected to a long exposure process, the Gr or Gb pixels may be subjected to a short exposure process and then pixel signals may be added together.

Furthermore, it is not absolutely necessary to change the length of the exposure process time on a color component basis. For example, the Gr pixel signal may be read through a short exposure process, the Gb pixel signal may be read through a long exposure process, and the R and B pixels may go through an exposure process for mutually different periods of time.

Figure 20:
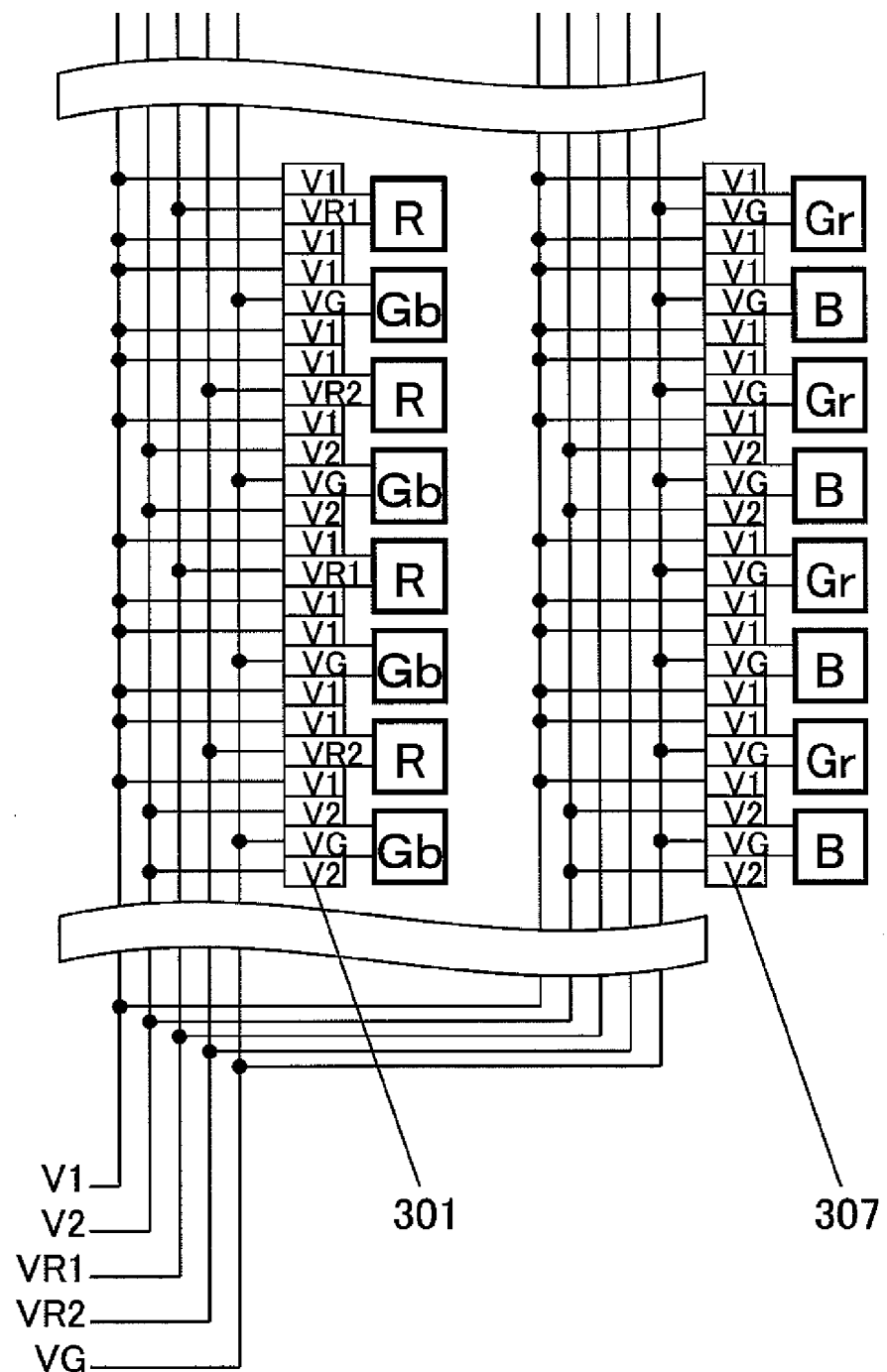
FIG. 20 is a list of signals supplied in a different pattern to respective charge-coupled devices on a CCD bank of an image sensor according to the present invention.

FIG. 20 shows an exemplary set of signals to be supplied to respective charge-coupled devices in a situation where the long and short exposure processes are allocated to respective pixels in different combinations for shooting purposes. In this example, only R pixels are captured through a short exposure process and pixel addition and the other Gr, Gb and B pixels are captured through a long exposure process. In FIG. 20, the signal supplied to the charge-coupled devices that are connected to B pixels is the same as what is supplied to the charge-coupled devices that are connected to Gr or Gb pixels in FIG. 9, which is a major difference from the configuration shown in FIG. 9. Also, in the configuration shown in FIG. 9, the bank 301 or 307 of charge-coupled devices is shared by both pixels to be subjected to the short exposure process (i.e., R or B pixels) for shooting and pixels to be subjected to the long exposure process (i.e., Gr or Gb pixels) for shooting. However, the image sensor of the present invention does not have to have such a configuration and one of modified examples of the present disclosure is shown in FIG. 20. In the image sensor of the present disclosure, the output signals of respective pixels are output through their own output signal lines (e.g., the output signal lines 305, 306, 309 and 310 shown in FIG. 8), not through the bank 301 or 307 of charge-coupled devices. That is why even when the pixels to be subjected to the long exposure process for shooting purposes share any bank of charge-coupled devices, their output signals do not mix up.

Furthermore, the image sensor of the present disclosure does not have to have the pixel arrangement shown in FIG. 7, either. For example, color component images in cyan (C), magenta (M), yellow (Y) and G can also be captured instead of the R, Gr, Gb and B pixels shown in FIG. 7. In that case, M, C, G and Y pixels may be arranged at the respective locations of the R, B, Gr and Gb pixels shown in FIG. 7, for example. By adopting such an arrangement, image signals can also be captured through the long and short exposure processes with respect to the C, M, Y and G pixels.

(Embodiment 2)

A second embodiment of the present invention is an example in which the number of pixels to be added together on the image capturing plane is different from in the first embodiment. In the second embodiment to be described below, three pixels are supposed to be added together. However, the image sensor of the present disclosure can change the number of pixels to be added together arbitrarily by changing the driving method.

Figure 21:
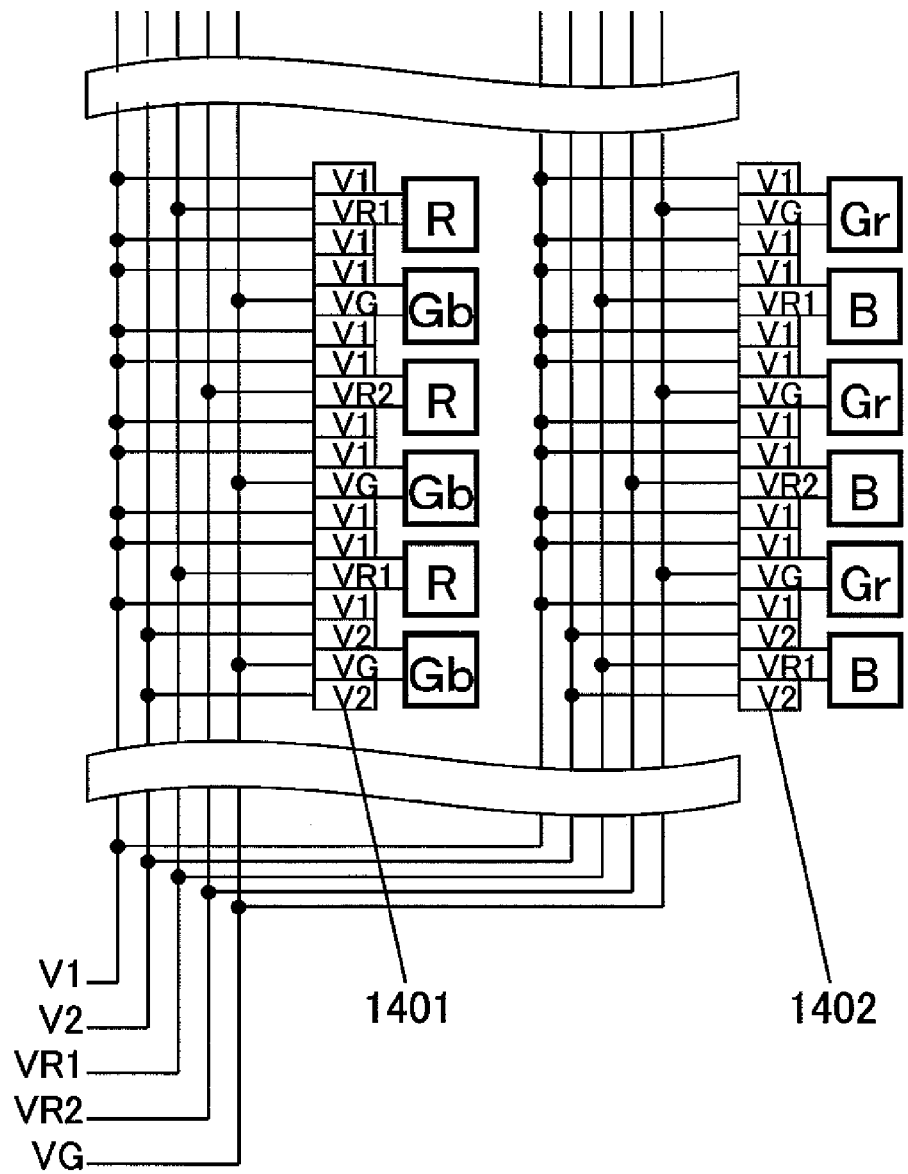
FIG. 21 is a list of signals supplied to respective charge-coupled devices on a CCD bank of an image sensor according to a second embodiment of the present invention.

FIG. 21 shows a list of signals supplied to the respective charge-coupled devices that form the banks 1401 and 1402 of charge-coupled devices according to this embodiment. In FIG. 21, illustration of the charge sensing amplifiers 302 and 308, the read signal lines 303 and 304 and other members shown in FIG. 8 is omitted as in FIG. 9 that has been referred to in the first embodiment. As shown in FIG. 21, according to this embodiment, six different kinds of control signals V1, V2, V3, VR1, VR2 and VG are used as in the first embodiment to drive the charge-coupled devices that form the bank 1401 of charge-coupled devices. However, those signals are supplied by different combinations of charge-coupled devices. Among these signals, VR1, VR2 and VG have four values that are the value of a charge extraction voltage, the value of a charge transfer voltage, the value of a charge storage voltage and a voltage corresponding to level L (which may be 0 V, for example). On the other hand, the signals V1, V2 and V3 have two values that are the charge transfer voltage and the level L. According to this embodiment, R and B pixel signals are supposed to be read simultaneously and Gr and Gb pixel signals are also supposed to be read simultaneously as in the first embodiment. That is why the drive signal supplied to the bank 1402 of charge-coupled devices, to which B and Gr pixels are connected, is supposed to be the same as the drive signal supplied to the bank 1401 of charge-coupled devices.

According to this embodiment, the global shutter operation is performed on pixels in the same way as in the first embodiment. That is to say, the pixel signals are read and output to an external device outside of the image sensor 112 in the procedures shown in FIGS. 10 and 11 that have already been described for the first embodiment. Specifically, as for this second embodiment, it will be described in detail particularly how a pixel addition operation needs to be performed when three pixels are added together on the image capturing plane.

Figure 22:
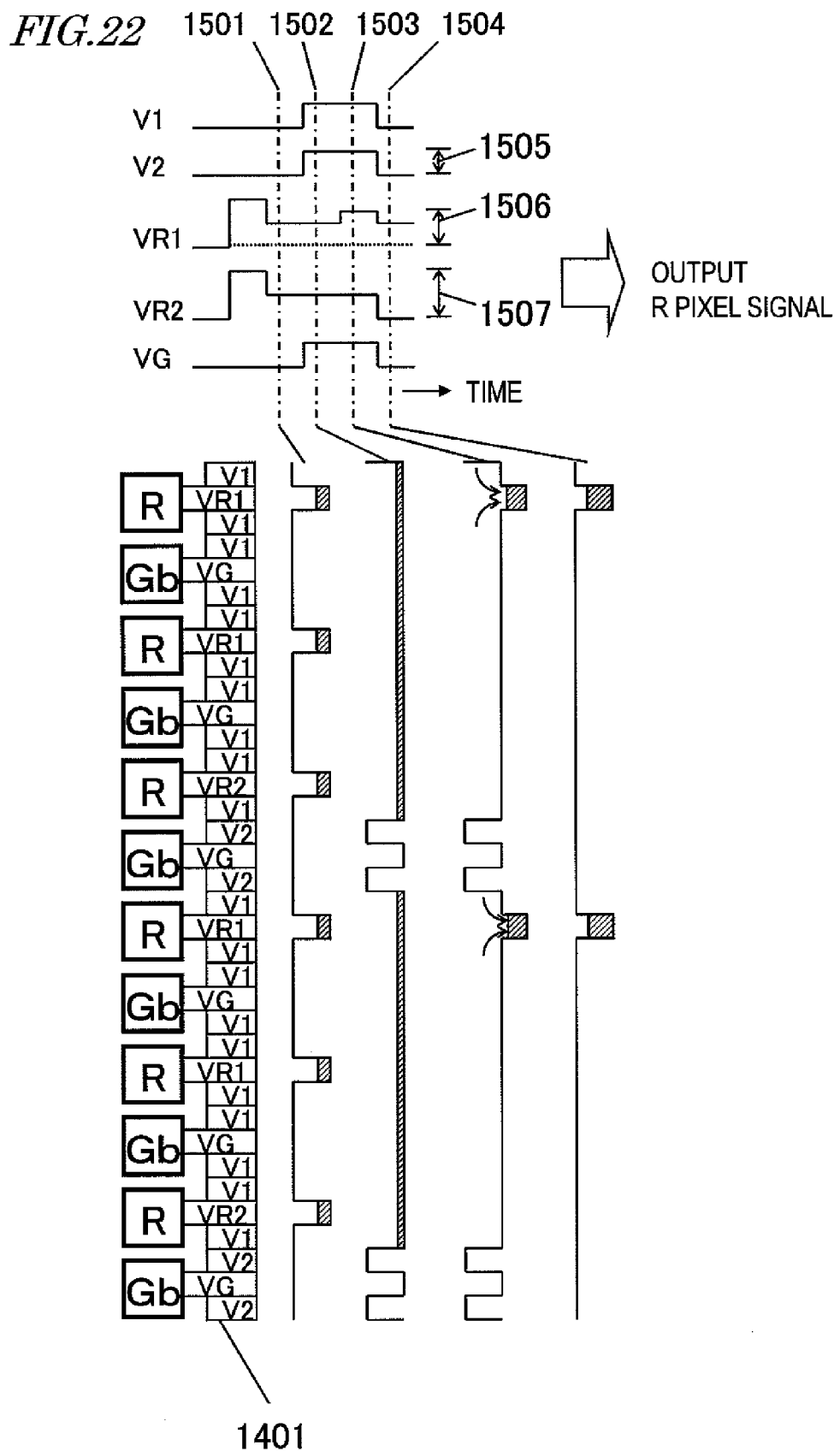
FIG. 22 shows the waveforms of control signals and the distribution of potentials at respective charge-coupled devices when R pixel signals are vertically added together in the second embodiment of the present invention.

FIG. 22 shows a procedure in which R and B pixel signals are added together vertically. Just like FIG. 12 that has been referred to in the first embodiment, the upper half of FIG. 22 is a timing diagram showing the waveforms of some of the signals to be supplied to the charge-coupled devices in the banks 1401 and 1402 of charge-coupled devices that contribute to performing the pixel addition. On the other hand, the lower half of FIG. 22 shows the potential distributions in the charge-coupled devices at respective points in time that correspond to the timings shown in the upper half. FIG. 22 shows how to add R pixel signals together. Although not shown, the B pixel signals are also added together in the same way. In FIG. 22, the voltage levels identified by the reference numerals 1505, 1506 and 1507 correspond to the charge transfer voltage of the charge-coupled devices, the charge storage voltage, and the charge extraction voltage, respectively.

Hereinafter, it will be described in detail exactly how this image capture device operates at the respective points in time shown in FIG. 22. First of all, at a point in time identified by the reference numeral 1501 (which will be simply referred to herein as "at a point in time 1501" for convenience sake), the electric charges that have been extracted from the R pixels are maintained at the level of the charge transfer voltage and stored on the charge-coupled devices that supply the signals VR1 and VR2. At the next point in time 1502, by raising the levels of the signals V1, VR1, VR2 and VG to the charge transfer voltage level, the electric charges that have been extracted from three adjacent R pixels are added together. Thereafter, at the point in time 1503, the level of the signal VR1 is raised to the charge storage voltage level and the pixels' electric charges that have been added together are gathered at a single charge-coupled device to which the signal VR1 is supplied. And at the point in time 1504, all drive signals but VR1 have their level lowered to level L, thereby completing the pixels' electric charge addition operation.

According to this embodiment, when pixels' electric charges are transferred horizontally, the electric charges that have been extracted from Gr and Gb pixels are output in quite the same way as in the first embodiment described above. Thus, for this embodiment, it will be described how the electric charges extracted from R and B pixels are horizontally added together and horizontally transferred.

Figure 23:
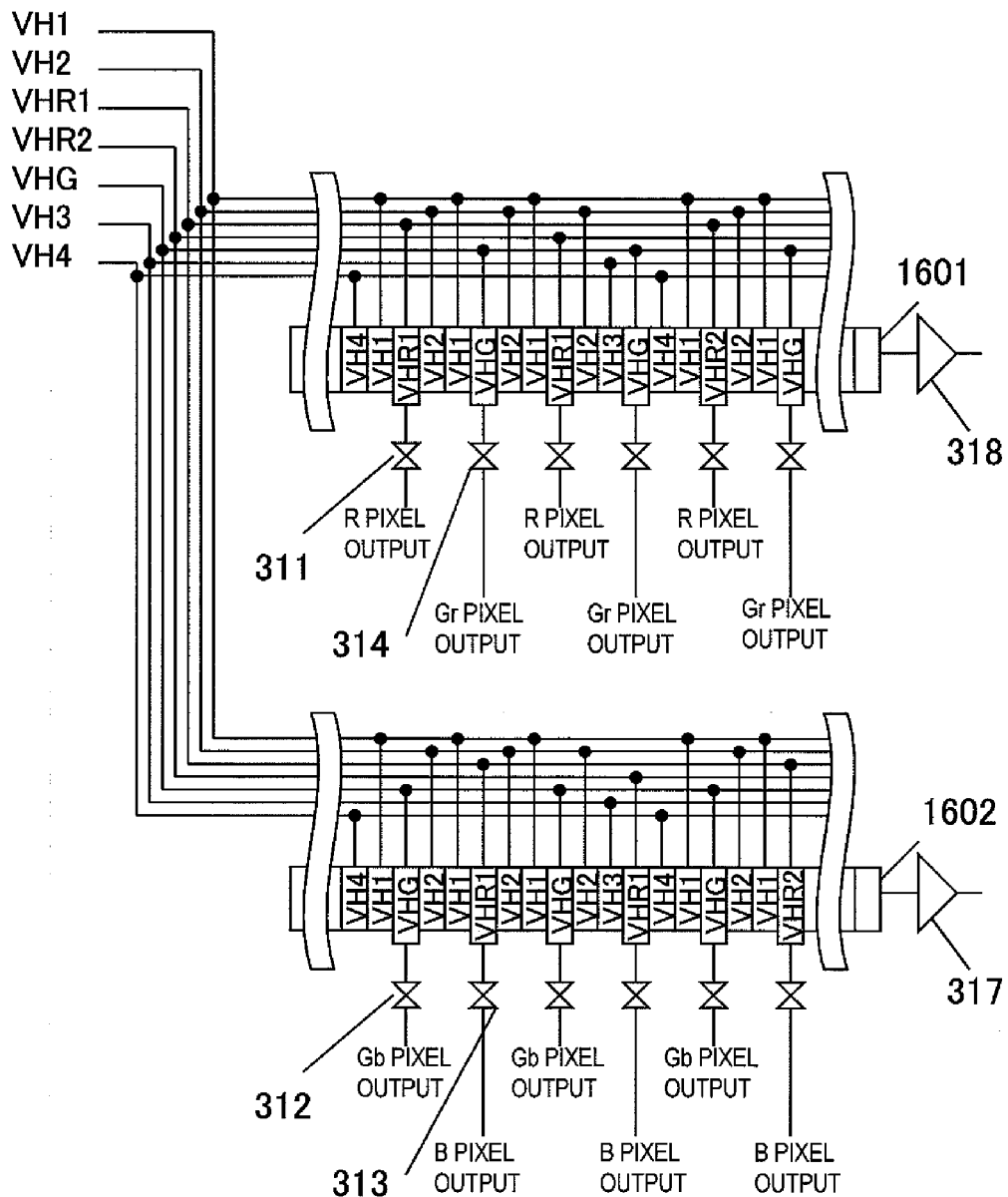
FIG. 23 is a list of signals supplied to respective charge-coupled devices on a horizontal transfer path of the image sensor of the second embodiment of the present invention.

FIG. 23 illustrates a specific configuration for the horizontal transfer paths 1601 and 1602. As shown in FIG. 23, R and Gr pixel output signal lines are horizontally alternately connected to the charge-coupled devices in the horizontal transfer path 1601 via the transfer gates 311 and 314. On the other hand, B and Gb pixel output signal lines are alternately connected to the charge-coupled devices in the horizontal transfer path 1602 via the transfer gates 312 and 313. Also, just like the horizontal transfer paths 315 and 316 of the first embodiment described above, these horizontal transfer paths 1601 and 1602 are controlled with seven different kinds of drive signals VH1, VH2, VH3, VH4, VHR1, VHR2 and VHG. However, those signals are supplied to different combinations of charge-coupled devices.

Figure 24:
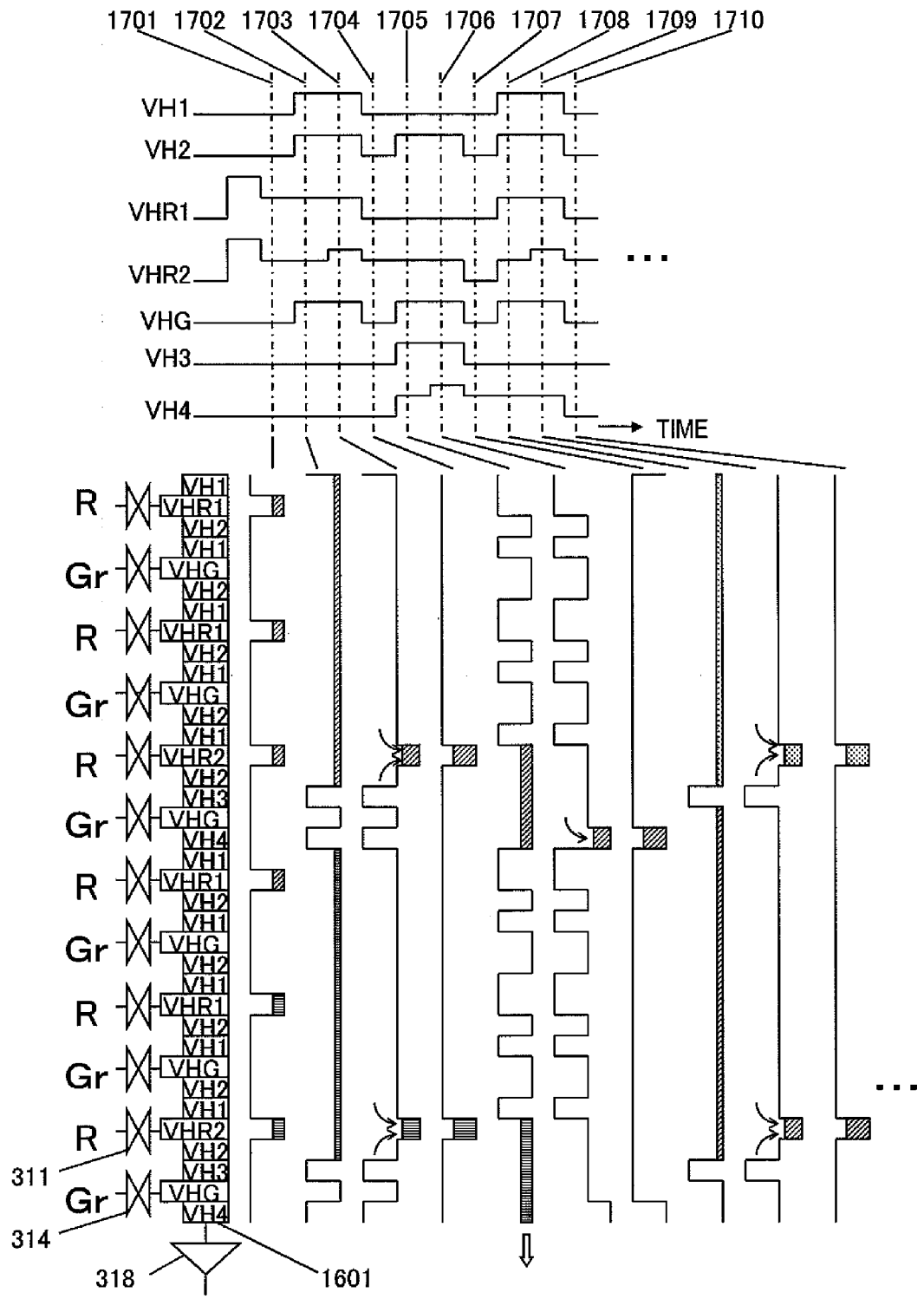
FIG. 24 shows the waveforms of control signals and the distribution of potentials at respective charge-coupled devices when R pixel signals are horizontally added together and transferred in the second embodiment of the present invention.

FIG. 24 shows a procedure in which the electric charges of R and B pixels are horizontally added together and transferred. Although FIG. 24 shows only how the electric charges of the R pixels are added together on the horizontal transfer path 1601, the electric charges of the B pixels are also added together in quite the same way on the horizontal transfer path 1602.

In FIG. 24, the electric charges of the R pixels that have been output through the transfer gate 311 are stored at the point in time identified by the reference numeral 1701 at a potential level corresponding to the charge transfer voltage level. At the next point in time 1702, by raising the levels of the signals VH1, VH2 and VHG to the charge transfer voltage level, the electric charges of three R pixels that have been extracted onto charge-coupled devices supplied with VHR1 and VHR2 are combined and added together. Thereafter, at the point in time 1703, those electric charges that have been added together are gathered at the charge-coupled device to which the signal VHR2 is supplied. At the next point in time 1704, the potential level to store the electric charges is changed. From the next point in time 1705 on, the electric charges are transferred horizontally. Specifically, at that point in time 1705, the signals VH2, VH3, VH4, VHR2 and VHG have their levels raised to the charge transfer voltage level. And the electric charge of the pixel that is located closest to the terminal of the horizontal transfer path 1601 are output to a device outside of the image sensor 112 by way of the charge sensing amplifier 318. Next, at the points in time 1706 and 1707, the electric charges that have been added together are gathered at the charge-coupled device to which the signal VH4 is supplied. Thereafter, through the points in time 1708, 1709 and 1710, the electric charges added are transferred from the charge-coupled device supplied with the signal VH4 to the charge-coupled device supplied with the signal VHR2. From then on, the respective signals will change their levels in the same pattern as the one between the points in time 1705 and 1710 over and over again, thereby transferring the electric charges horizontally.

By adopting the configuration of this embodiment, even if the number of pixel signals to be added together is not two, the global shutter operation can also be performed without using any additional shutter mechanism. On top of that, no matter how many pixels need to be added together, the addition operation can be carried out by performing the four processing steps shown in FIG. 20. As a result, the addition operation can get done quickly.

(Embodiment 3)

The image sensor of the present invention can add together the R and B pixel signals not only on charge-coupled devices but also with those pixel signals transformed into electrical signals by charge sensing amplifiers. Thus, in the following description of this third embodiment, it will be described how to add pixel signals together by adding electrical signals.

Figure 25:
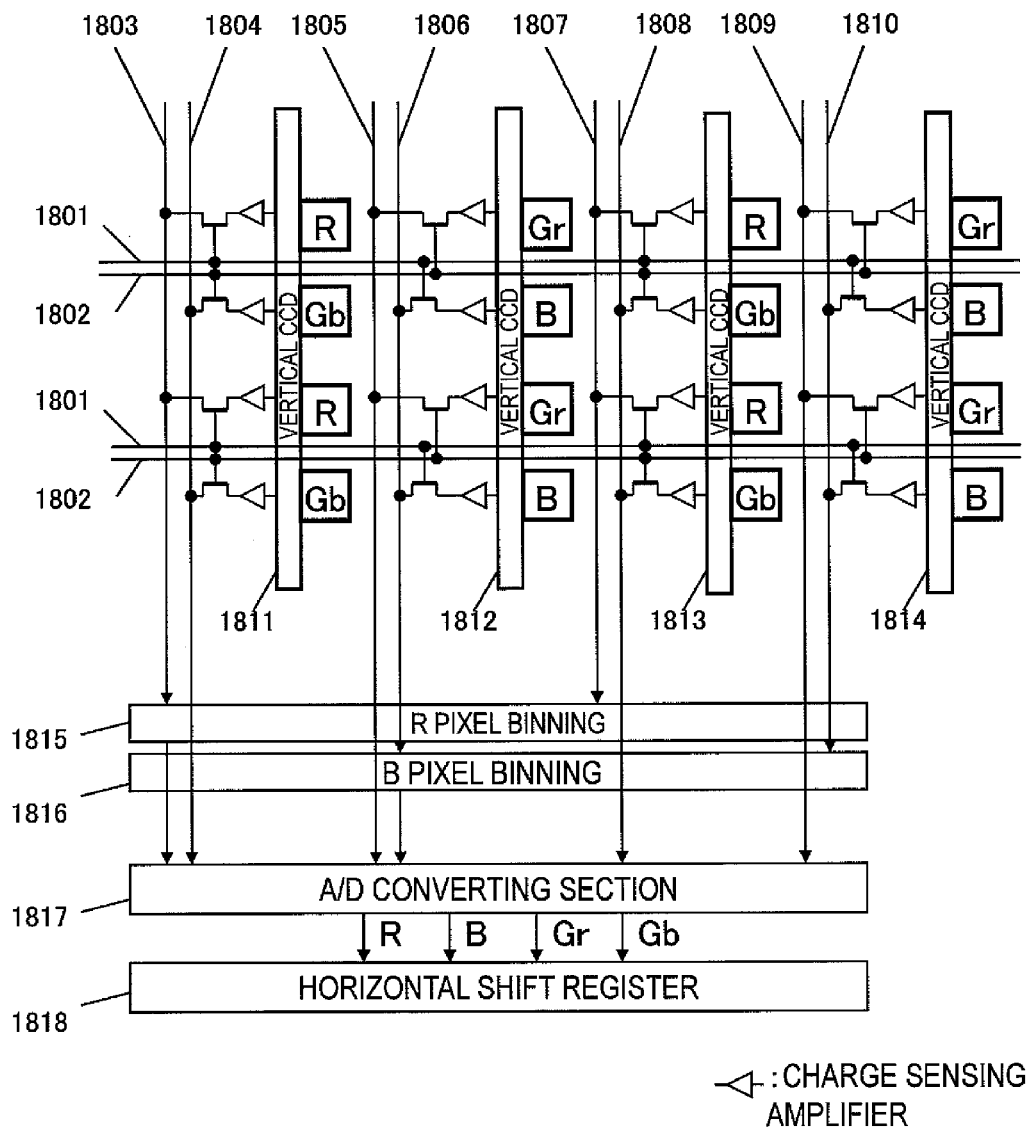
FIG. 25 is a diagram illustrating a configuration for an image sensor according to a third embodiment of the present invention.

FIG. 25 illustrates an internal configuration for the image sensor 112 of this embodiment. Just like its counterpart of the first and second embodiments described above, this image sensor also includes R, B, Gr and Gb pixels, banks of charge-coupled devices, and charge sensing amplifiers that are arranged at respective pixel locations. In addition, this image sensor further includes R and B pixel binning circuits.

In FIG. 25, the read signal lines 1801 and 1802 transmit read signals, which determine the timing to output, to output signal lines 1803 to 1810, signals that have been obtained by charge sensing amplifiers by transforming the electric charges that are stored in R, B pixels and Gr, Gb pixels into voltage values. Specifically, the output signal lines 1803 and 1807 transmit R pixel output signals. The output signal lines 1804 and 1808 transmit Gb pixel output signals. The output signal lines 1805 and 1809 transmit B pixel output signals. And the output signal lines 1806 and 1810 transmit Gr pixel output signals. The banks 1811 and 1813 of charge-coupled devices are each comprised of multiple charge-coupled devices, store the electric charges that have been accumulated in R and Gb pixels, and add R pixel signals together. The banks 1812 and 1814 of charge-coupled devices store the electric charges that have been accumulated in B and Gr pixels, and add B pixel signals together. The R and B pixel binning sections 1815 and 1816 add pixel outputs that have been transformed into voltage signals by the charge sensing amplifiers, thereby adding pixel signals together horizontally. The A/D converting section 1817 performs analog-to-digital conversion on the R and B pixel output signals that have been supplied from the binning sections 1815 and 1816 and on the Gr and Gb pixel output signals that have been output through the output signal lines 1804, 1805, 1808 and 1809. Furthermore, the horizontal shift register 1818 transfers the respective color pixel signals that have been converted into digital signals by the A/D converting section 1817 to a device outside of the image sensor.

It should be noted that the A/D converting section 1817 shown in FIG. 25 could provide four sets of circuits for R, Gr, Gb and B pixels, respectively, or perform AD conversion on the respective color pixels using a single circuit time-sequentially. Furthermore, the horizontal shift register 1818 may have a configuration in which the respective color pixel signals are output in parallel with each other. Or the pixel signals of all color components may be output through the transfer path of a single shift register. Optionally, this image sensor could also be configured to output analog signals of the respective pixels, instead of the digital signals. In that case, the A/D converting section 1817 would be omitted. The same statement applies to the first embodiment described above, too.

In this embodiment, the respective pixel signals are read in the following manner. Although it will be described only how to read all of the RGB pixel signals, the read operation can be performed on frames in which only R and B pixel signal are read just by omitting G pixel signal reading from the operation on frames in which the RGB pixel signals are all read.

First of all, the global shutter operation is performed on all of the RGB pixels. That is to say, the electric charges that have been accumulated in those pixels are transferred to the charge-coupled devices that are connected to those pixels. Subsequently, to output the G pixel signals first, a read pulse is applied to read signal lines 1802 sequentially one row after another on the image capturing plane. And the respective G pixel signals that have been transformed into electrical signals by the charge sensing amplifiers are output. Meanwhile, the Gr and Gb pixels' outputs are supplied to either the A/D converting section 1817 or the horizontal shift register 1818 if A/D conversion is not necessary. After every G pixel has been read, the output electric charges of the R and B pixel signals are added together as shown in FIG. 12 that has been referred to for the first embodiment. When the R and B pixel signals are added together, a read pulse is sequentially applied to the read signal lines 1801 and the R and B pixel signals that have been transformed into electrical signals by the charge sensing amplifier are output. After that, the R and B pixel signals are input to the respective pixels' binning sections 1815 and 1816, where the pixel signals are horizontally added together. After that, those pixel signals are supplied to either the A/D converting section 1817 or the horizontal shift register 1818.

Figure 26:
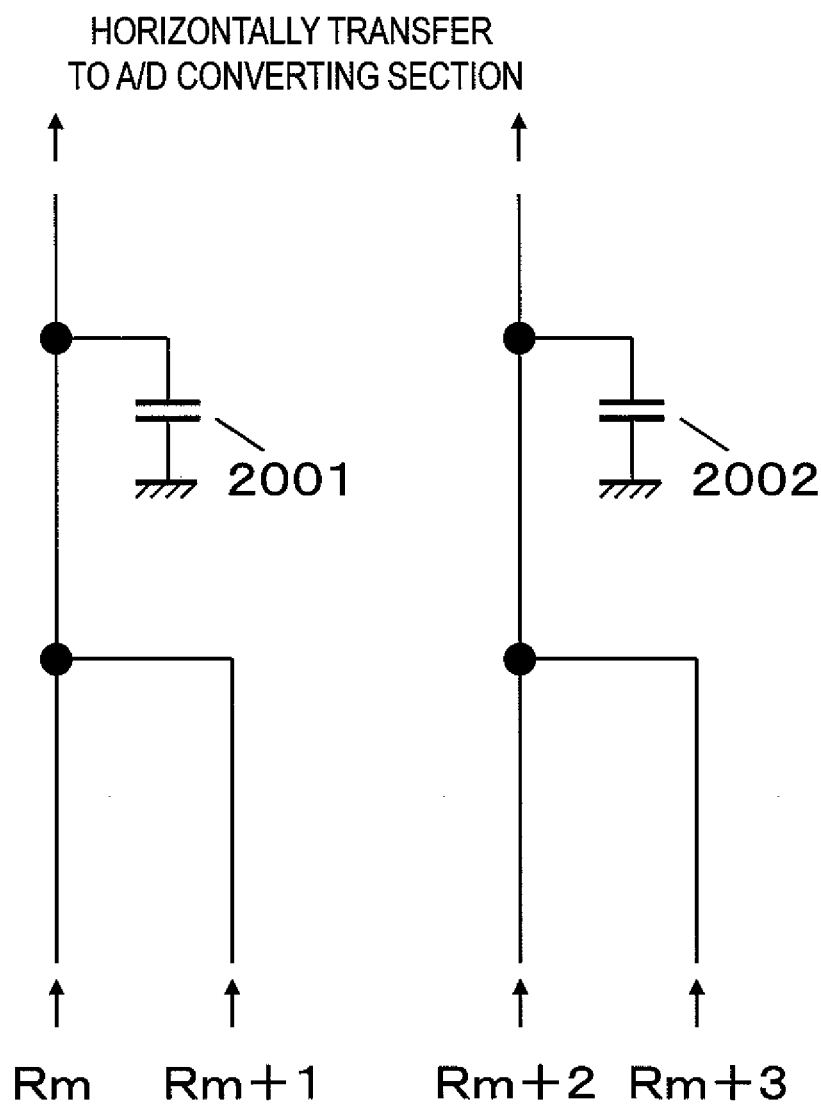
FIG. 26 is a diagram illustrating an example of binning circuits according to the third embodiment of the present invention.

In this embodiment, the read signals supplied to the read signal lines 1801 and 1802 may be the same as those of the first embodiment shown in FIG. 16. An exemplary configuration for the binning sections 1815 and 1816 to use to add two pixel signals together horizontally is shown in FIG. 26. Specifically, FIG. 26 illustrates a configuration for an R pixel binning section 1815 that adds together horizontally R pixels on the $m^{th}$ and $(m+1)^{th}$ columns, R pixels on the $(m+2)^{th}$ and $(m+3)^{th}$ columns together, and R pixels on each other pair of horizontally adjacent columns. In FIG. 26, Rm, Rm+1, Rm+2, and Rm+3 denote pixel output signal of R pixels on the $m^{th}$, $(m+1)^{th}$, $(m+2)^{th}$ and $(m+3)^{th}$ columns, respectively. The horizontally adjacent pixel signals Rm and Rm+1 are added together by charging a capacitor 2001 with both of those signals Rm and Rm+1. And the horizontally adjacent pixel signals Rm+2 and Rm+3 are added together by charging a capacitor 2002 with both of those signals Rm+2 and Rm+3.

The B signals can also be added together in the same way by the B pixel binning section 1816.

By adopting the configuration of this embodiment, even when the single-panel color image sensor should add together pixel signals in the same color, the global shutter operation can be performed on every pixel without using any additional shutter mechanism. As a result, the overall size of the image capture device can be reduced compared to a situation where a shutter mechanism is used.

(Embodiment 4)

In the image capture device of the present invention, the image processing section that further increases the resolution of a high-resolution, high-frame-rate output image that has been obtained based on the RGB image signals provided by the image sensor does not always have to use the resolution increasing algorithm adopted in the first embodiment described above. In this fourth embodiment of the present invention, it will be described what if the image capture device obtains an output image by another resolution-increasing algorithm.

Specifically, according to an algorithm adopted in this embodiment to increase the resolution of an image, the resolution of only a G component image is increased by the method that has already been described for the first embodiment and the high frequency components of the high-resolution G image are reflected on the other R and B images. According to that algorithm, the amplitude of the high frequency components to superpose may be controlled based on a local correlation between the R, G and B images in ranges other than a high-frequency range (i.e., in low to middle frequency ranges). As a result, a high-resolution moving picture that looks quite natural can be obtained with the generation of false colors minimized. Meanwhile, the resolutions of R and B images are also increased by superposing high-frequency components of the G image that has had its resolution and frame rate both increased. Consequently, their resolutions can be increased with even more stability.

Figure 27:
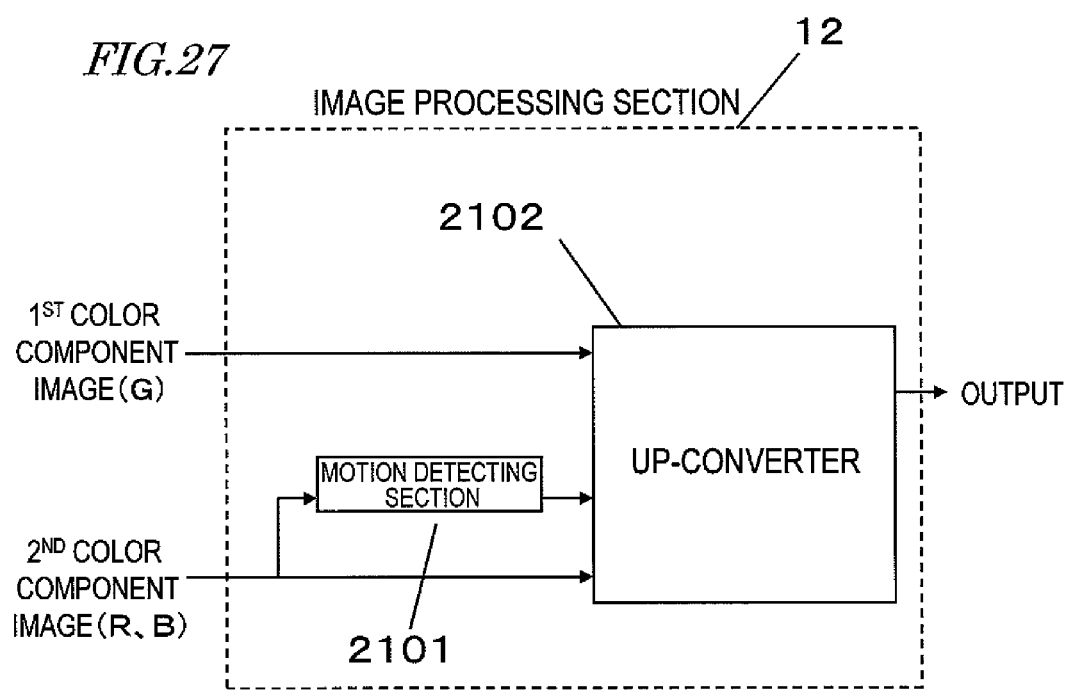
FIG. 27 is a block diagram illustrating a configuration for an image processing section according to a fourth embodiment of the present invention.

FIG. 27 illustrates an exemplary configuration for an image processing section 12 that performs such an operation. The members that form the image processing section of this embodiment themselves are the same as their counterparts of the first embodiment described above (see FIG. 17). Also, the motion detecting section 2101 in the image processing section performs the same operation as the motion detecting section 1201 of the first embodiment described above. That is to say, the motion detecting section 2101 calculates the motion of respective pixels between frames by applying a method such as block matching to R and B images with a low resolution and a high frame rate. However, according to this embodiment, the up-converter 2102 operates differently from their counterpart of the first embodiment.

Figure 28:
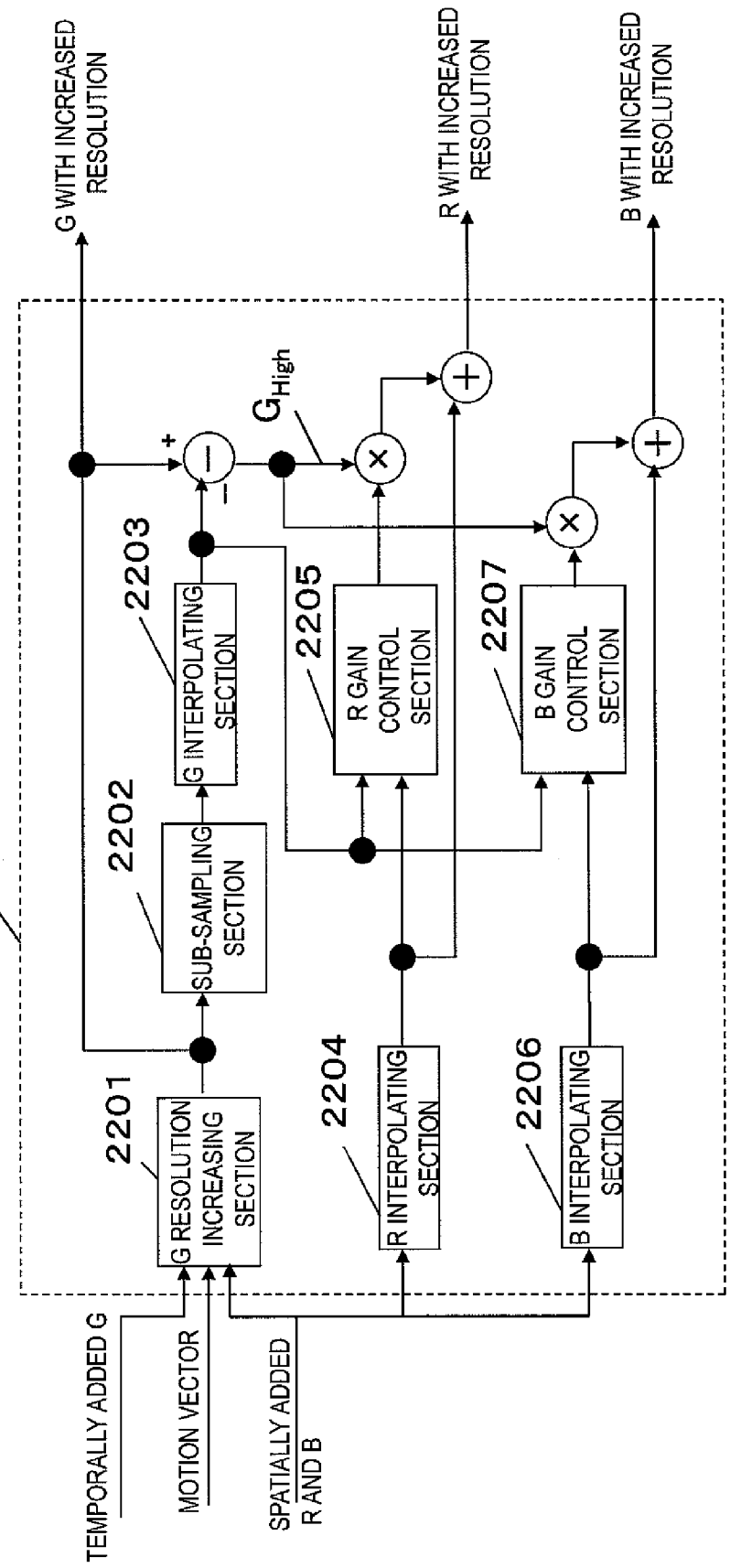
FIG. 28 is a block diagram illustrating an internal configuration for an up-converter according to the fourth embodiment of the present invention.

FIG. 28 illustrates an exemplary internal configuration for the up-converter 2102.

The up-converter 2102 includes a G resolution increasing section 2201, a sub-sampling section 2202, a G interpolating section 2203, an R interpolating section 2204, an R gain control section 2205, a B interpolating section 2206, and a B gain control section 2207.

The G resolution increasing section 2201 performs the processing of increasing the resolution of the G image. This resolution increasing processing gets done by applying the image processing method of the first embodiment to only the G image. Specifically, if an output G image with a high resolution and a high frame rate is represented as fG, the evaluation function to be minimized is represented by the following equation using the notation of Equation (3) that has already been described for the first embodiment:

$$J=\|H_T f_G - g_G\|^2 + \lambda_s \|Q_s f_G\|^2 + \lambda_m \|Q_m f_G\|^2 \quad (10)$$

In Equation (10), $H_T$, $g_G$, $Q_s$, $Q_m$ and other signs mean the same as what is represented by their counterparts in Equation (3). The G resolution increasing section 2201 calculates $f_G$ that minimizes Equation (10). That is to say, by partially differentiating Equation (10) with $f_G$ as in the first embodiment and setting it to be zero, an equation for obtaining $f_G$ that minimizes Equation (10) is obtained as the following Equation (11):

$$\{H_T^T H_T + \lambda_s Q_s^T Q_s + \lambda_m Q_m^T Q_m\} f_G = H_T^T g_G \quad (11)$$

The sub-sampling section 2202 reduces the resolution of the G image that has been increased to the same number of pixels as that of R and B by sub-sampling process.

The G interpolating section 2203 performs the processing of bringing the number of pixels of the G image that has been once reduced by the sub-sampling section 2202 up to the original one again. Specifically, the G interpolating section 2203 calculates, by interpolation, the pixel values of pixels that have been lost through the sub-sampling process. The method of interpolation may be a known one. The sub-sampling section 2202 and the G interpolating section 2203 are provided in order to extract high frequency components of the G image from the G image that has been supplied from the G resolution increasing section 2201 and the G image that has been subjected to sub-sampling and interpolation.

The R interpolating section 2204 makes interpolation on R.

The R gain control section 2205 calculates a gain coefficient with respect to the high frequency components of G to be superposed on R.

The B interpolating section 2206 makes interpolation on B.

The B gain control section 2207 calculates a gain coefficient with respect to the high frequency components of G to be superposed on B.

The method of interpolation adopted by the R and B interpolating sections 2204 and 2206 may be either the same as, or different from, the one adopted by the G interpolating section 2203. These interpolating sections 2203, 2204 and 2206 may use the same method of interpolation or mutually different ones.

Hereinafter, it will be described how this image processing section 2102 operates.

The G resolution increasing section 2201 increases the resolution of the G image with a high resolution and a high frame rate by solving Equation (11) using the input G image and the pixel-by-pixel motion vectors provided by the motion detecting section 2101. The G image that has had its resolution increased in this manner is not only output as the G component of the output image but also input to the sub-sampling section 2202. In response, the sub-sampling section 2202 sub-samples the G image that has been provided.

The G interpolating section 2203 makes interpolation on the G image that has had its resolution decreased by the sub-sampling section 2202. And by subtracting the G image that has been subjected to the interpolation by the G interpolating section 2203 from the output of the G resolution increasing section 2201, the high frequency components $G_{High}$ of G is obtained.

Meanwhile, the R interpolating section 2204 interpolates and enlarges the input R image so that the R image has the same number of pixels as the G image. The R gain control section 2205 calculates a local correlation coefficient between the output of the G interpolating section 2203 (i.e., the low to middle frequency component of G) and the output of the R interpolating section 2204. As the local correlation coefficient, the correlation coefficient ρ of 3×3 pixels surrounding a pixel in question (x, y) may be calculated by the following Equation (12):

$$\rho = \frac{\sum_{i=-1,0,1}\sum_{j=-1,0,1}^{3}(R(x+i,y+j)-\overline{R})(G(x+i,y+j)-\overline{G})}{\sqrt{\sum_{i=-1,0,1}\sum_{j=-1,0,1}^{3}(R(x+i,y+j)-\overline{R})^2}\sqrt{\sum_{i=-1,0,1}\sum_{j=-1,0,1}^{3}(G(x+i,y+j)-\overline{G})^2}} \quad (12)$$

where $$\overline{R} = \frac{1}{9}\sum_{i=-1,0,1}^{3}\sum_{j=-1,0,1}^{3} R(x+i, y+j)$$

$$\overline{G} = \frac{1}{9}\sum_{i=-1,0,1}^{3}\sum_{j=-1,0,1}^{3} G(x+i, y+j)$$

In Equation (12), R and G denote the high-resolution images of the R and G components that have been obtained by interpolation and enlargement.

The correlation coefficient that has been thus calculated between the low spatial frequency components of R and G is multiplied by the high spatial frequency component $G_{High}$ of G and then the product is added to the output of the R interpolating section 2204, thereby increasing the resolution of the R component.

The B component is also processed in the same way as the R component. Specifically, the B interpolating section 2206 interpolates and enlarges the B image that has been spatially added so that the B image has the same number of pixels as the G image. The B gain control section 2207 calculates a local correlation coefficient between the output of the G interpolating section 2203 and the output of the B interpolating section 2206. As the local correlation coefficient, the correlation coefficient of 3×3 pixels surrounding the pixel in question (x, y) may be calculated by the following Equation (13):

$$\rho = \frac{\sum_{i=-1,0,1}\sum_{j=-1,0,1}^{3}(B(x+i,y+j)-\overline{B})(G(x+i,y+j)-\overline{G})}{\sqrt{\sum_{i=-1,0,1}\sum_{j=-1,0,1}^{3}(B(x+i,y+j)-\overline{B})^2}\sqrt{\sum_{i=-1,0,1}\sum_{j=-1,0,1}^{3}(G(x+i,y+j)-\overline{G})^2}} \quad (13)$$

where $$\overline{B} = \frac{1}{9}\sum_{i=-1,0,1}^{3}\sum_{j=-1,0,1}^{3} B(x+i, y+j)$$

$$\overline{G} = \frac{1}{9}\sum_{i=-1,0,1}^{3}\sum_{j=-1,0,1}^{3} G(x+i, y+j)$$

In Equation (13), B denotes the high-resolution image of the B component that has been obtained by interpolation and enlargement.

The correlation coefficient that has been thus calculated between the low spatial frequency components of B and G is multiplied by the high spatial frequency component $G_{High}$ of G and then the product is added to the output of the B interpolating section 2206, thereby increasing the resolution of the B component.

By adopting the configuration of this embodiment, the image capture device of this embodiment can get the same image processing done by a different algorithm. And according to the algorithm adopted in this embodiment, a moving picture with natural appearance and with an increased resolution can be obtained with the generation of false colors minimized. In addition, since the high frequency components of the G image with increased resolution and frame rate are superposed, the resolutions of the R and B images can also be increased with more stability. On top of that, according to this embodiment, since the number of dimensions of the Equation (11) to be solved agrees with the number of G pixels, the number of dimensions is just one-third as large as Equation (9) that is defined for all of RGB pixels in the first embodiment. As a result, the computational complexity can be reduced.

(Embodiment 5)

The first embodiment of the present invention is designed to increase the quantity of incoming light that can be used to generate an input image by extending the exposure process time for G pixels and making an addition on the image capturing plane for R and B pixels. However, the image capture device of the present disclosure can also be modified so as to obtain an output image by reading pixel signals from every pixel with an image capturing operation performed on G pixels at a low frame rate and through a long exposure process but with no pixel additions made on R and B pixels and then by subjecting the signals to the resolution increasing processing. In that case, since no pixel addition is made on R and B pixels, the quantity of the incoming light that can be used for the entire input image decreases compared to a situation where the operating condition of the first embodiment is adopted. But the image processing can still get done with a lesser degree of computational complexity. In the following description of the fifth embodiment of the present invention, it will be described how to drive the image sensor and how to carry out the image processing when the addition of R and B pixel signals is omitted.

Figure 29:
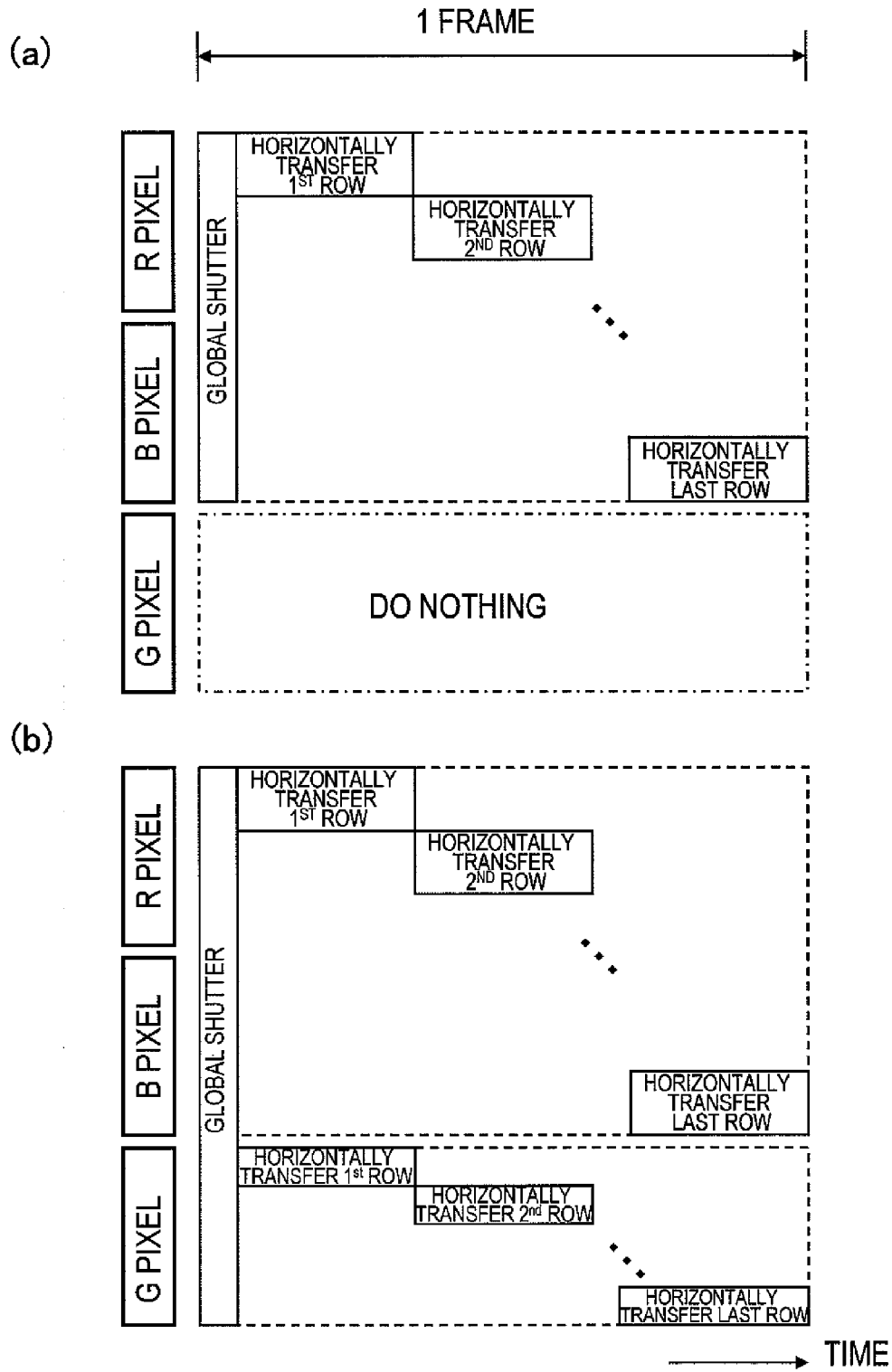
FIG. 29 shows a read sequence for each frame according to a fifth embodiment of the present invention.

The image sensor of the present disclosure can capture an image without making a pixel addition on R and B pixels by omitting the processing step of performing vertical and horizontal additions on R and B pixels from the image sensor driving sequence of the first embodiment. That sequence is shown in FIG. 10 or 11. If the R and B pixel adding processing step is omitted from any of those sequences, there is no need to output the G pixel signal in advance in order to make an addition on R and B pixels in a frame in which all of R, G and B pixel signals are read. As a result, all pixel signals can be output at the same time. That is to say, the driving sequence for the image sensor 112 of this embodiment becomes either the one shown in FIG. 29(*a*) (represented by a frame in which only R and B signals are read) or the one shown in FIG. 29(*b*) (represented by a frame in which all of R, G and B pixel signals are read).

In this embodiment, horizontal transfer of respective pixel signals to outside of the image sensor 112 may be carried out by using either the horizontal transfer path 315 or 316 of the first embodiment shown in FIG. 8 or the horizontal transfer shift register of the third embodiment described above.

Next, it will be described how the image processing section 12 may operate according to this embodiment. In this embodiment, an output image is obtained in the following procedure. First of all, a G component image that has been captured at a low frame rate and through a long exposure process is obtained by Equation (11) that has already been described for the third embodiment. In this case, the G component image is not obtained at every pixel location on the screen but only pixel values at respective locations where G pixels are arranged in a Bayer arrangement are obtained. Thereafter, based on the input R and B image and this high-resolution G image, a full-color image is generated by a known Bayer resolution increasing process.

Figure 30:
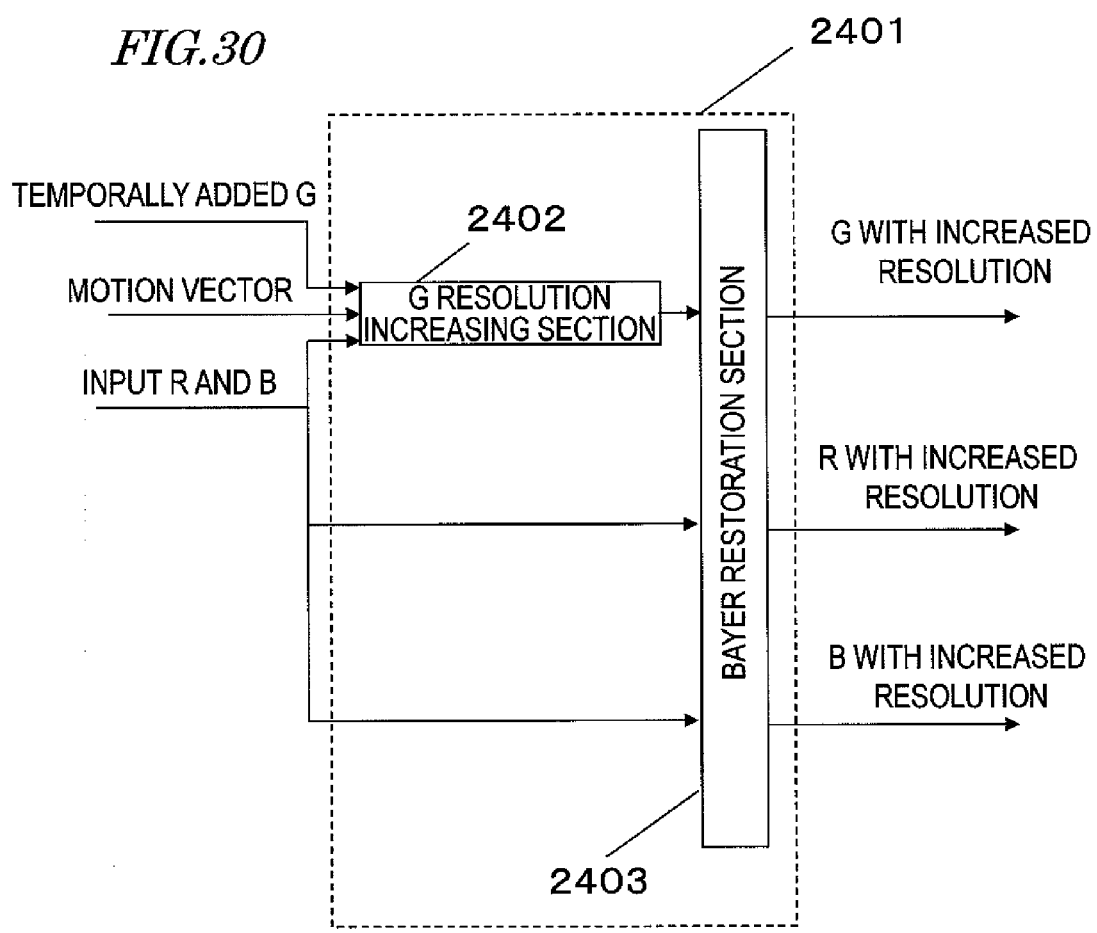
FIG. 30 is a block diagram illustrating a configuration for an up-converter according to the fifth embodiment of the present invention.
Figure 32:
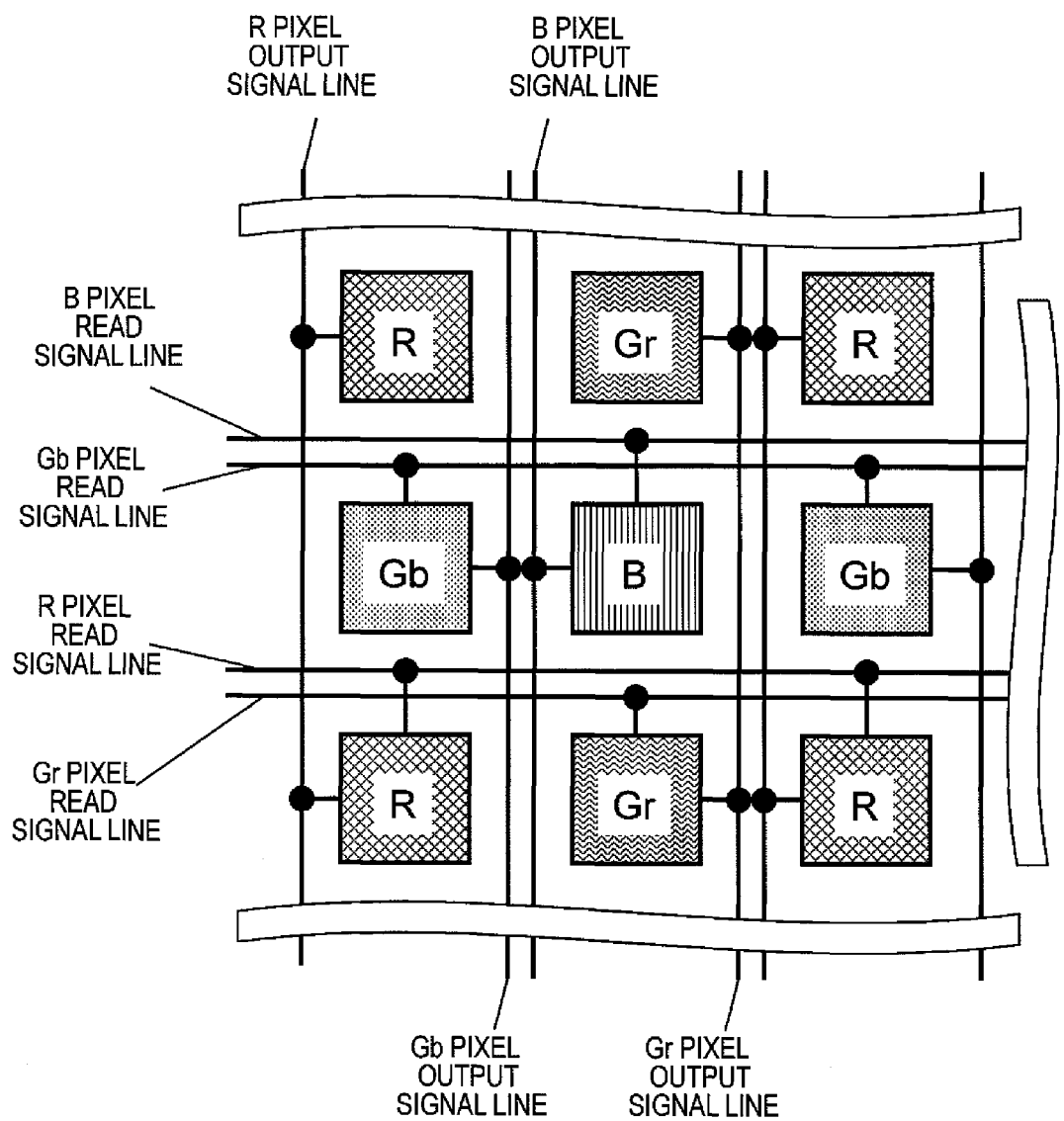
FIG. 32 is a diagram illustrating an example of peripheral circuits surrounding pixels in an image sensor of the related art.
Figure 33:
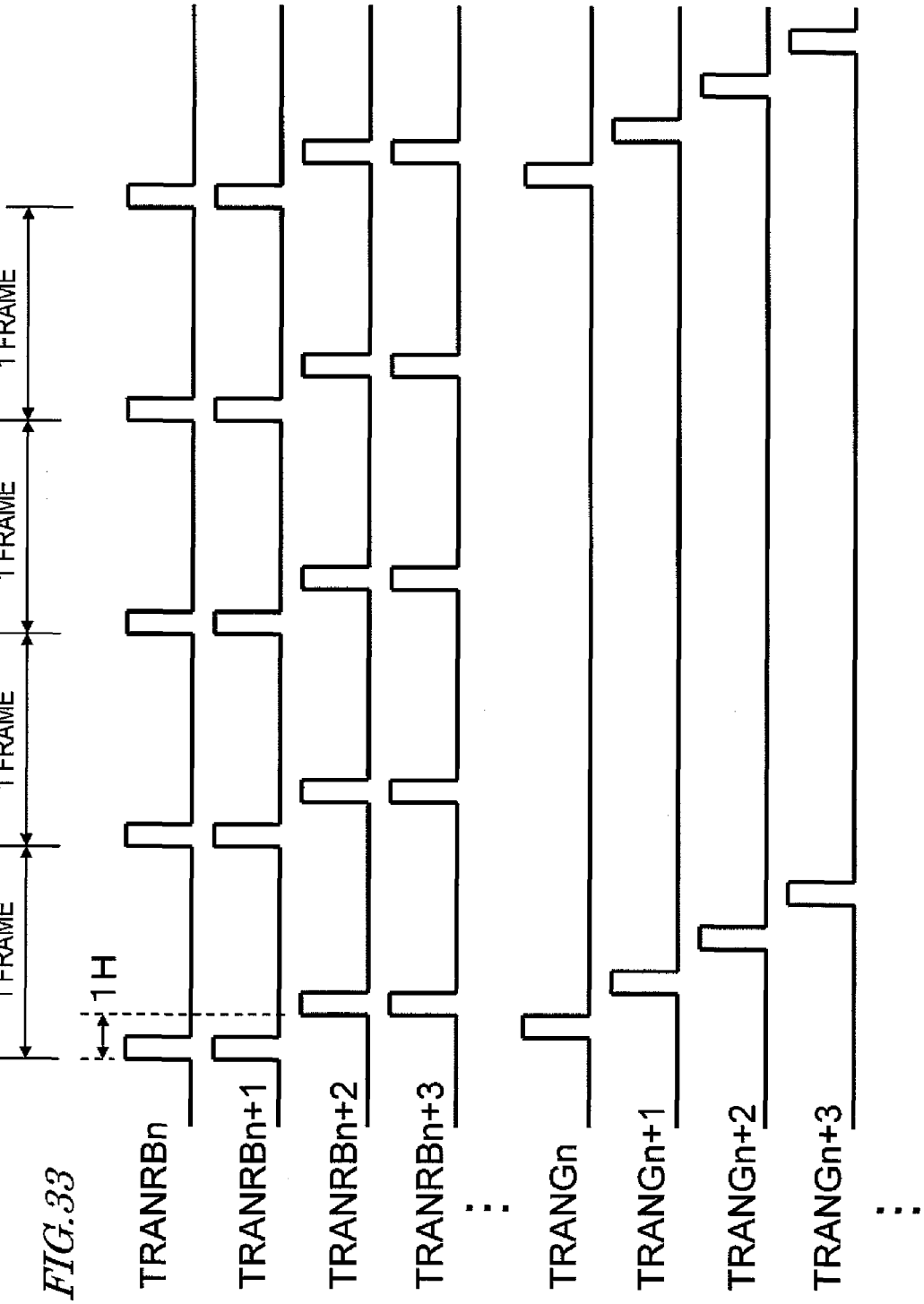
FIG. 33 is a diagram illustrating an example of drive pulses applied to an image sensor of the related art.

FIG. 30 illustrates a configuration for an up-converter included in the image processing section of this embodiment. As shown in FIG. 30, the up-converter 2401 is comprised of a G resolution increasing section 2402 and a Bayer restoration section 2403.

The G resolution increasing section 2402 increases the resolution of the G component image of the output image by Equation (11) that has already been described for the fourth embodiment. In this case, Equation (11) is defined with respect to only the pixel values at respective locations where G pixels are arranged on the Bayer arrangement, not every pixel location on the screen.

The Bayer restoration section 2403 carries out Bayer resolution increasing processing on the output G image provided by the G resolution increasing section 2402 and the input R and B images, thereby outputting a full-color image. The Bayer resolution increasing section 2403 may adopt a known algorithm such as the ACPI (adaptive color plane interpolation) method. In the following description, this ACPI method will be described in detail.

Hereinafter, the algorithm of the Bayer resolution increasing method will be described with reference to FIG. 31. According to the procedure of the ACPI method, an interpolated value of a G component with an intense luminance component is calculated first, and then a B or R interpolated value is calculated based on the G component interpolated value thus obtained. In this example, B and G pixel values to calculate at an R pixel location (e.g., at the (3, 3) location) will be identified by B' and G', respectively. A method for calculating a G' (3, 3) value is represented by the following Equation (14):

$$G'_{(3,3)} = \begin{cases} \frac{G_{(2,3)} + G_{(4,3)}}{2} + \frac{-R_{(1,3)} + 2R_{(3,3)} - R_{(5,3)}}{4} & \text{if } \alpha < \beta \\ \frac{G_{(3,2)} + G_{(3,4)}}{2} + \frac{-R_{(3,1)} + 2R_{(3,3)} - R_{(3,5)}}{4} & \text{if } \alpha > \beta \\ \frac{G_{(2,3)} + G_{(4,3)} + G_{(3,2)} + G_{(3,4)}}{4} + \\ \frac{-R_{(1,3)} - R_{(3,1)} + 4R_{(3,3)} - R_{(3,5)} - R_{(5,3)}}{8} & \text{if } \alpha = \beta \end{cases} \quad (14)$$

$\alpha$ and $\beta$ in Equation (14) may be calculated by the following Equations (15):

$$\alpha = |-R_{(1,3)} + 2R_{(3,3)} - R_{(5,3)}| + |G_{(2,3)} - G_{(4,3)}|$$

$$\beta = |-R_{(3,1)} + 2R_{(3,3)} - R_{(3,5)}| + |G_{(3,2)} - G_{(3,4)}| \quad (15)$$

A method for calculating the B pixel value B' (3, 3) at the same location is represented by the following Equation (16):

$$B'_{(3,3)} = \begin{cases} \frac{B_{(2,4)} + B_{(4,2)}}{2} + \frac{-G'_{(2,4)} + 2G'_{(3,3)} - G'_{(4,2)}}{4} & \text{if } \alpha' < \beta' \\ \frac{B_{(2,2)} + B_{(4,4)}}{2} + \frac{-G'_{(2,2)} + 2G'_{(3,3)} - G'_{(4,4)}}{4} & \text{if } \alpha' > \beta' \\ \frac{B_{(2,4)} + B_{(4,2)} + B_{(2,2)} + B_{(4,4)}}{4} + \\ \frac{-G'_{(2,2)} - G'_{(2,4)} + 4G'_{(3,3)} - G'_{(4,2)} - G'_{(4,4)}}{8} & \text{if } \alpha' = \beta' \end{cases} \quad (16)$$

$\alpha$ and $\beta$ in Equation (16) may be calculated by the following Equations (17):

$$\alpha' = |-G'_{(2,4)} + 2G'_{(3,3)} - G'_{(5,3)}| + |B_{(2,3)} - B_{(4,3)}|$$

$$\beta' = |-G'_{(3,1)} + 2G'_{(3,3)} - G'_{(3,5)}| + |B_{(3,2)} - B_{(3,4)}| \quad (17)$$

In another example, estimated R' and B' pixel values at a G pixel location (2, 3) in the Bayer arrangement may be calculated by the following Equations (18) and (19), respectively:

$$R_{(2,3)} = \frac{R_{(1,3)} + R_{(3,3)}}{2} + \frac{-G'_{(1,3)} + 2G'_{(2,3)} - G'_{(3,3)}}{4} \quad (18)$$

$$B_{(2,3)} = \frac{B_{(2,3)} + B_{(2,4)}}{2} + \frac{-G'_{(2,2)} + 2G'_{(2,3)} - G'_{(2,4)}}{4} \quad (19)$$

In the embodiment described above, the ACPI method is supposed to be adopted as a Bayer resolution increasing method. However, this is only an example of the present invention. Alternatively, RGB values at every pixel location may also be calculated by a method that takes the hue into account or an interpolation method that uses a median.

By adopting the configuration of this embodiment, the number of dimensions of the equation to be solved agrees with the number of G pixels on the Bayer arrangement, and therefore, can be reduced to one half as large as that of Equation (11) for the fourth embodiment and one sixth as large as that of Equation (9) for the first embodiment. As a result, the computational complexity can be further reduced.

In the embodiment described above, only the G pixels on the Bayer arrangement are supposed to have their resolution increased and an output full-color image is obtained through such a Bayer resolution increasing process. However, when no addition is made on R and B pixels, the image processing section of this embodiment does not have to operate in that way. Alternatively, even if pixel values are generated for every pixel location by increasing the resolution of the G pixel at every pixel location on the screen and by making interpolation and enlargement for R and B pixels, RGB pixel values may be obtained at every pixel location.

Still alternatively, the image processing section 2401 may have the same configuration as its counterpart of the first embodiment shown in FIG. 17, G pixel signals and RB pixel signals may be received at a low frame rate and at a high frame rate (with no addition), respectively, from their respective locations on the Bayer arrangement, and then RGB images in all three primary colors at every pixel location may be output. Even so, the G image has also been captured through a long exposure process. Consequently, an output image with reduced noise and a high SNR can be obtained.

In a situation where it is too dark to use a sufficient quantity of light for capturing an image, even if the subject is moving too much to avoid a shooting timing problem on the image capturing plane, the image capture device of the present disclosure can also capture an image with high resolution or using small pixels. The processing section of the present disclosure is implementable as not only a hardware circuit component but also as a part of a software program as well.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image capture device comprising a solid-state image sensor, a shooting control section that controls the solid-state image sensor, and an image processing section that processes an image that has been shot by the solid-state image sensor, wherein the solid-state image sensor includes:
   an image capturing plane on which a number of pixels, including pixels in a first color and pixels in a second color, are arranged two-dimensionally in a first direction and in a second direction that intersects with the first direction, a column of pixels that runs in the first direction including pixels in the first color and pixels in the second color;
   multiple banks of charge-coupled devices, each said bank running in the first direction, being connected to an associated column of pixels that runs in the first direction, and being able to receive and store, on a pixel-by-pixel basis, electric charges that have been created by each of the pixels that form the column;
   multiple charge sensing devices of a first type, each of which is connected to an associated one of the multiple banks of charge-coupled devices, senses electric charges that have been extracted from pixels in the first color and stored in the associated bank of charge-coupled devices, and transforms the electric charges into a voltage signal;
   multiple charge sensing devices of a second type, each of which is connected to an associated one of the multiple banks of charge-coupled devices, senses electric charges that have been extracted from pixels in the second color and stored in the associated bank of charge-coupled devices, and transforms the electric charges into a voltage signal;
   a transfer path that runs in the second direction and that outputs pixel signals through one terminal thereof; and
   a plurality of output signal lines that run in the first direction, each said output signal line being connected to at least some of the charge sensing devices and transmitting the voltage signals that have been output from the charge sensing devices to the transfer path, and
   wherein the shooting control section reads a first color image, which is made up of pixels in the first color, from the solid-state image sensor at a first frame rate and also reads a second color image, which is made up of pixels in the second color, from the solid-state image sensor at a second frame rate that is lower than the first frame rate.

2. The image capture device of claim 1, wherein the shooting control section is configured to extract electric charges that have been created by the pixels onto the banks of charge-coupled devices at the same time.

3. The image capture device of claim 1, wherein the shooting control section is configured to combine, at the banks of charge-coupled devices, the electric charges that have been extracted from the pixels in the first color and then stored in the banks of charge-coupled devices.

4. The image capture device of claim 3, wherein the shooting control section is configured to remove, from the bank of charge-coupled devices, electric charges that have been extracted from the pixels in the second color and then stored in the bank of charge-coupled devices in a frame in which the first and second color images are both read, and then combine, at the bank of charge-coupled devices, the electric charges that have been created by the pixels in the first color.

5. The image capture device of claim 1, wherein the image processing section generates, based on the first and second color images that have been read at the first and second frame rates, respectively, a color moving picture, of which the frame rate is equal to or higher than the first frame rate and of which the resolution is equal to or higher than the second color image's resolution.

6. The image capture device of claim 1, wherein the transfer path includes a horizontal bank of charge-coupled devices that runs in the second direction, and
   wherein the horizontal bank of charge-coupled devices is connected to the output signal lines and horizontally transfers charge signals, corresponding to the voltage signals on the output signal lines, while storing the charge signals.

7. The image capture device of claim 1, wherein the transfer path includes a horizontal shift register that runs in the second direction, and
   wherein the horizontal shift register is connected to the output signal lines and transfers horizontally the voltage signals on the output signal lines.

8. The image capture device of claim 7, wherein the solid-state image sensor includes a binning circuit that is arranged between the output signal lines and the horizontal shift register, and
   wherein the binning circuit is configured to add together the voltage signals that have been output onto at least two of the output signal lines and that represent electric charges that have been extracted from the pixels that are arranged in the second direction.

9. The image capture device of claim 1, wherein each of the pixels on the image capturing plane detects the intensity of one of red, green and blue components that are included in incoming light.

10. The image capture device of claim 1, wherein the first color is red and blue and the second color is green.

11. The image capture device of claim 1, wherein each of the pixels on the image capturing plane detects the intensity of one of cyan, magenta, yellow and green components that are included in incoming light.

12. A solid-state image sensor comprising:
   an image capturing plane on which a number of pixels, including pixels in a first color and pixels in a second color, are arranged two-dimensionally in a first direction and in a second direction that intersects with the first direction, a column of pixels that runs in the first direction including pixels in the first color and pixels in the second color;
   multiple banks of charge-coupled devices, each said bank running in the first direction, being connected to an associated column of pixels that runs in the first direction, and being able to receive and store, on a pixel-by-pixel basis, electric charges that have been created by each of the pixels that form the column;
   multiple charge sensing devices of a first type, each of which is connected to an associated one of the multiple banks of charge-coupled devices, senses electric charges that have been extracted from pixels in the first color and stored in the associated bank of charge-coupled devices, and transforms the electric charges into a voltage signal;
   multiple charge sensing devices of a second type, each of which is connected to an associated one of the multiple banks of charge-coupled devices, senses electric charges that have been extracted from pixels in the second color and stored in the associated bank of charge-coupled devices, and transforms the electric charges into a voltage signal;

a transfer path that runs in the second direction and that outputs pixel signals through one terminal thereof; and a plurality of output signal lines that run in the first direction, each said output signal line being connected to at least some of the charge sensing devices and transmitting the voltage signals that have been output from the charge sensing devices to the transfer path.

13. A method for driving the solid-state image sensor of claim 12, the method comprising the steps of:

transferring, at the same time and on a pixel-by-pixel basis, electric charges that have been created by the pixels to associated portions of the banks of charge-coupled devices;

getting some of the electric charges that have been transferred on a pixel-by-pixel basis to the banks of charge-coupled devices from the pixels in the second color sensed by the charge sensing devices of the second type;

getting some of the electric charges that have been transferred on a pixel-by-pixel basis to the banks of charge-coupled devices from the pixels in the first color combined together in the charge sensing devices of the second type; and sensing the electric charges that have been combined in each said bank of charge-coupled devices at the charge sensing devices of the first type.

\* \* \* \* \*